US012575509B2

(12) United States Patent
Mazzarolo

(10) Patent No.: US 12,575,509 B2
(45) Date of Patent: Mar. 17, 2026

(54) MOVABLE APPARATUS WITH AUTOMATIC/AUTONOMOUS OPERATION SLIDABLE ALONG PRE-ESTABLISHED PATHS AMONG ROWS OF VINEYARDS, FOR THE ANTI-BACTERIAL AND FUNGICIDE TREATMENT OF THE SAME VINEYARDS

(71) Applicant: FREE GREEN NATURE S.R.L., Colle Umberto (IT)

(72) Inventor: Valter Mazzarolo, Sarmede (IT)

(73) Assignee: FREE GREEN NATURE S.R.L., Colle Umberto (IT)

( * ) Notice: Subject to any disclaimer, the term of this patent is extended or adjusted under 35 U.S.C. 154(b) by 1060 days.

(21) Appl. No.: 17/637,603

(22) PCT Filed: Jun. 17, 2020

(86) PCT No.: PCT/IB2020/055650
§ 371 (c)(1),
(2) Date: Feb. 23, 2022

(87) PCT Pub. No.: WO2021/038317
PCT Pub. Date: Mar. 4, 2021

(65) Prior Publication Data
US 2022/0279699 A1 Sep. 8, 2022

(30) Foreign Application Priority Data
Aug. 27, 2019 (IT) ........................ 102019000015108

(51) Int. Cl.
A01G 17/00 (2006.01)
A01G 17/02 (2006.01)
A61L 2/10 (2006.01)

(52) U.S. Cl.
CPC .................................. A01G 17/02 (2013.01)

(58) Field of Classification Search
CPC ................................. A01G 17/02; A61L 2/10
See application file for complete search history.

(56) References Cited

U.S. PATENT DOCUMENTS 5,040,329 A 8/1991 Michaloski
2008/0061252 A1* 3/2008 Garcia ...................... A61L 2/10
250/504 H
(Continued)

OTHER PUBLICATIONS

International Search Report mailed on Nov. 20, 2020, in corresponding to International Application No. PCT/IB2020/055650; 3 pages.

*Primary Examiner* — Donald R Spamer
(74) *Attorney, Agent, or Firm* — Maier & Maier, PLLC

(57) ABSTRACT

Movable apparatus (5) with automatic autonomous operation (AGV) slidable along pre-established paths (9) among rows of vineyard (10, 11), for the anti-bacterial, fungicide and anti-parasitic treatment in general of the same vineyards, and in particular of the leaves, the trees and the bunches of grapes, comprising a base structure (12) supported on to the ground by sliding by means of wheels (6) or tracks (7), comprising a plurality of ultraviolet lamps (53) with germicide function, which are supported by panels overlapped to each other (42-45), in a manner to direct the ultraviolet radiation against the component parts of the vineyards. There are described accurately all the component parts of the apparatus and the displacements of the apparatus and the different operative steps thereof, for performing the required anti-parasitic treatment in to all the vineyards, also in those in which the advancement paths of the apparatus are displaced and not communicating with other advancement paths for the same apparatus.

19 Claims, 41 Drawing Sheets

(56)          References Cited

U.S. PATENT DOCUMENTS

2015/0209460 A1*   7/2015  Kreitenberg ............. A61L 2/10
                                                    422/24
2018/0000306 A1*   1/2018  Caruso ................... A47L 11/28

* cited by examiner

VIEW OF THE TRACTION

VIEW OF THE DRIVE SYSTEM

VIEW OF THE SUPPLY SYSTEM

1

MOVABLE APPARATUS WITH AUTOMATIC/AUTONOMOUS OPERATION SLIDABLE ALONG PRE-ESTABLISHED PATHS AMONG ROWS OF VINEYARDS, FOR THE ANTI-BACTERIAL AND FUNGICIDE TREATMENT OF THE SAME VINEYARDS

The present industrial invention refers to a movable apparatus with automatic/autonomous operation slidable along pre-established paths among rows of vineyards, for the anti-bacterial, fungicide and anti-parasitic treatment of the same vineyards, and in particular of the leaves, the trees and the bunches of grapes, instead of the traditional treatments with the anti-parasitic and fungicide chemical products which are sprayed on to the leaves, the trees and the bunches of grapes. This movable apparatus lends itself for the anti-bacterial and fungicide treatments also for fruit-trees or for grounds for cultivating vegetables.

At the present time, for preventing possible deposits of bacteria, mushrooms or micro-organisms of different species on to the leaves, the trees and the bunches of grapes of vineyards, there are used several types of anti-parasitic chemical products of traditional types, which are sprayed periodically by atomizing them with suitable spraying systems into which they are introduced.

In particular, the vineyard is subjected to become parasitized by the mildew, which collects itself on to the leaves, the trees and the bunches of grapes and consequently determines the anticipated fall of the leaves, also called phylloptosis. In these trees, there may be also originated some longitudinal splits, in correspondence of which the whitish efflorescence may develop itself, which is constituted by spores of the parasite vine-growing Downy. Moreover, the action of the mushrooms on to the vine shoots of the trees of the vineyards determines the hypertrophy of the tissues of the vine-shoots, with consequent unilateral growing of the vine-shoots, which bend themselves by forming a hook or bringing a "S"-shaped form. The bunches of grapes may be submitted directly or indirectly to the infections of parasites of various kind, starting from the herbaceous vine shoot.

Before the appearance of the fruit, there may appear some symptoms characterized by livid spots as well as by some hypertrophies deforming the peduncle, the grape-stalk and the small bunches of grapes (hook or "S"-shaped forms). Afterward, if the conditions are favourable to the development of the mushrooms, the bunches may be covered by the fruiting of this pathogenous agent and then to dry up. After the fruit, the deposits of the mildew on to the bunches determine two different syndromes therein, which are commonly called gray vine rot and brown vine rot. The infection of these organs of the tree reveals itself with a leaden colouring and thereafter they are covered by the fruiting of the mushrooms, which reveal themselves through the stomas of the grapes by forming all together a gray colouring. On to the older bunches, the infection of the grapes generally does not reveal some fungal fruiting (from here, the name of disguised mildew), a brownish colouring, loss of turgidity and withering. The absence of fruiting of the mushroom is explained in that "the absence of mushroom" from the grapes occurs exclusively through the stomas or other cracks.

When the stomas of the grapes, when the age is increasing, loss their capacity of operating and/or degenerate, the mushroom mycelium remains "trapped" inside the grape and consequently there isn't possible for the sporulating organs to go out the same mushrooms. In order to avoid these diseases, as already explained the trees are sprayed with some chemical products foreseen for these purposes, by employing proper atomizers or sprayers, for example the shoulder carried sprayer, the atomizer for the agricultural tractor having high pressure operated sprayers or atomizers coupled with a high speed rotating fan, so as to disperse the product in an uniform manner, or in some cases these anti-parasitic products are dispersed with a suitably equipped helicopter which flies above the vineyards to be sprayed.

The number of anti-mildew formulations put into commerce is very wide and several are the manners of action with respect to the fungus. To this purpose, the products which are used may be subdivided into:
preventive products or contact products, which remain on to the external surface of the vegetative organs and prevent the contact of the spores and the cone shells of the pathogenous agent with the vine; these anticryptogamics must be employed in time and in advance by covering all organs of the vine capable of being attacked by the parasites; they can be washed away on the whole by 25-30 cm. of rain which may fall with one or more consecutive rains.

Other kinds of anti-parasitic products are the so-called curative products, which have the capacity to stop or prevent the development of the mushrooms during the hatching period thereof and even after their sporulation has occurred, and to this category of anti-parasitic products belong the endotherapic anti-mildew products. All these solutions have the common factor of the high cost for their supply and their installation, by employing some mechanical means and personnel. The chemical products can be also become assimilated by the fruit namely by the grapes, even if they will be swallowed therefore by the consumers and contained in the final product, namely the wine, in very low quantities. Moreover, the sprayed chemical products are an environmental pollution source, which can determine in the time some dangers for the health of the persons who come into contact therewith.

The present invention has the object to effect an anti-bacterial and fungicide treatment and a treatment for other types of parasites which can deposit and develop themselves on to the leaves, the trees, and the bunches of grapes which form and ripen themselves in the vineyards, by damaging the production of the grapes and sometimes in addition to the grapes by destroying also the trees of the grapes, and such treatment is effected without utilizing or by utilizing in an extremely limited and reduced manner the above described traditional anticryptogamic products, thereby avoiding the above specified drawbacks deriving from the use of these chemical products, by means of a movable apparatus with automatic/autonomous operation, which includes and utilizes new and innovative systems for effecting this treatment, which apparatus is slidable along pre-established paths among rows of vineyards and is controlled for being displaced along the pre-established paths by means of a set of mechanical, electric and electronic devices associated with the same apparatus, which are arranged and operated by one or more specific operators, for actuating the various component parts of the present movable apparatus in a manner to obtain the respectively desired and needed treatment steps.

This movable apparatus is made with the constructive characteristics hereinafter described by way of a not limitative example, for obtaining the requested movements of the same apparatus, and with reference to the accompanying Figures, in which.

Figure 1:
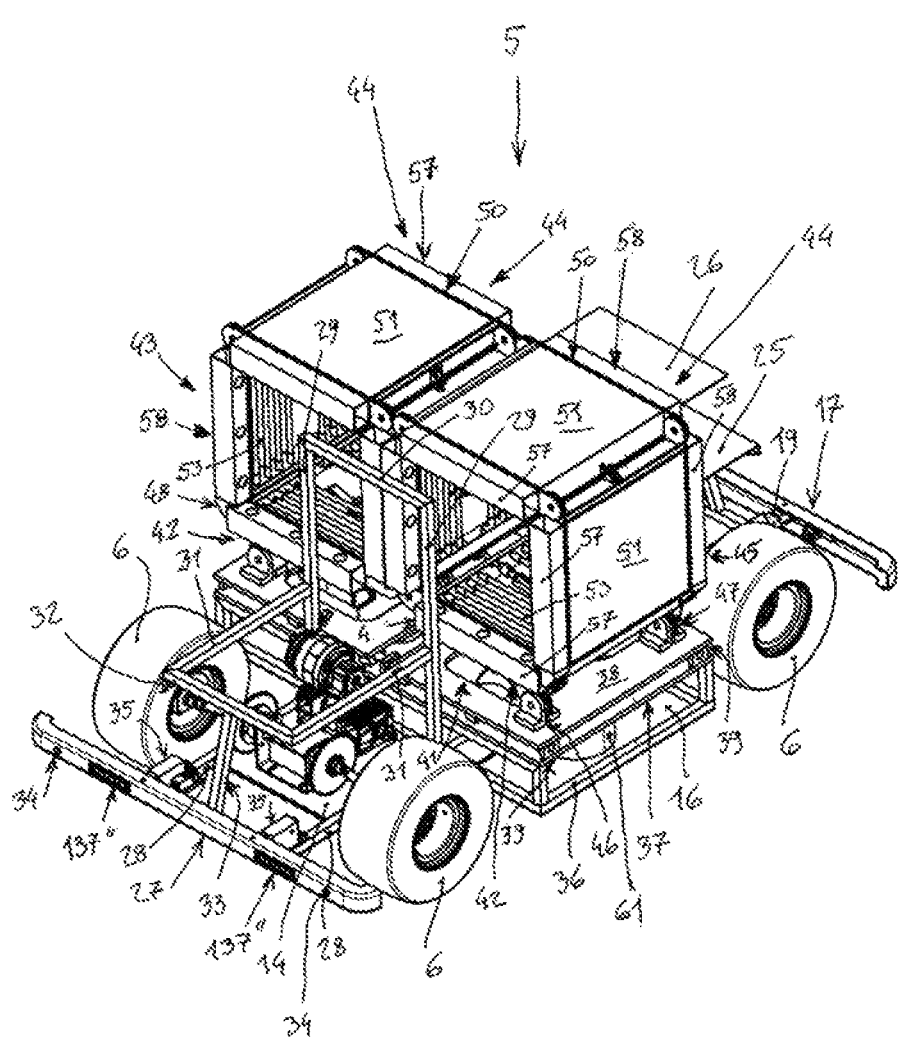
FIG. 1 shows a back perspective view of a movable apparatus according to the invention, in an assembled condition and displaced in the rest position thereof, which isn't disposed among the rows of the vines of the vineyards to be treated.
Figure 2:
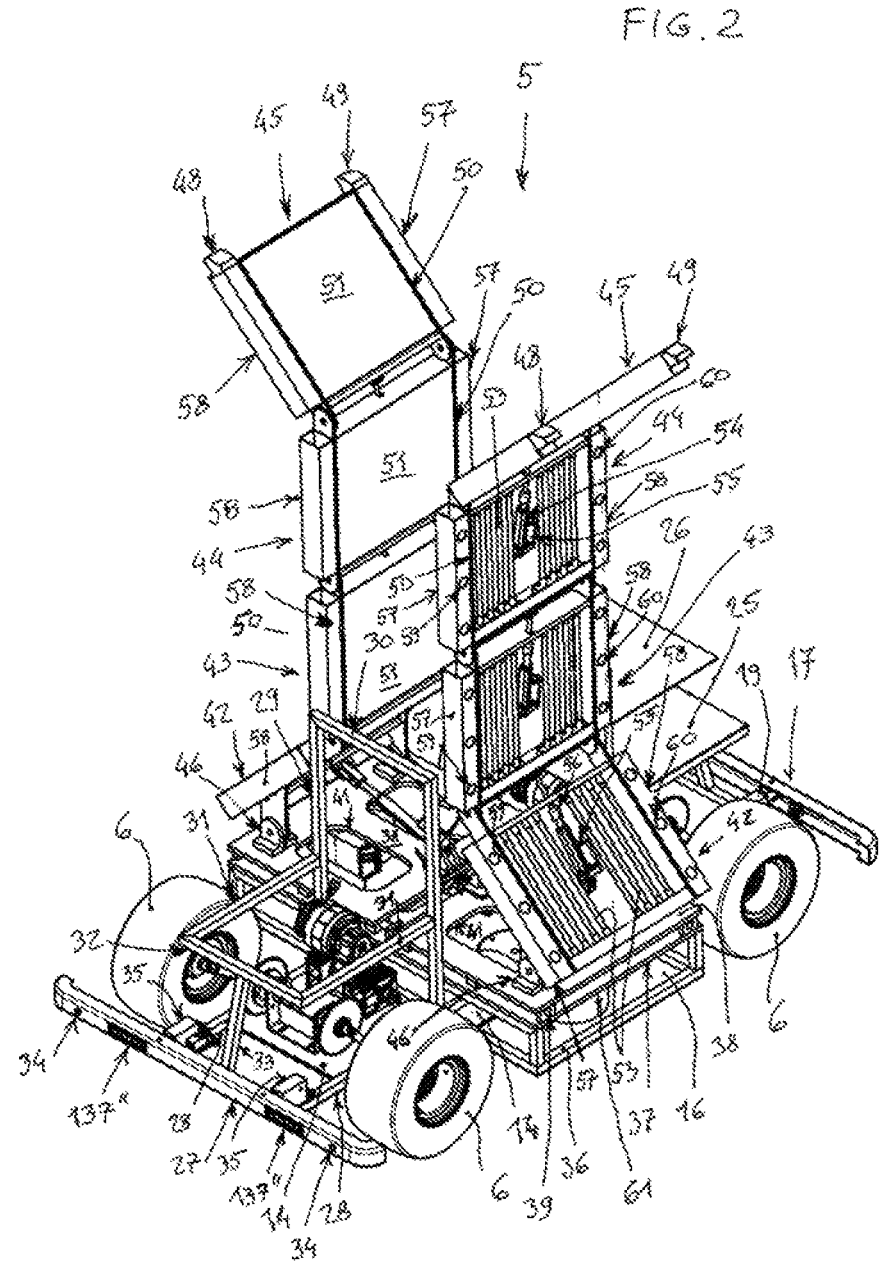
FIG. 2 shows a back perspective view of the movable apparatus of the FIG. 1, in the assembled condition and displaced in the operative position thereof, which isn't disposed among the rows of the vines of the vineyards to be treated.
Figure 3:
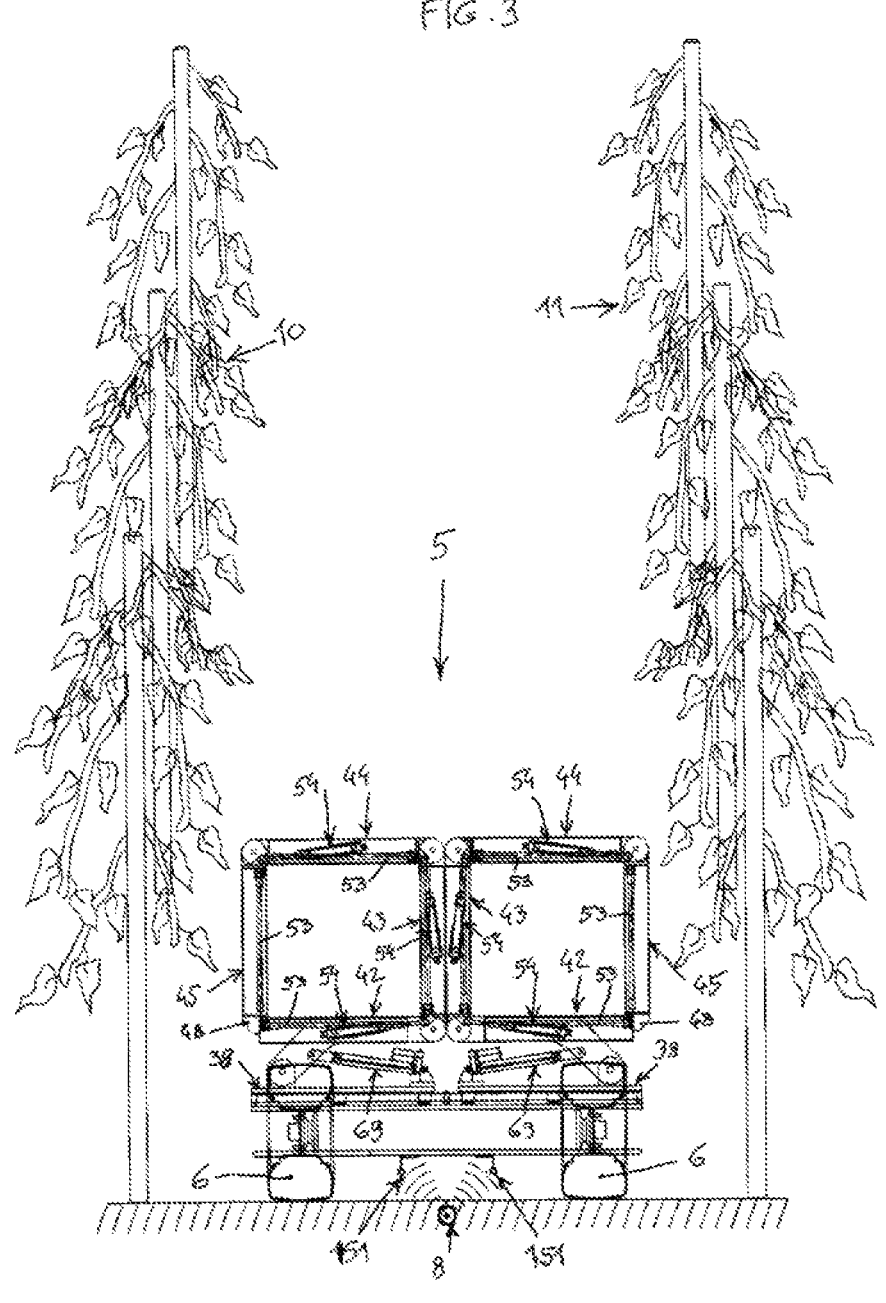
FIG. 3 shows a back view of the movable apparatus according to the invention, in the assembled condition and displaced in the rest position thereof, which is disposed and laid on to a flat ground delimited by the rows of two vines of the vineyards arranged parallel and spaced away from each other.
Figure 6:
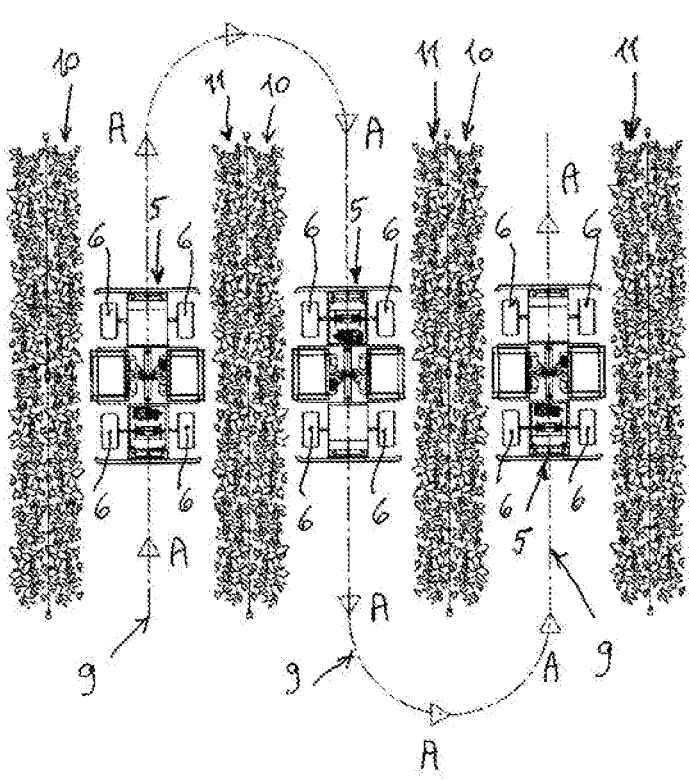
Figure 7:
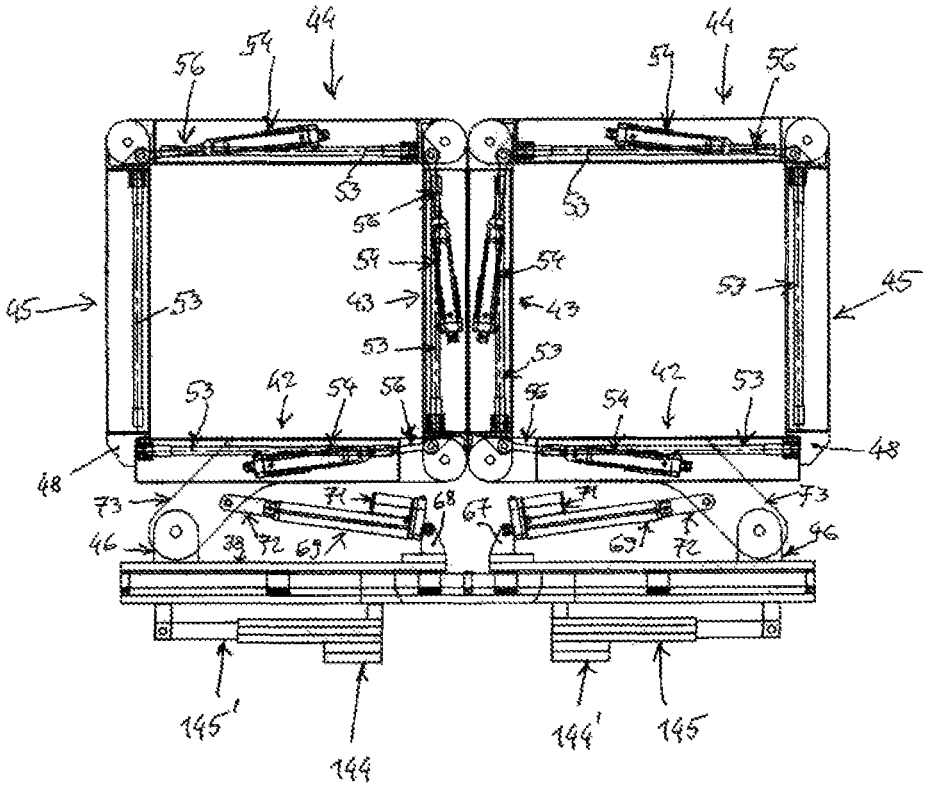
Figure 8:
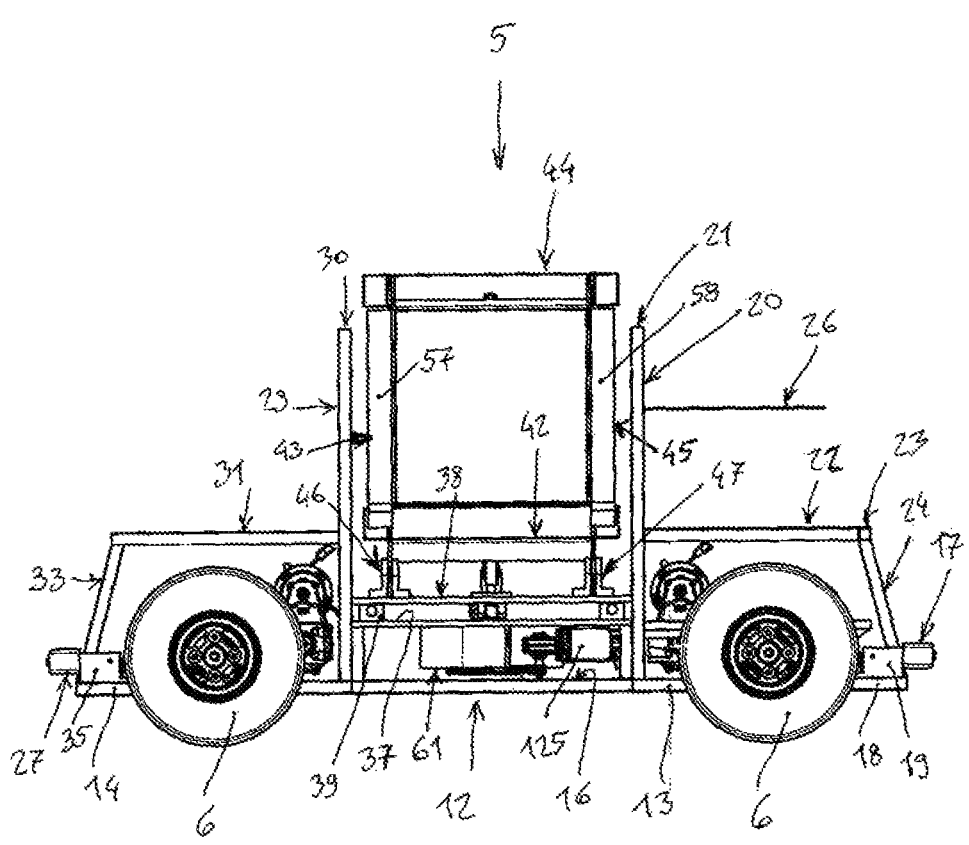
Figure 9:
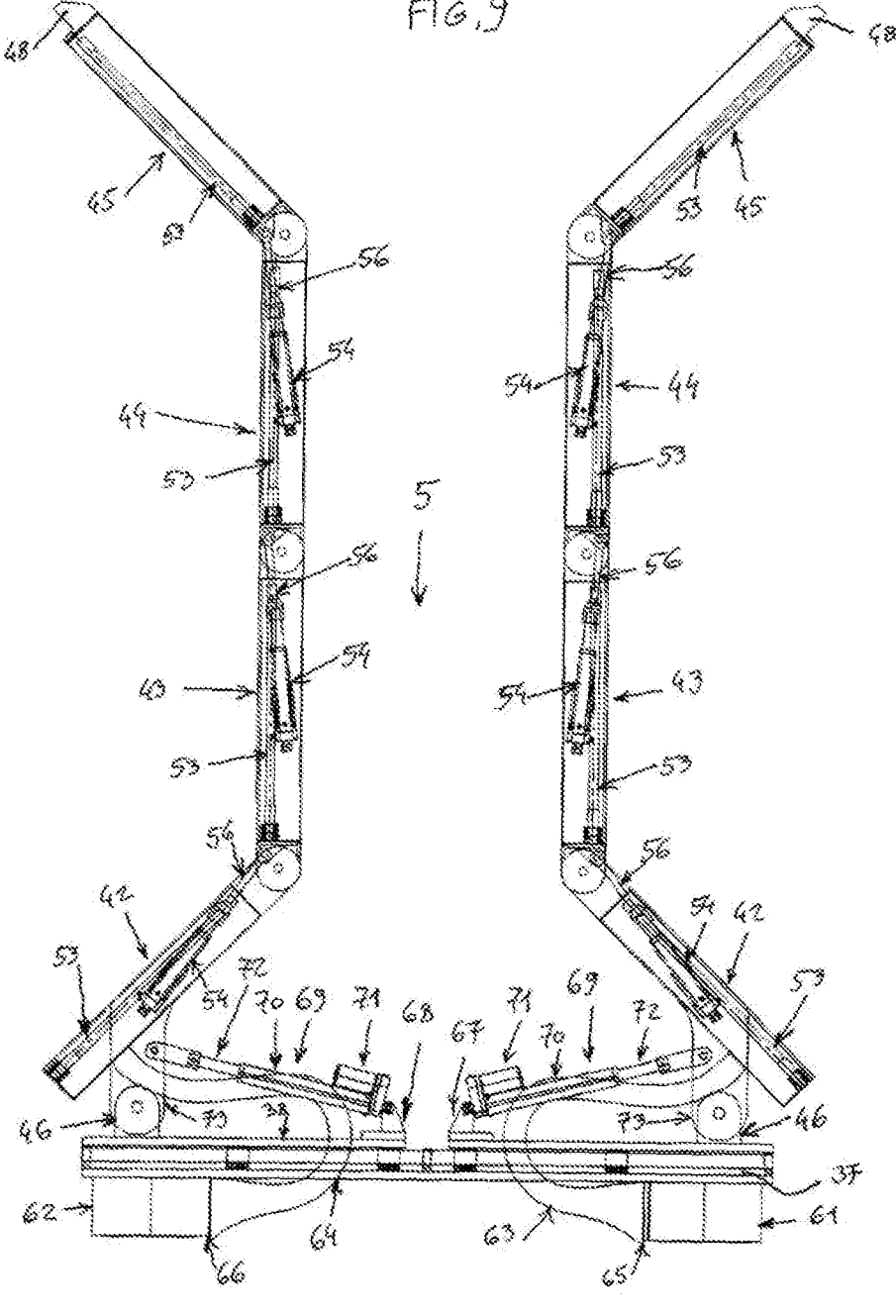
Figure 10:
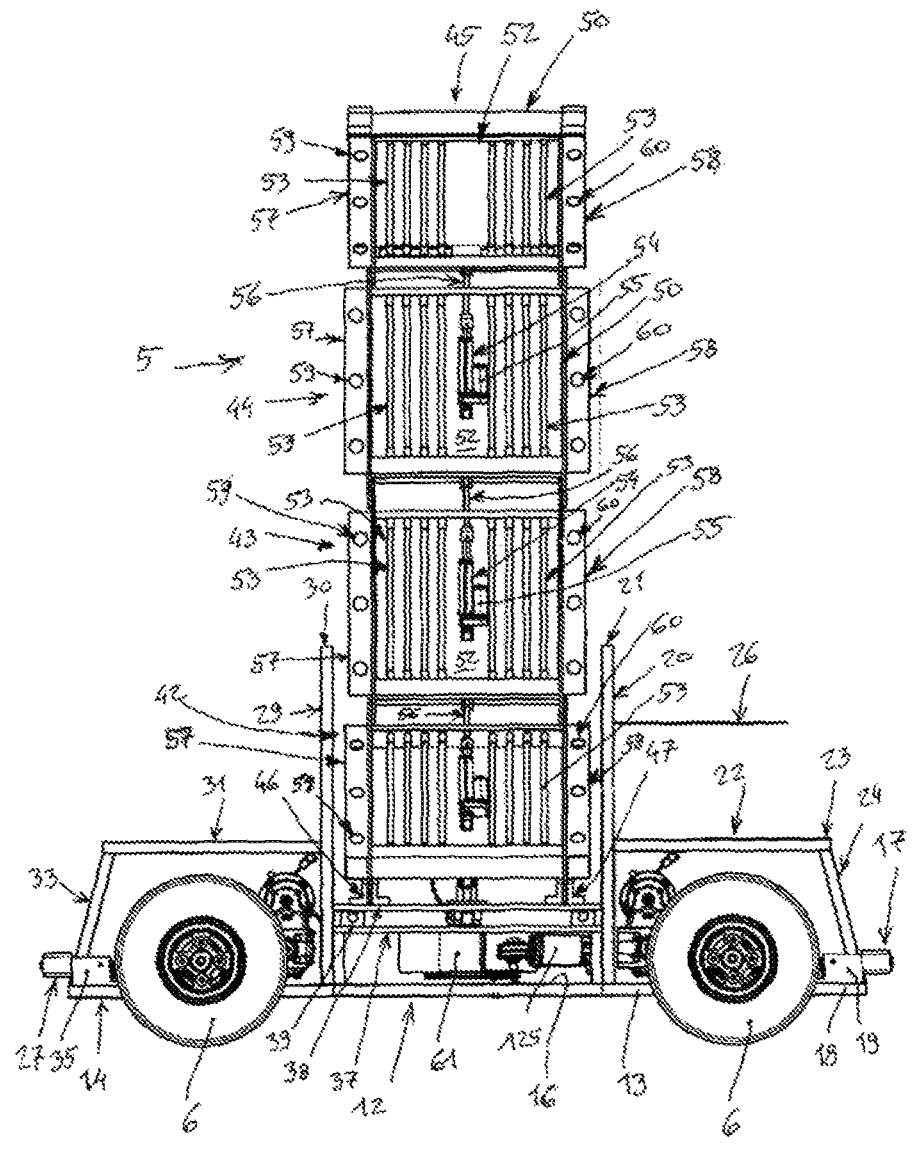
Figure 11:
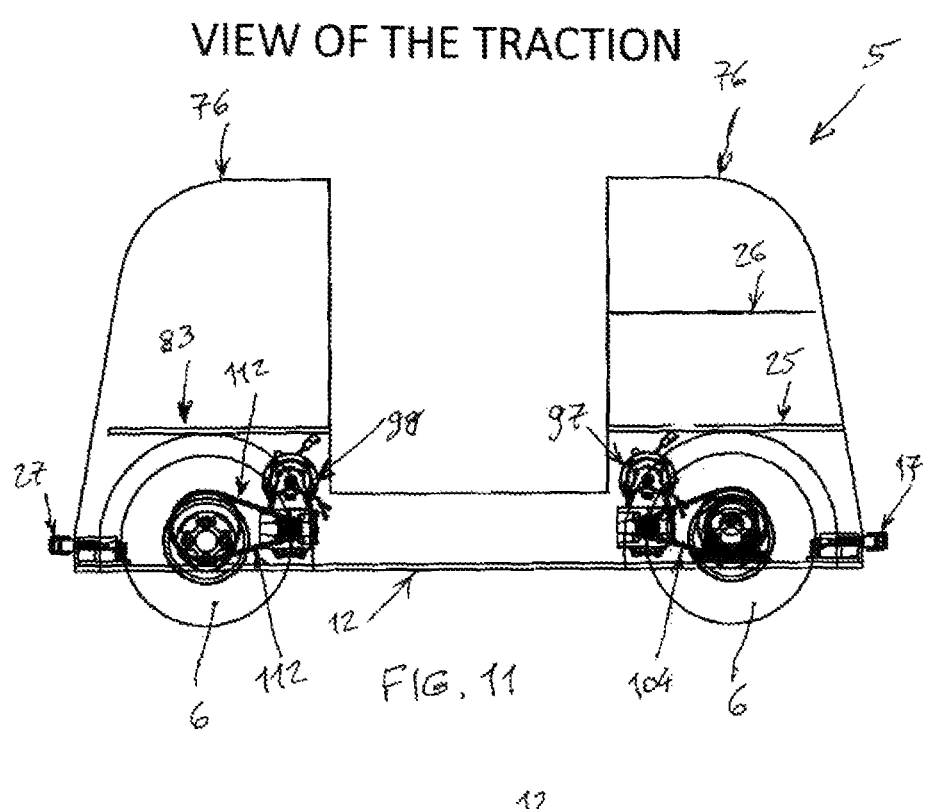
Figure 12:
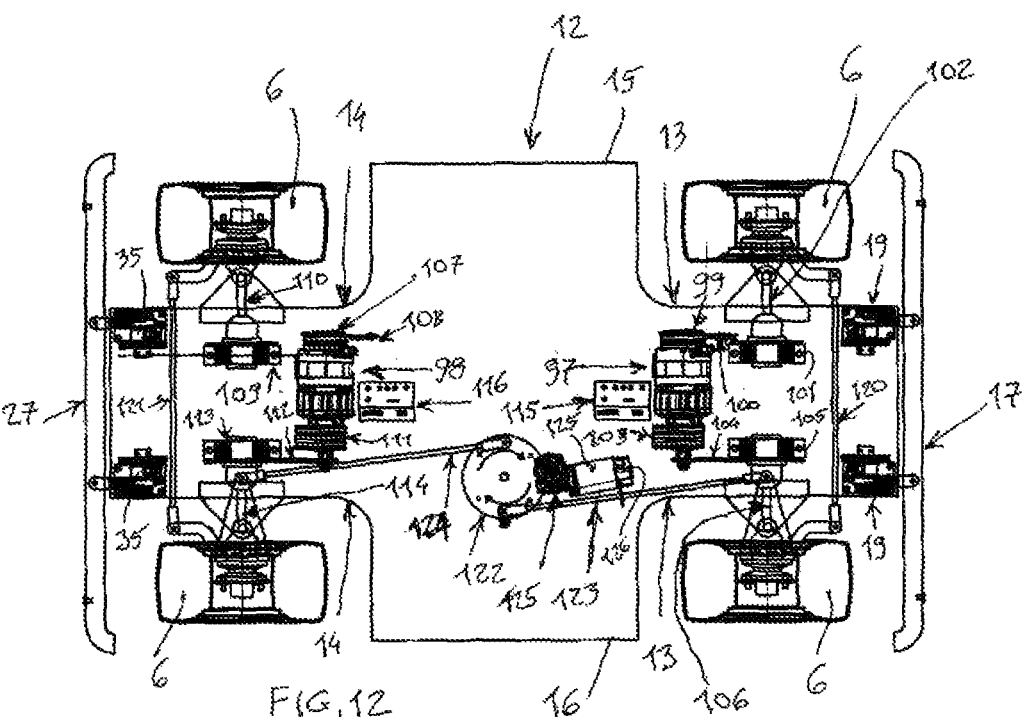
Figure 13:
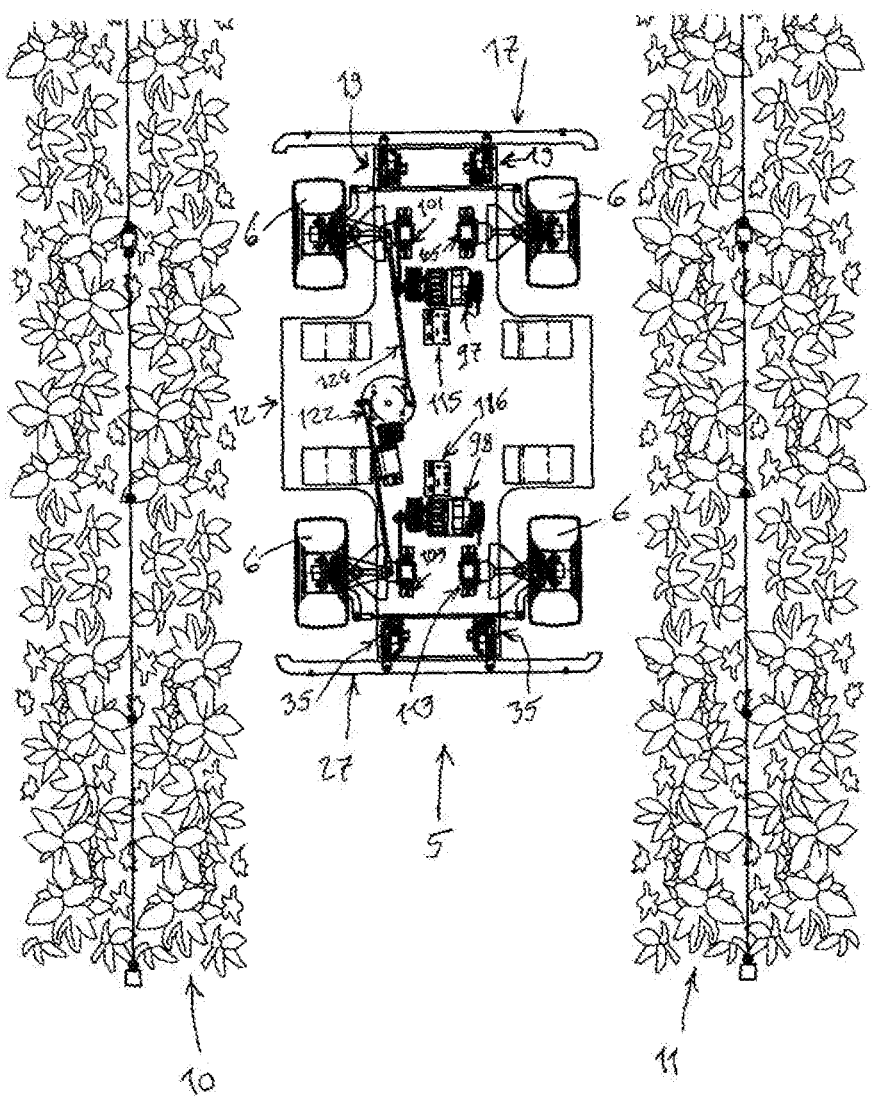
Figures 14, 15:
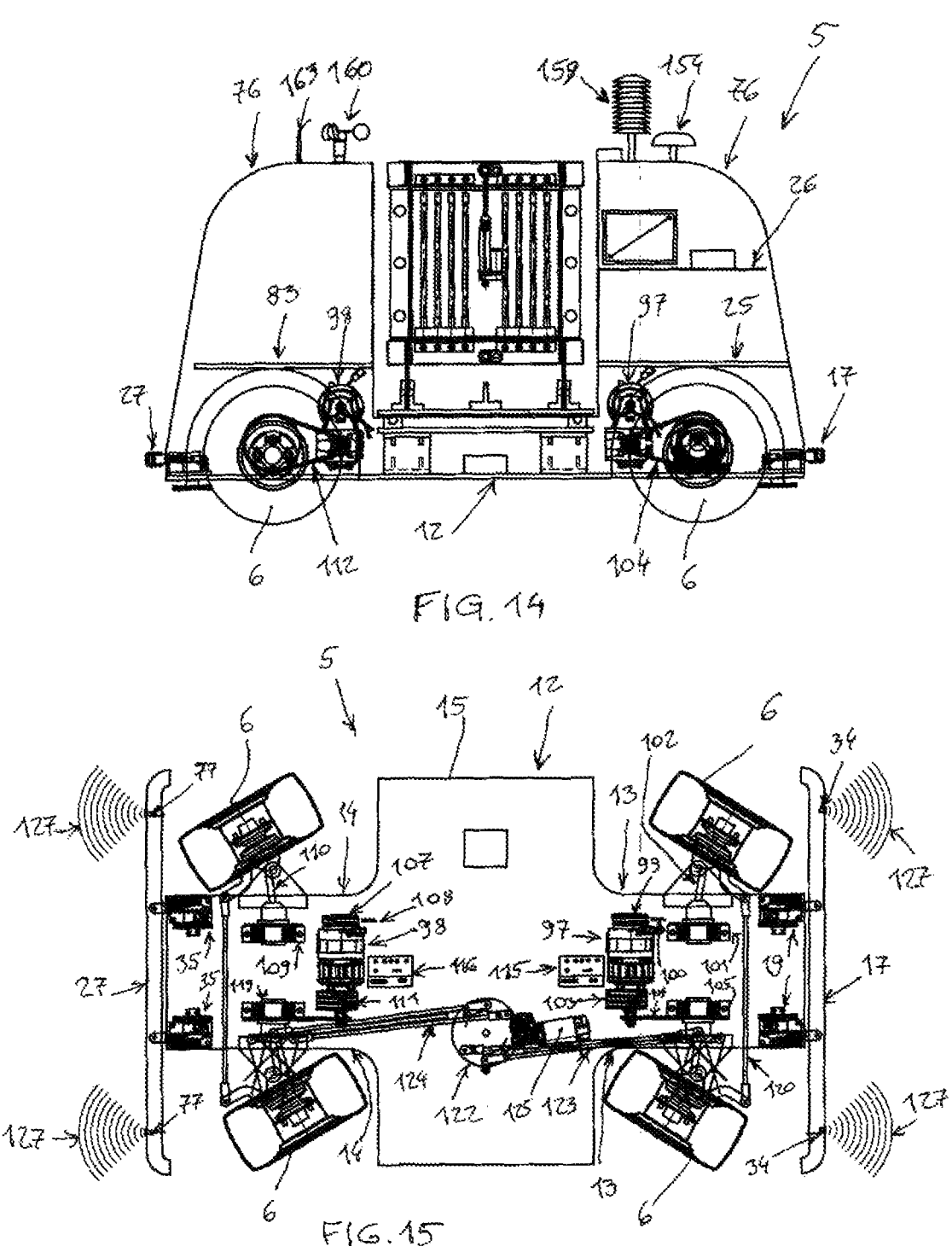
Figure 16:
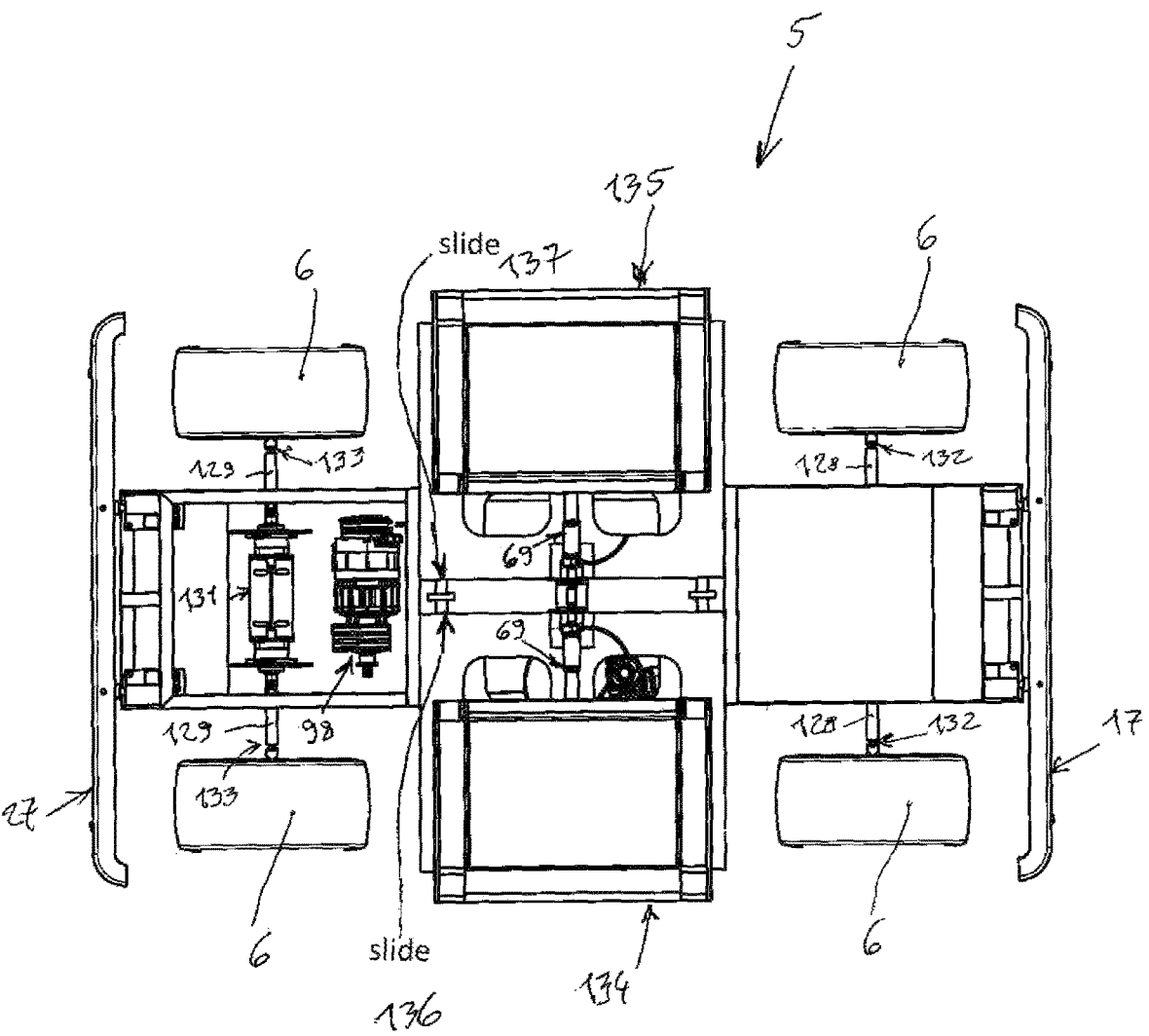
Figure 17:
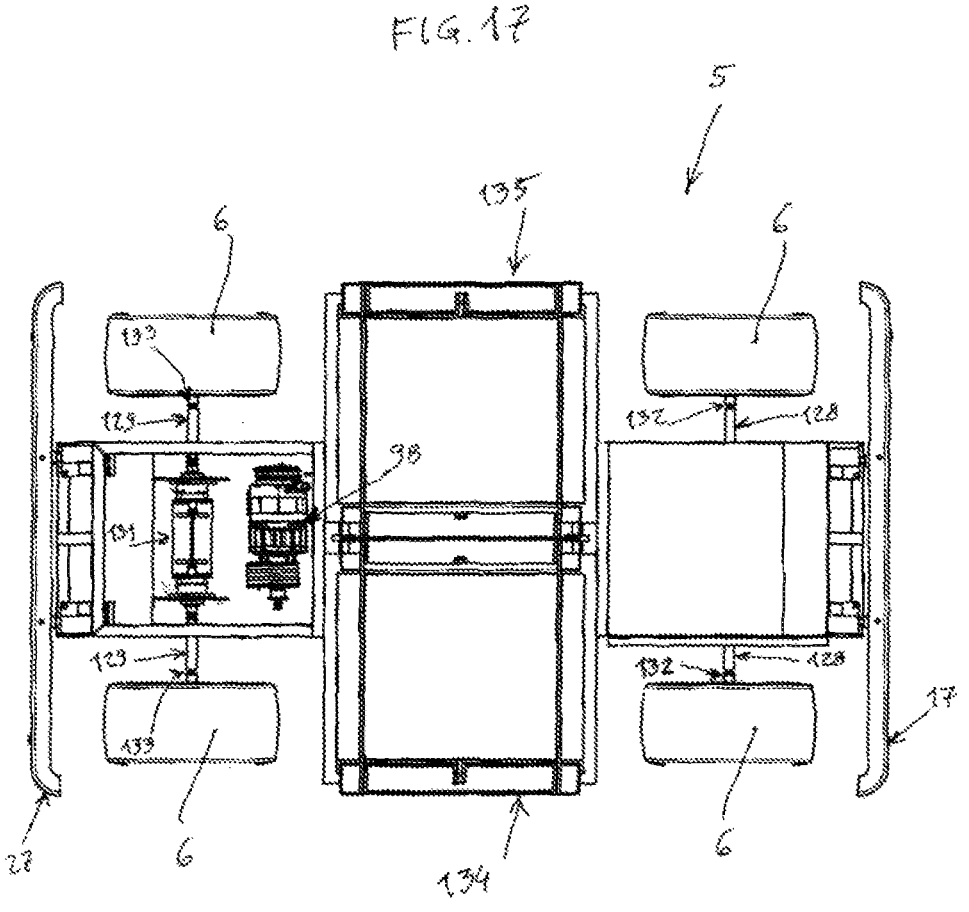
Figures 18, 19:
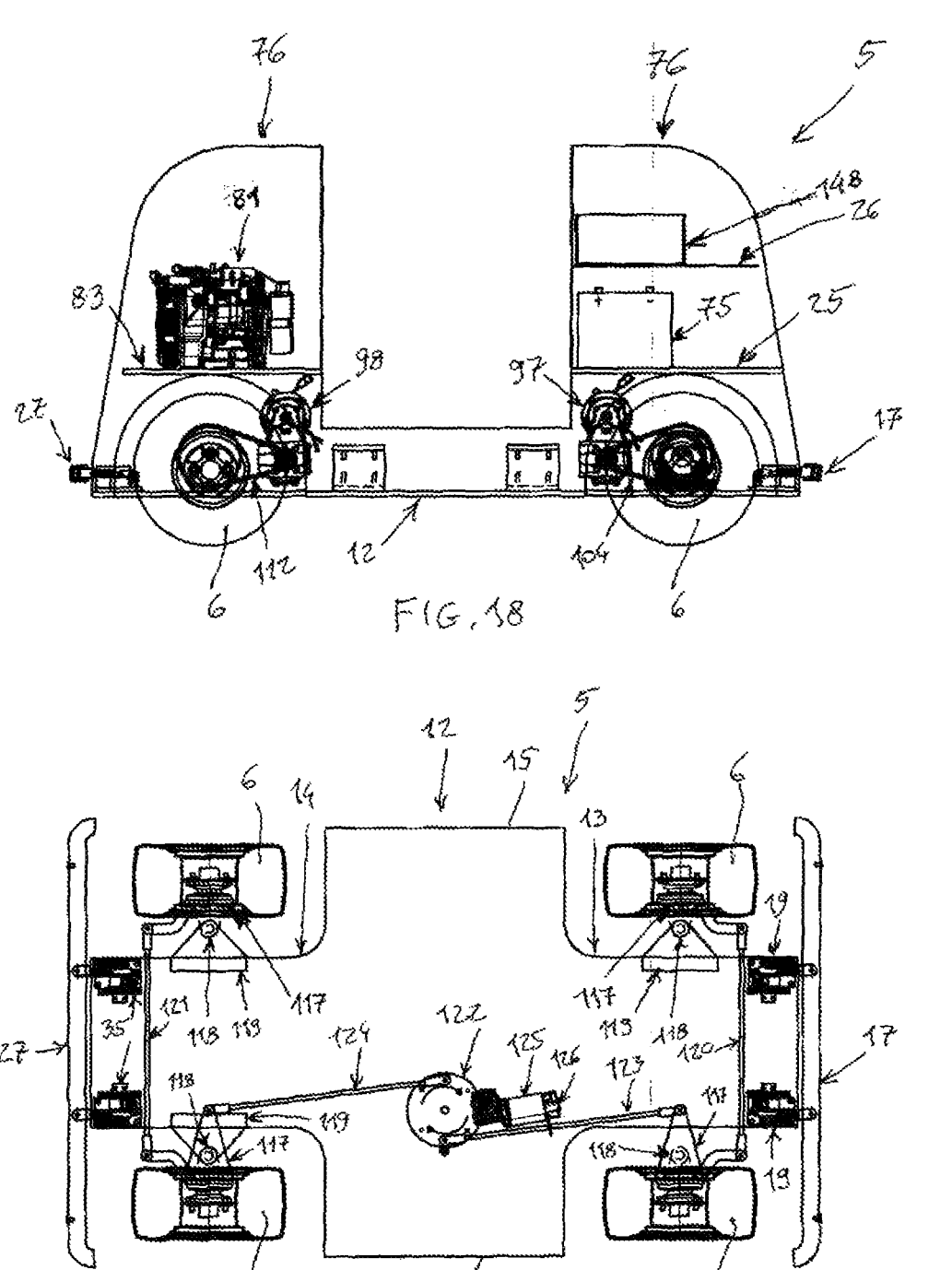
Figure 20:
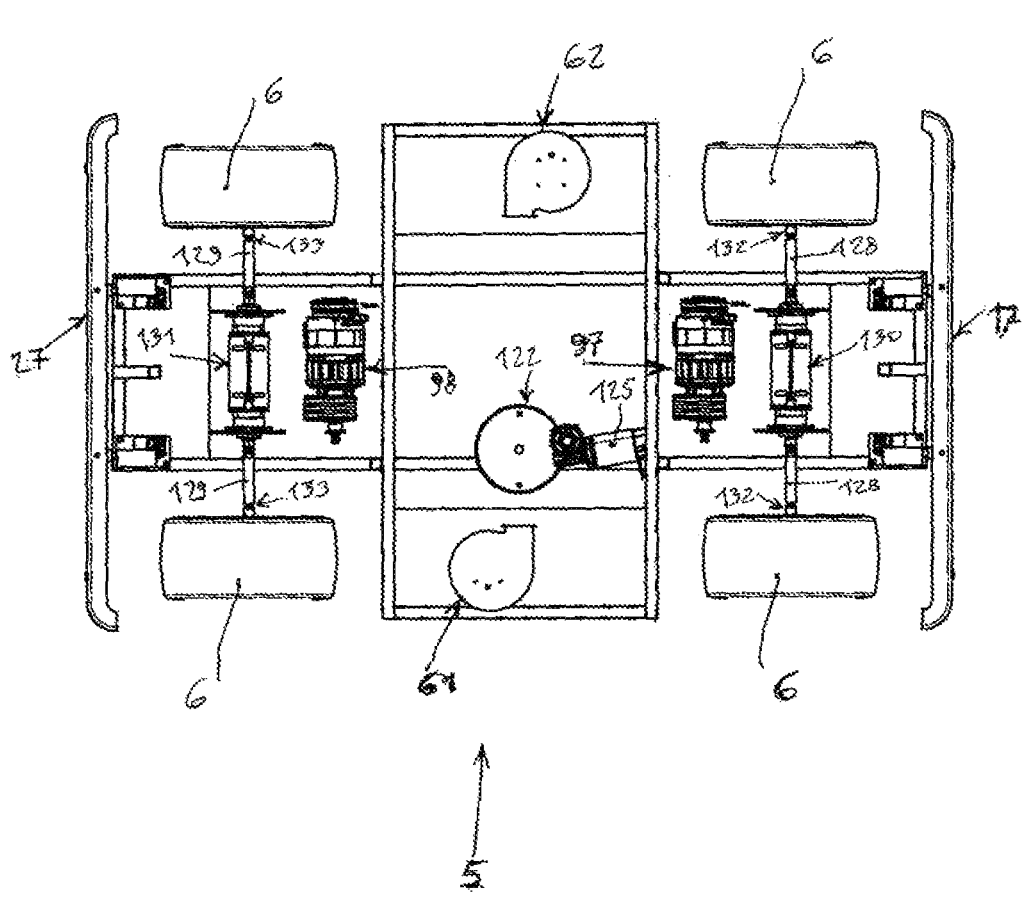
Figure 21:
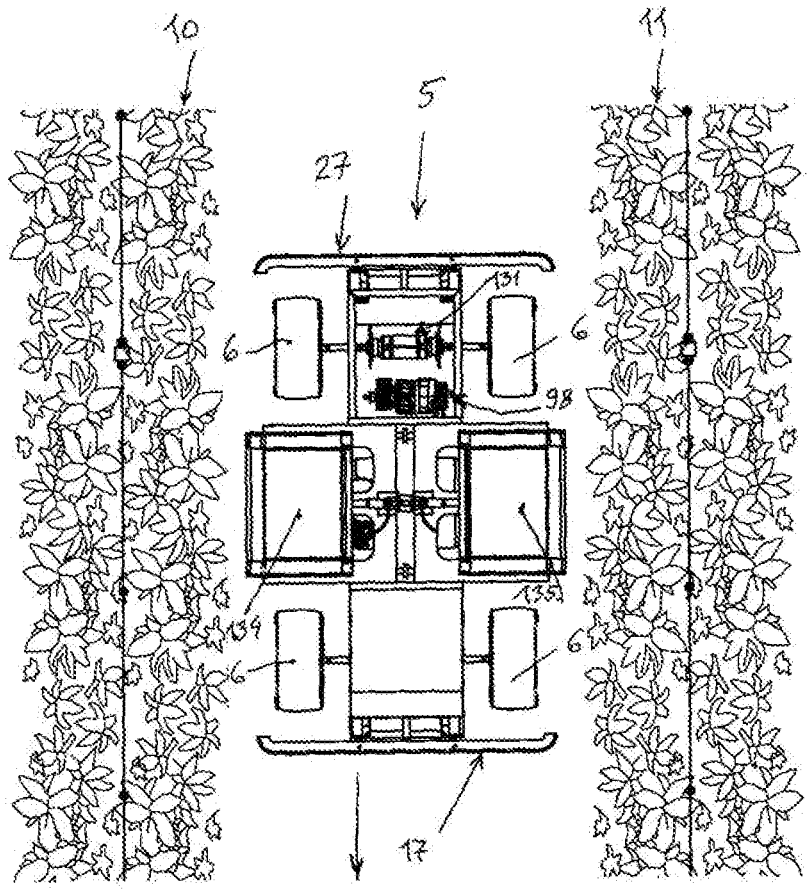
Figure 22:
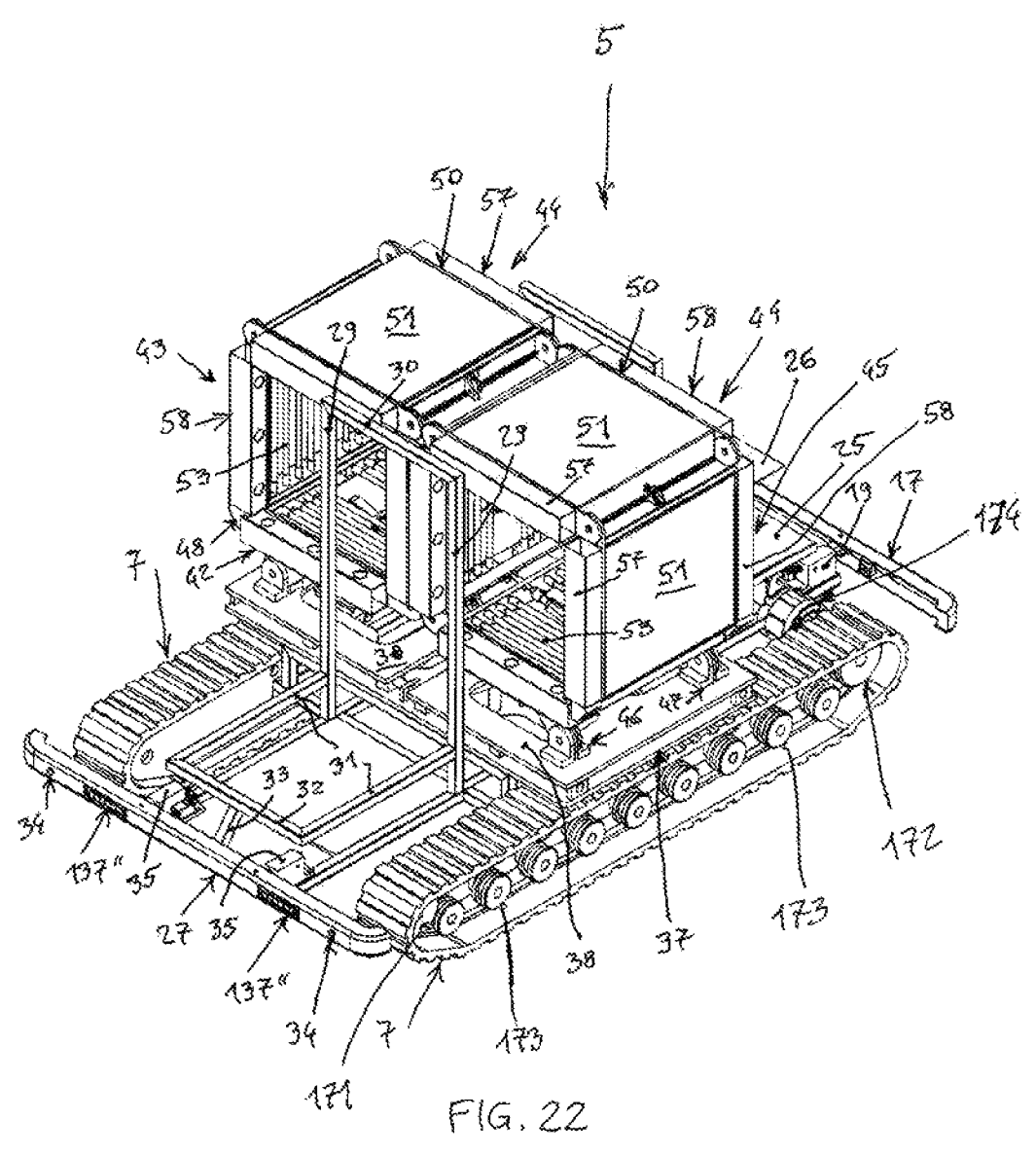
Figure 23:
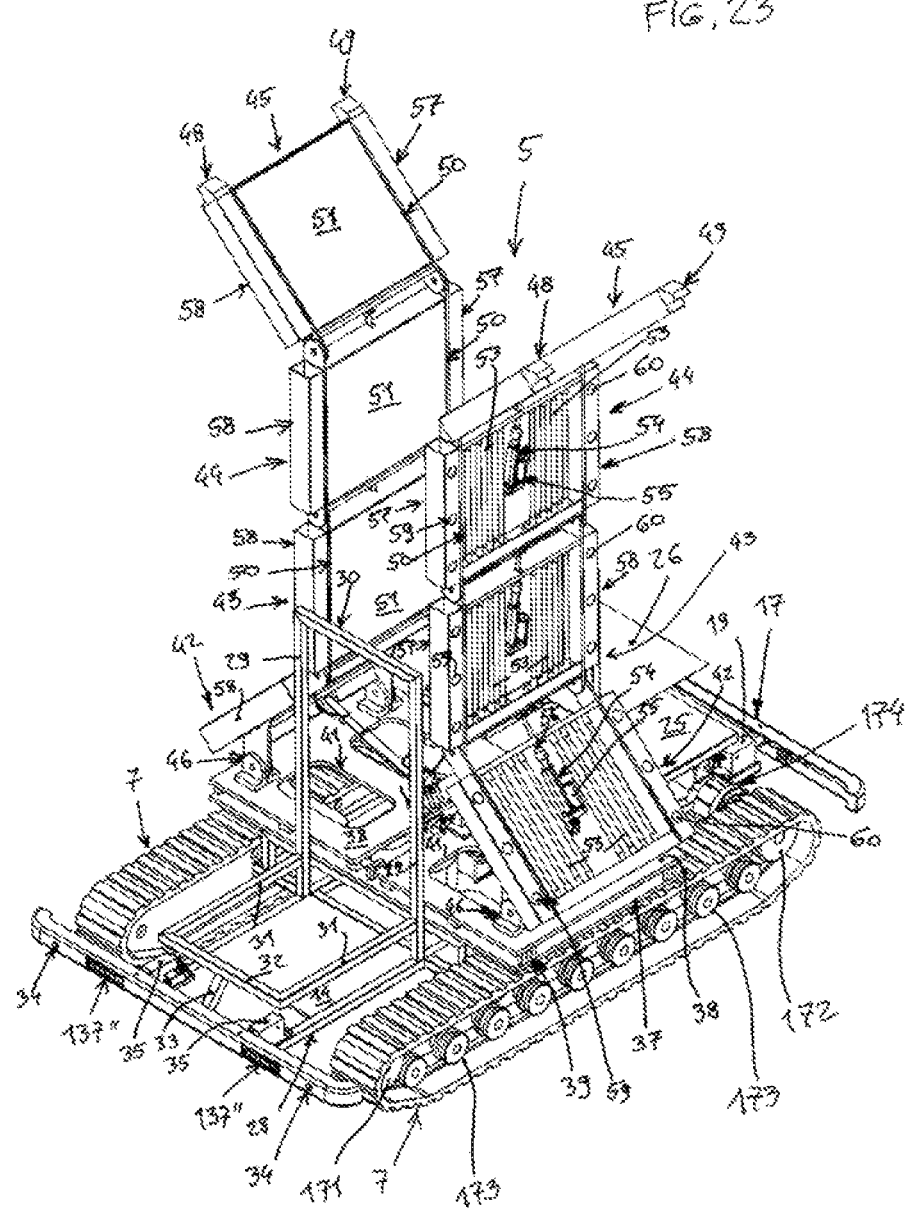
Figure 24:
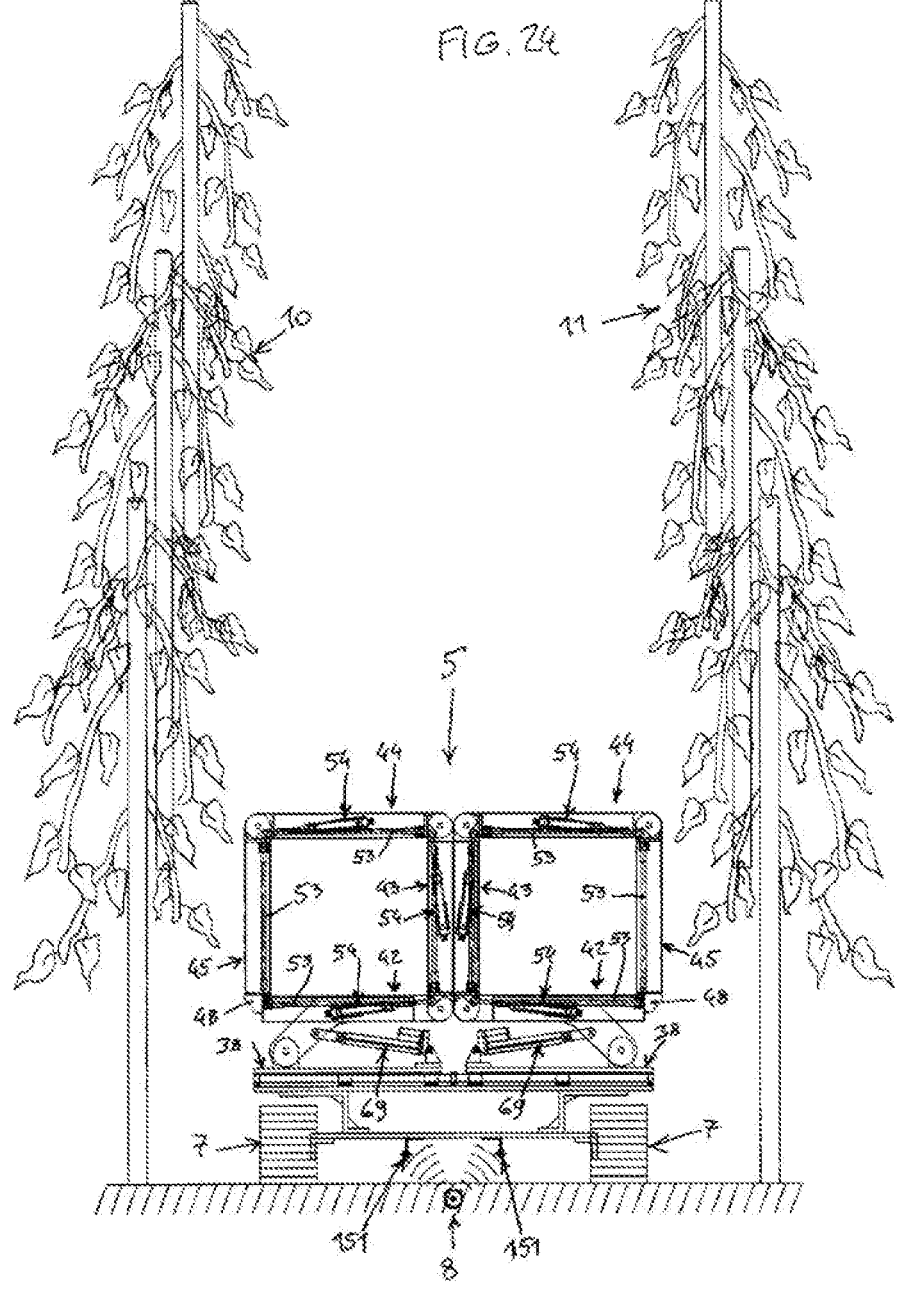
Figure 25:
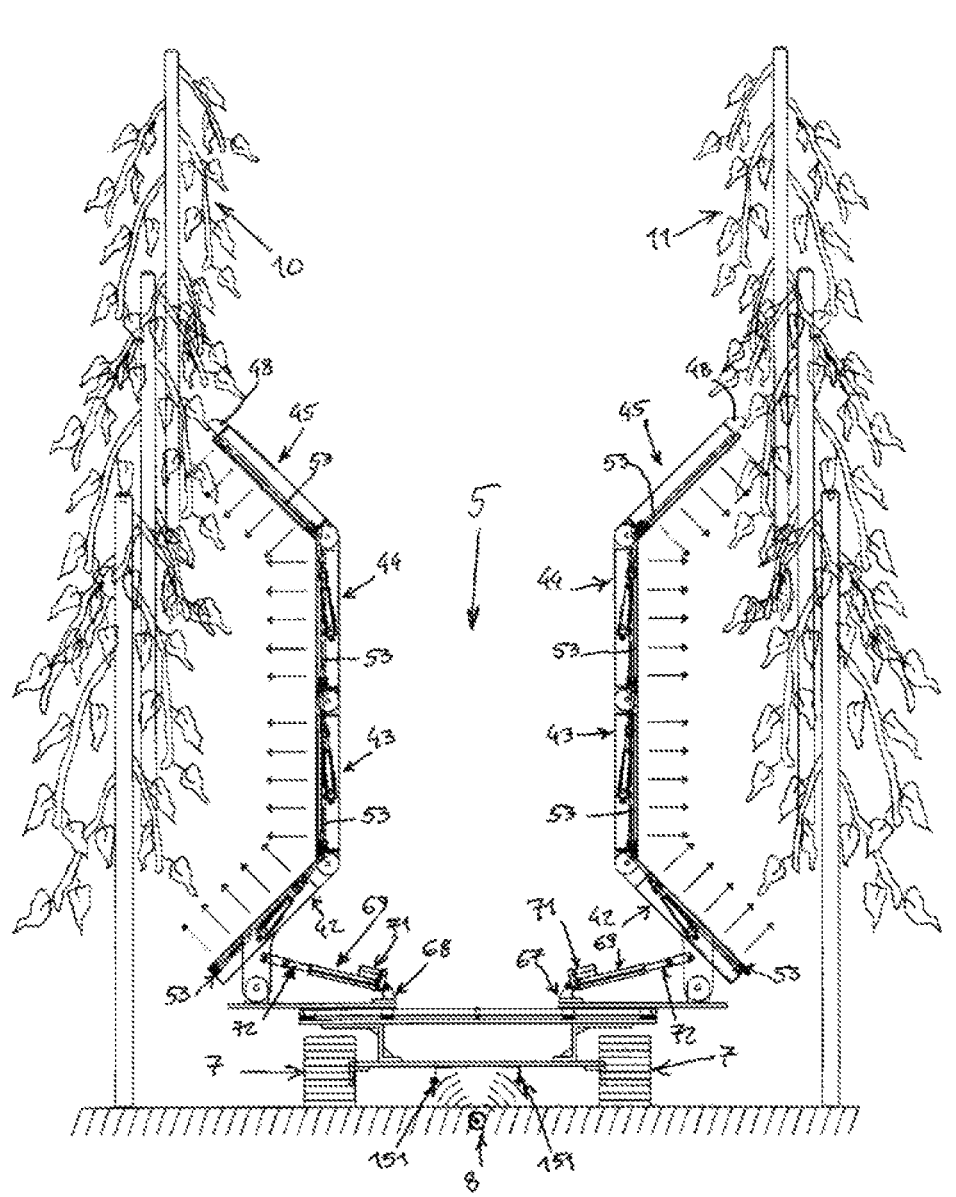
Figure 26:
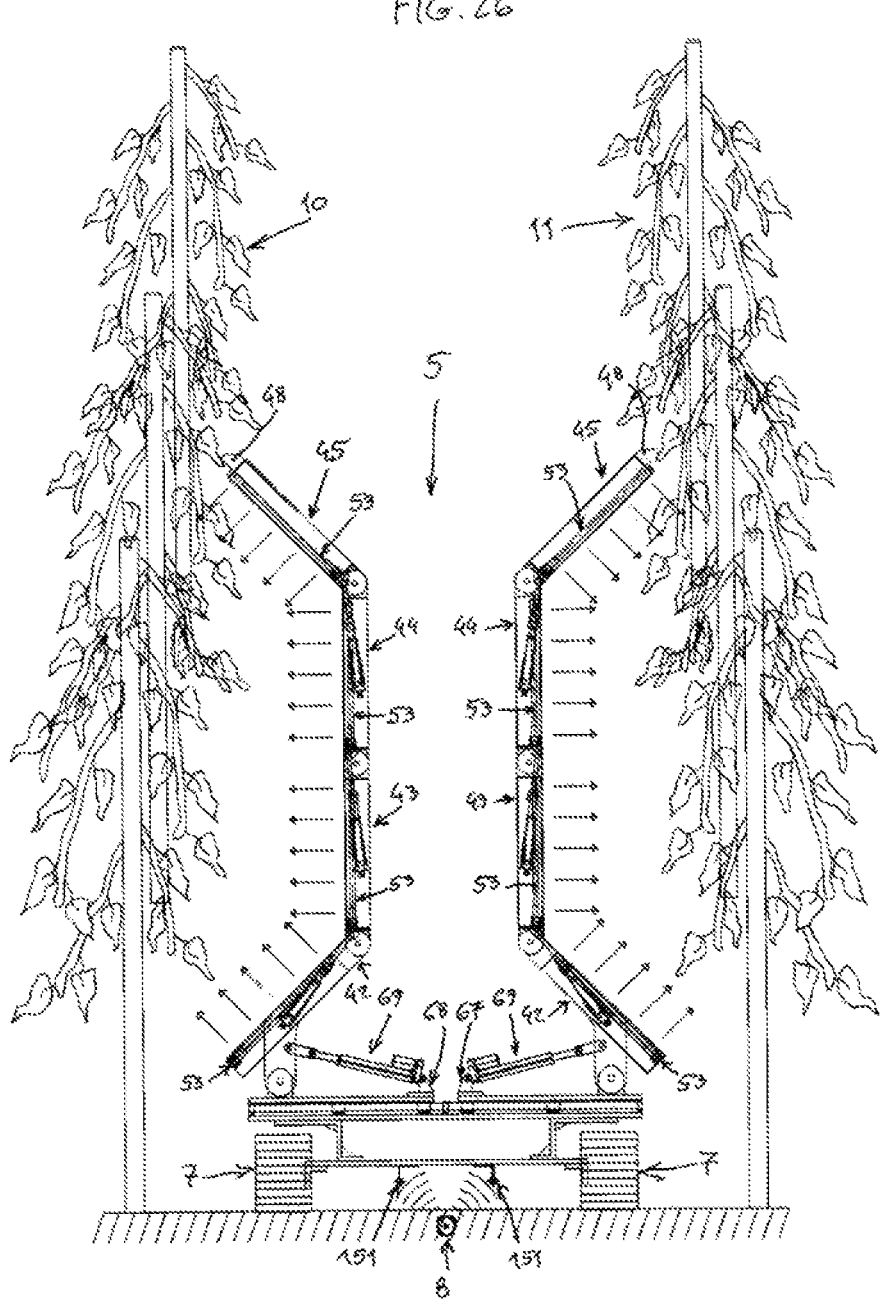
Figure 27:
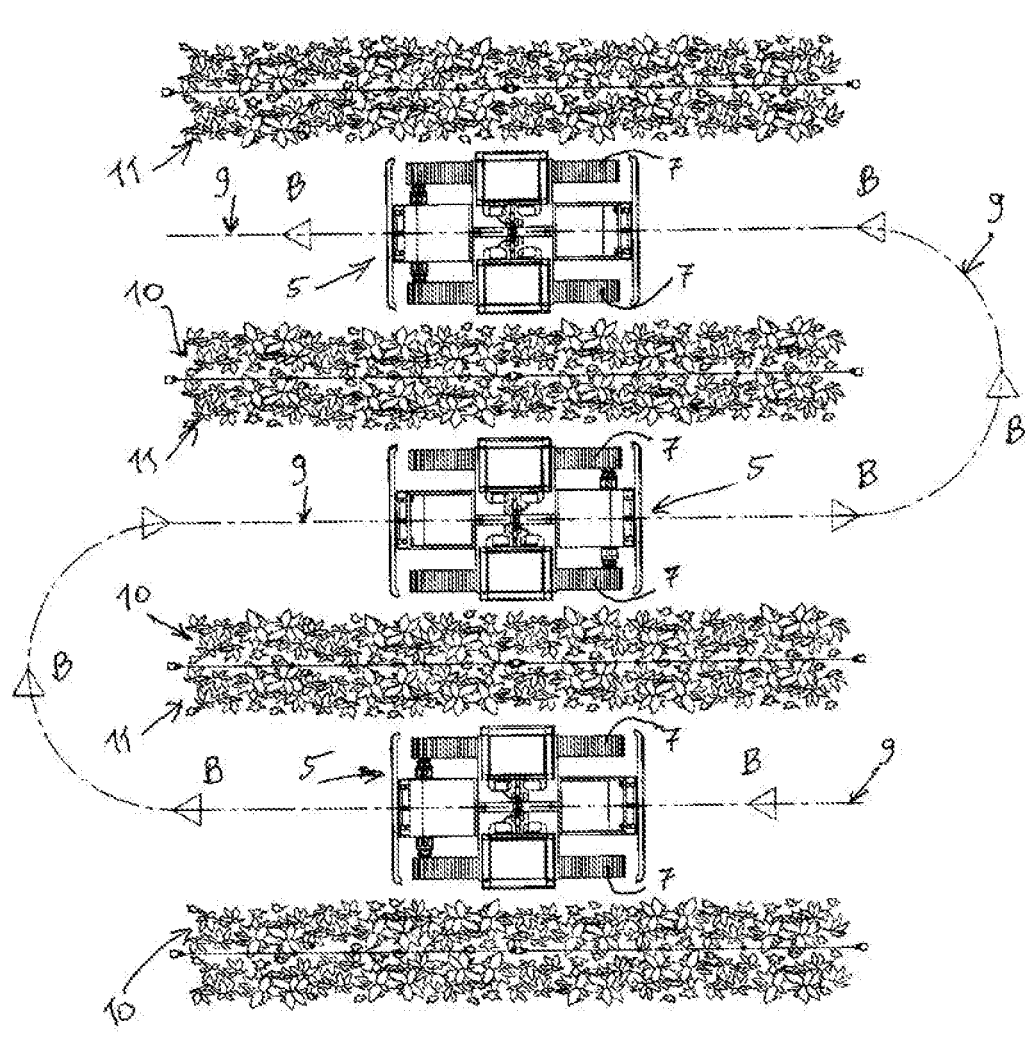
Figure 28:
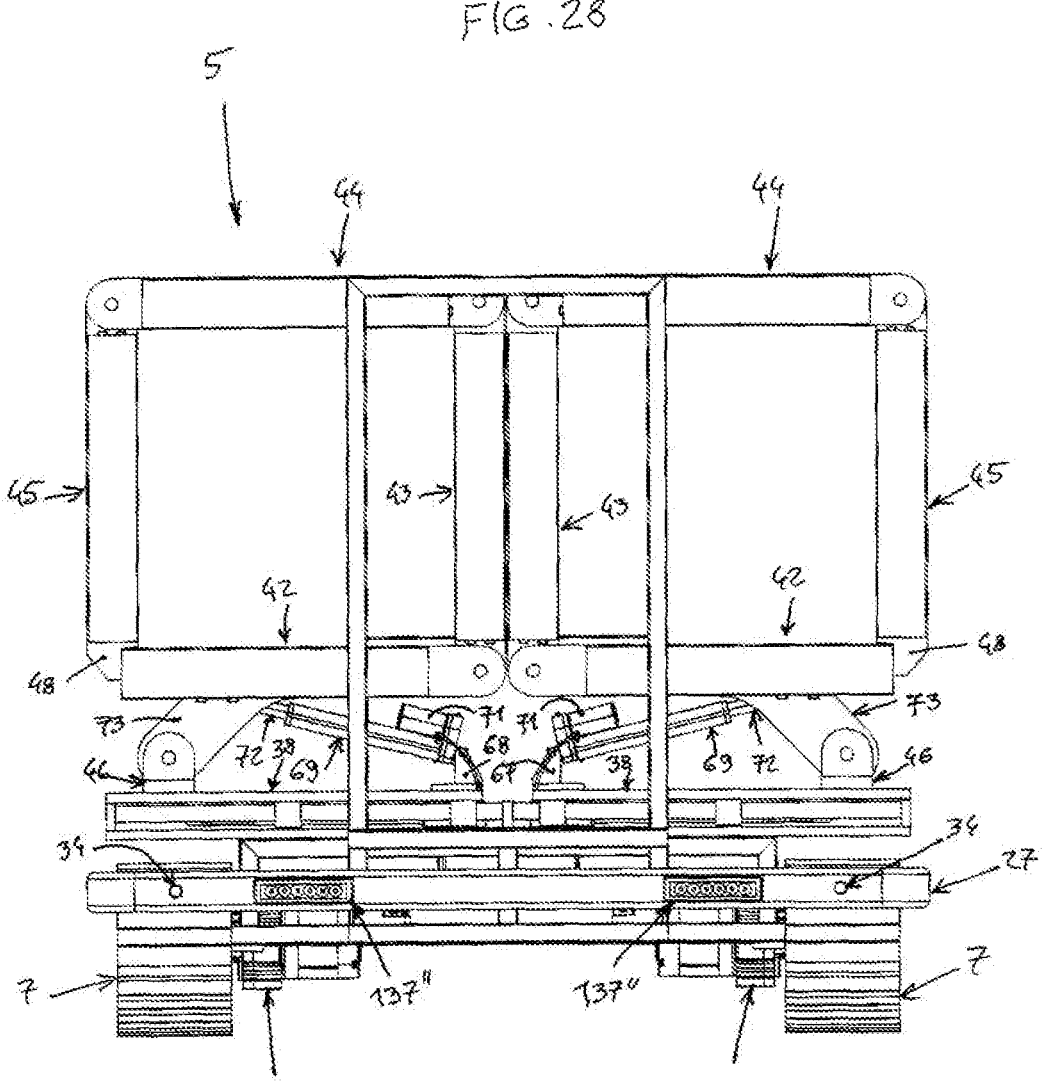
Figure 29:
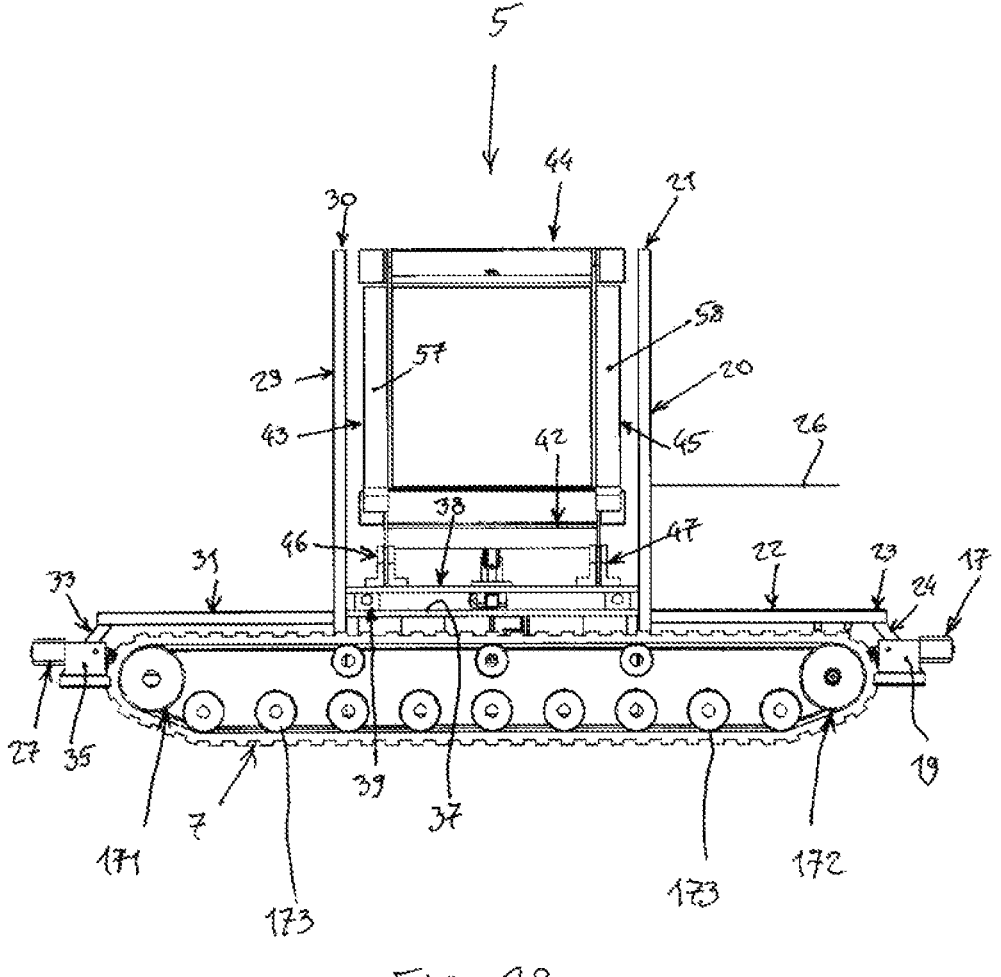
Figure 30:
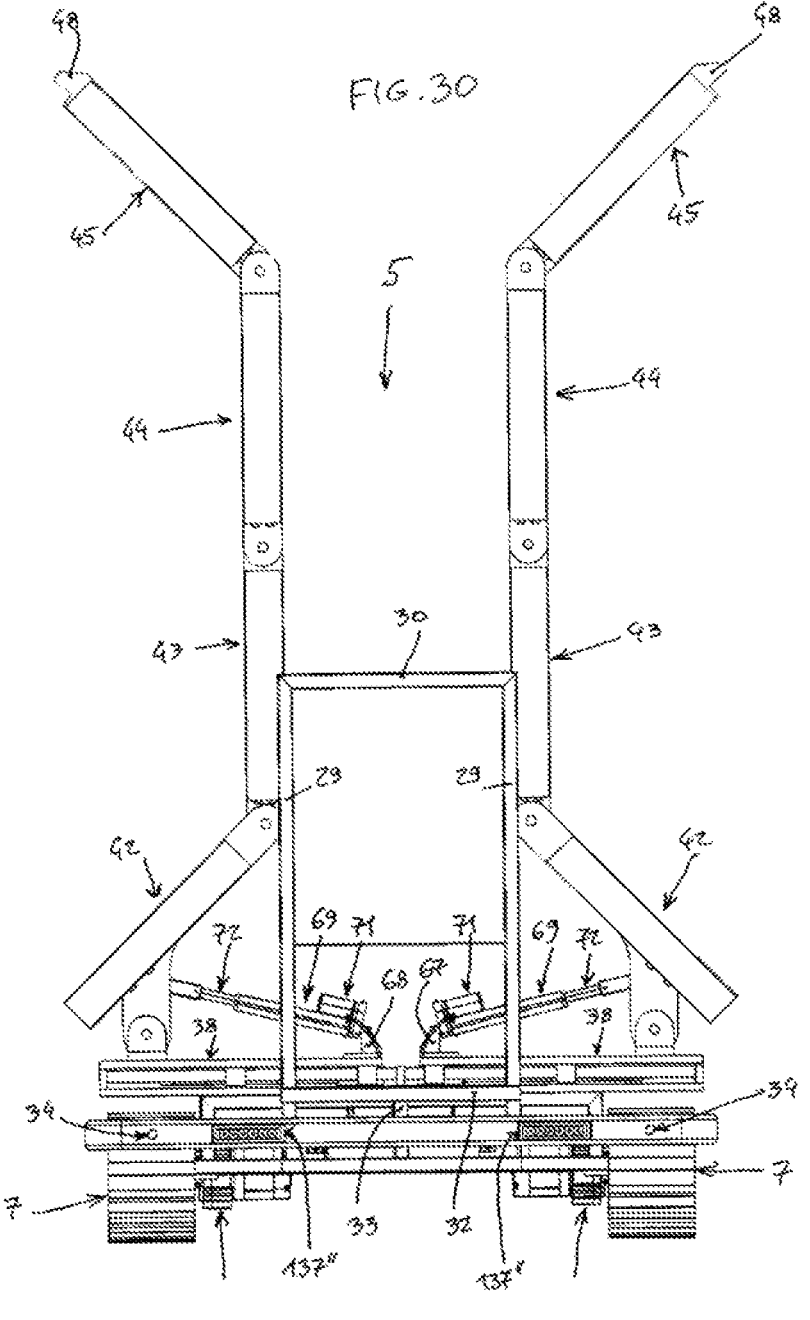
Figure 31:
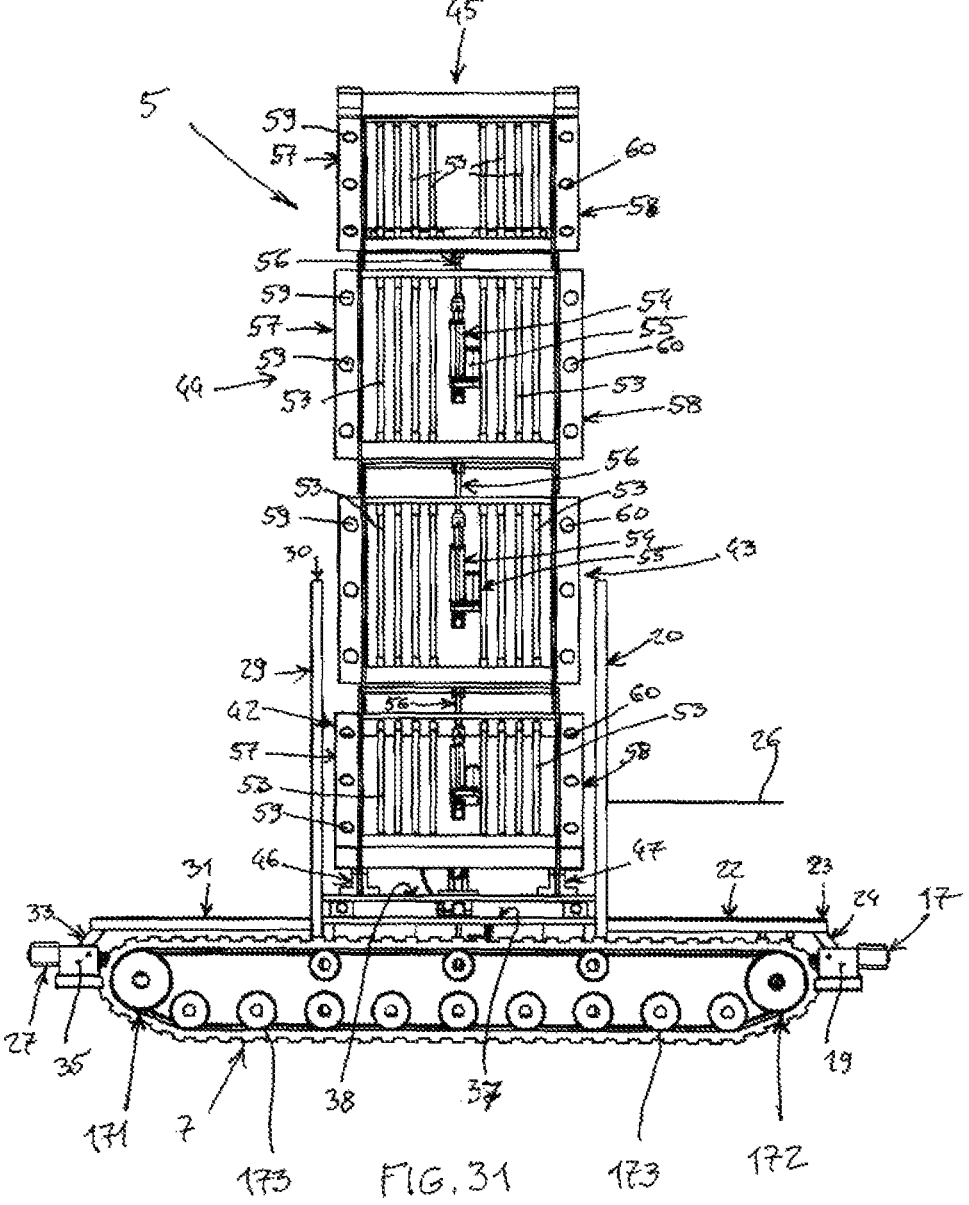
Figure 32:
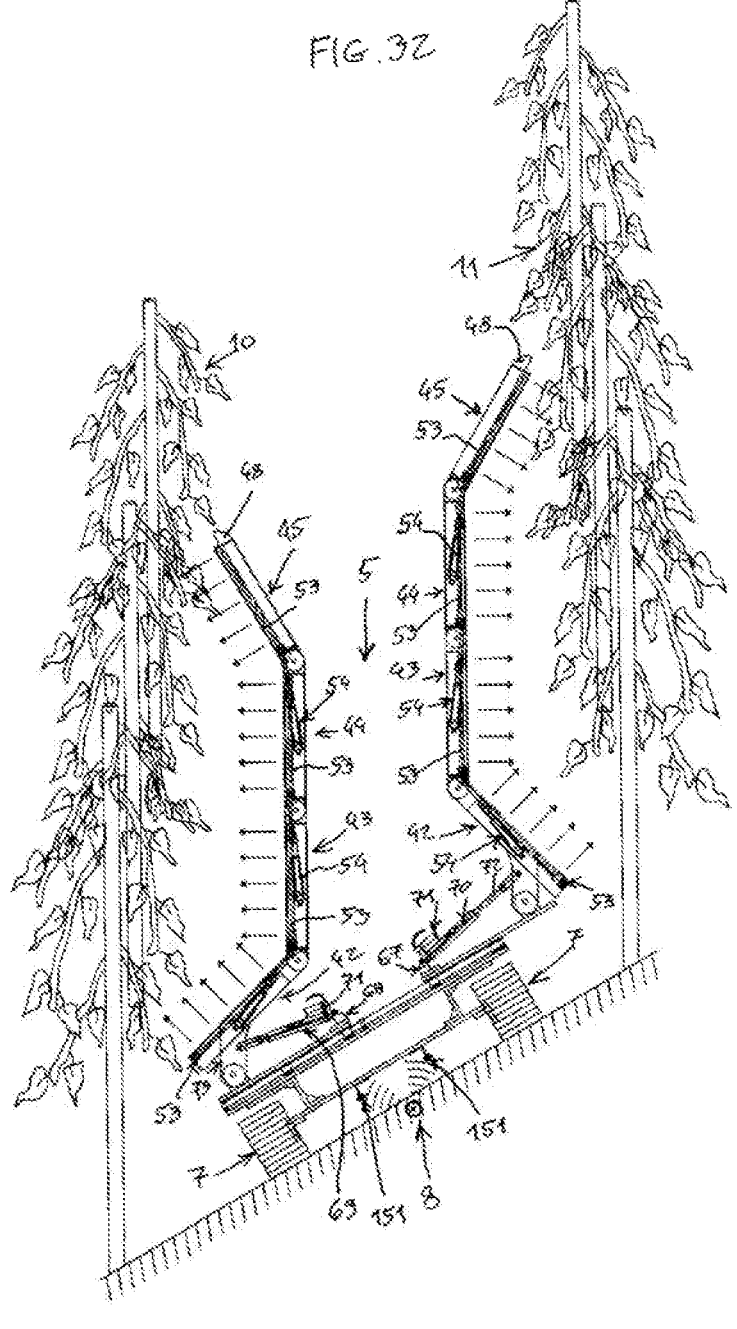
Figures 33, 34:
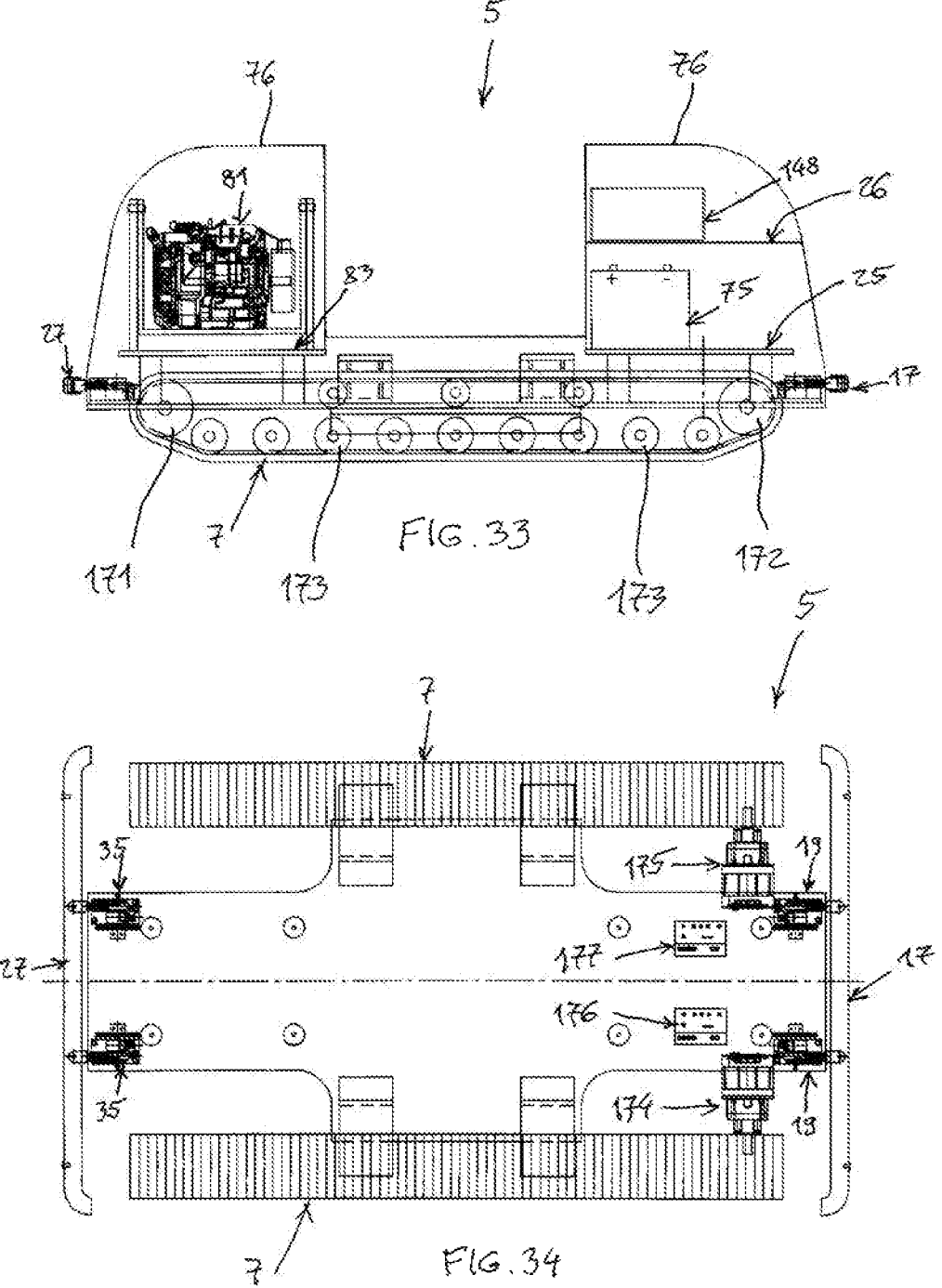
Figures 35, 36:
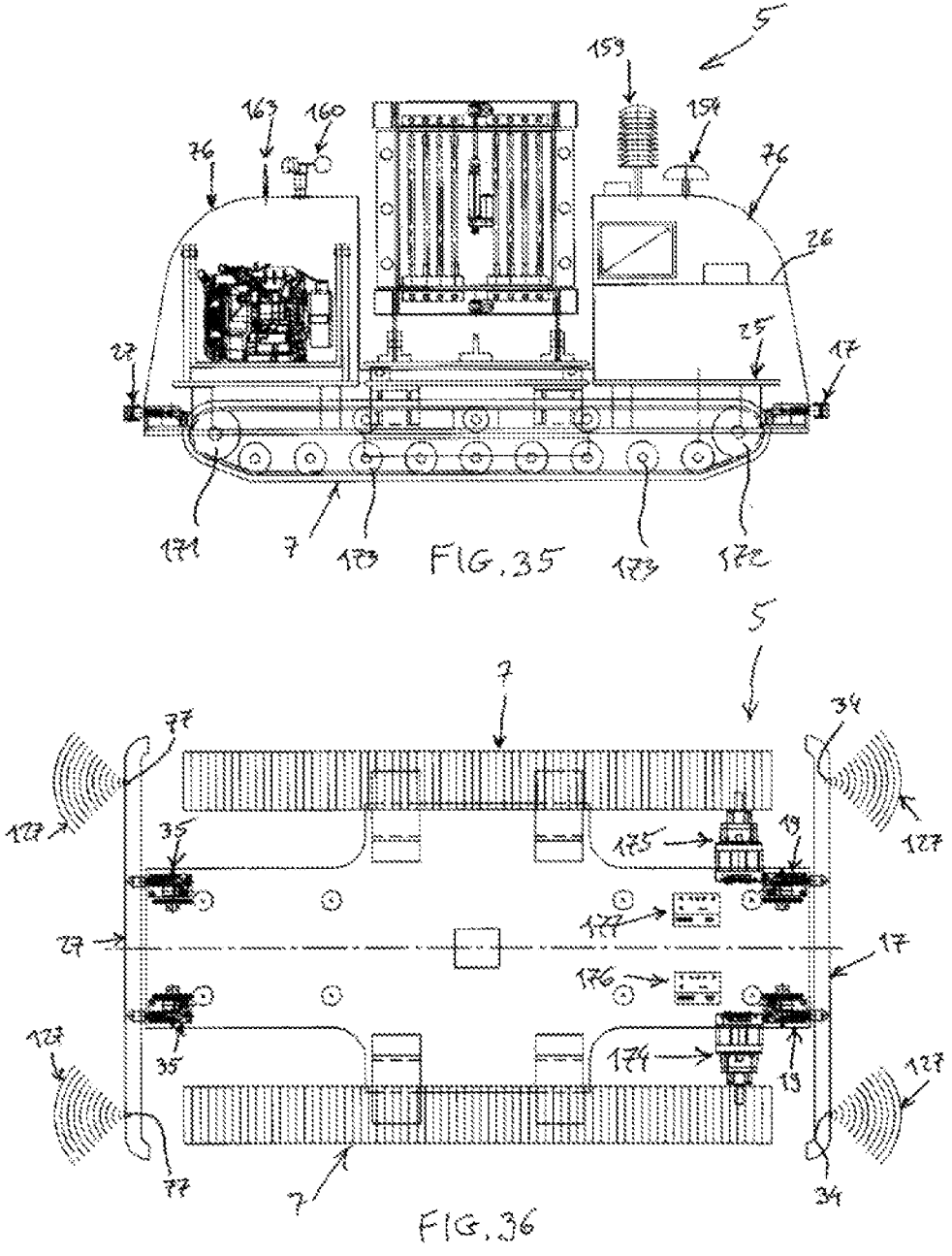
Figure 37:
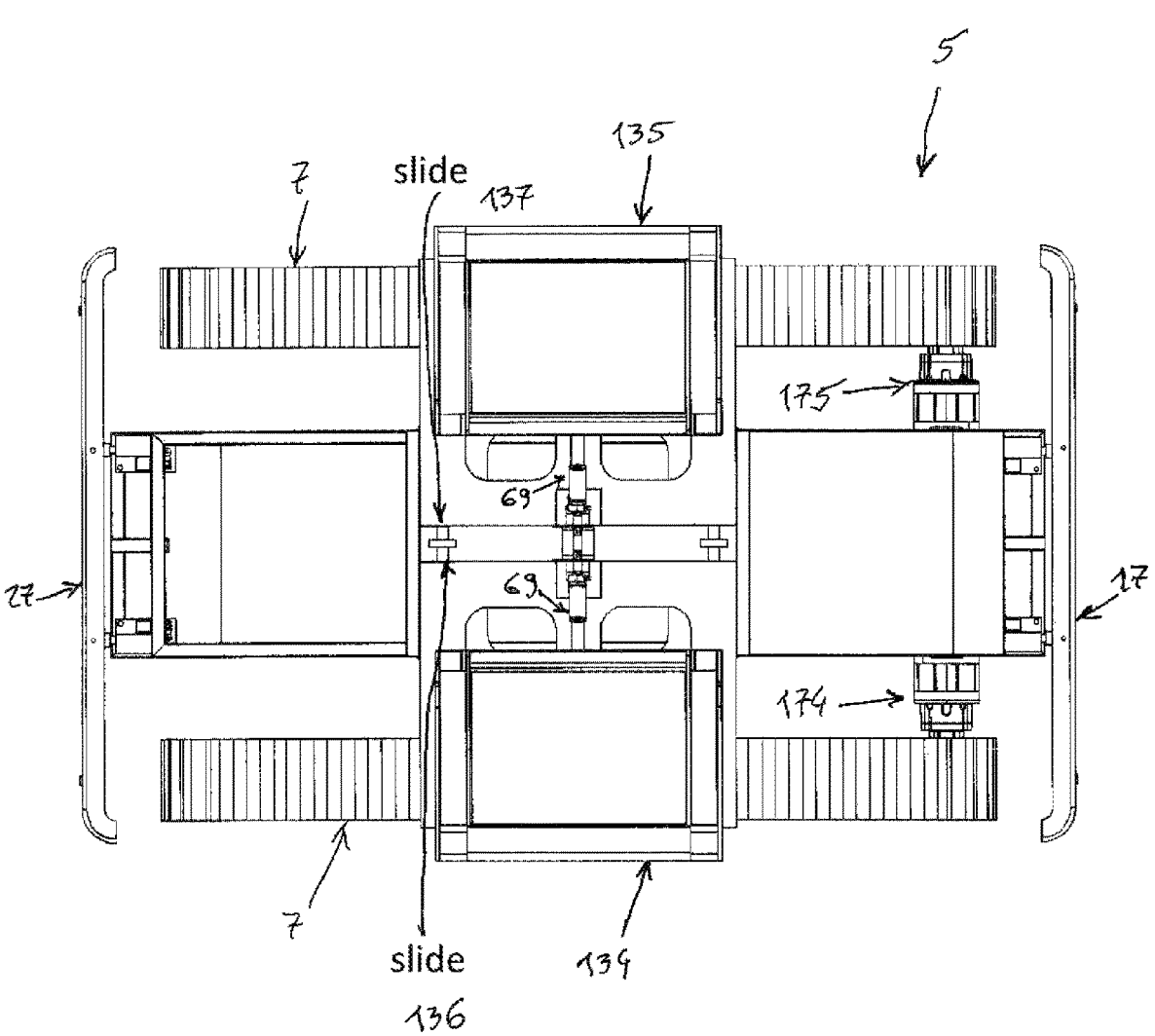
Figure 38:
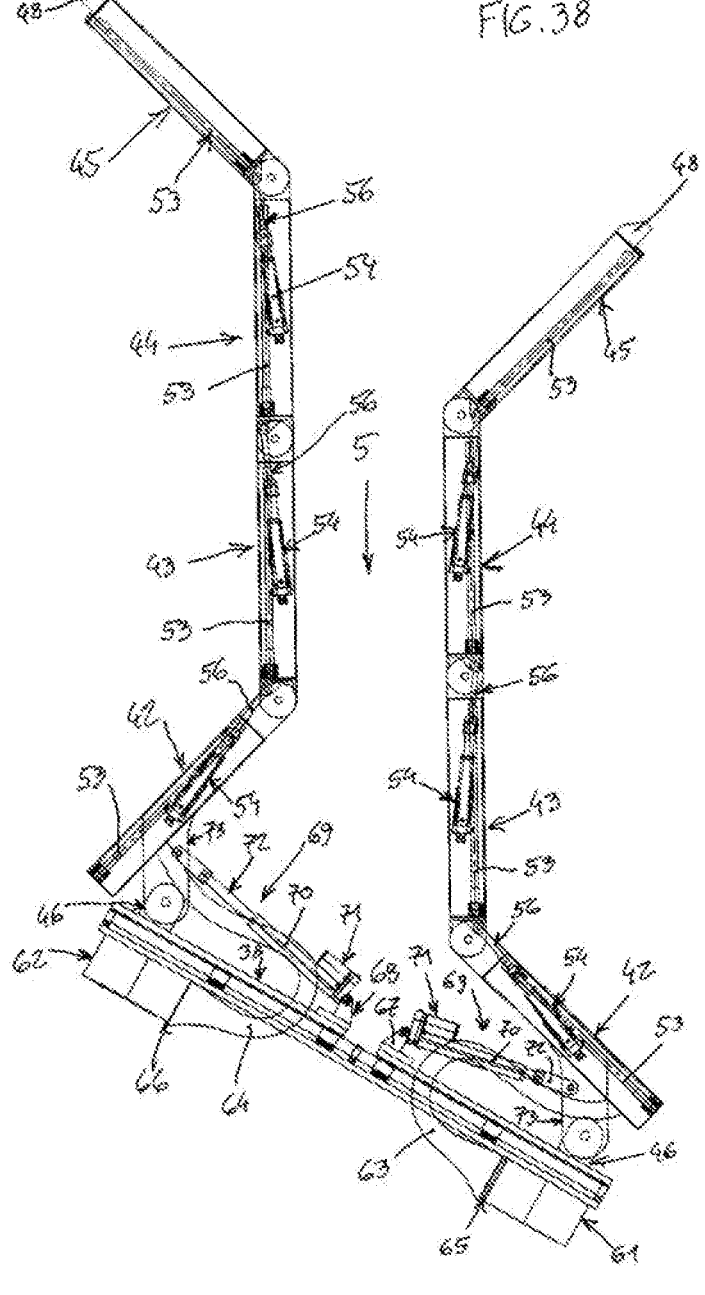
Figure 39:
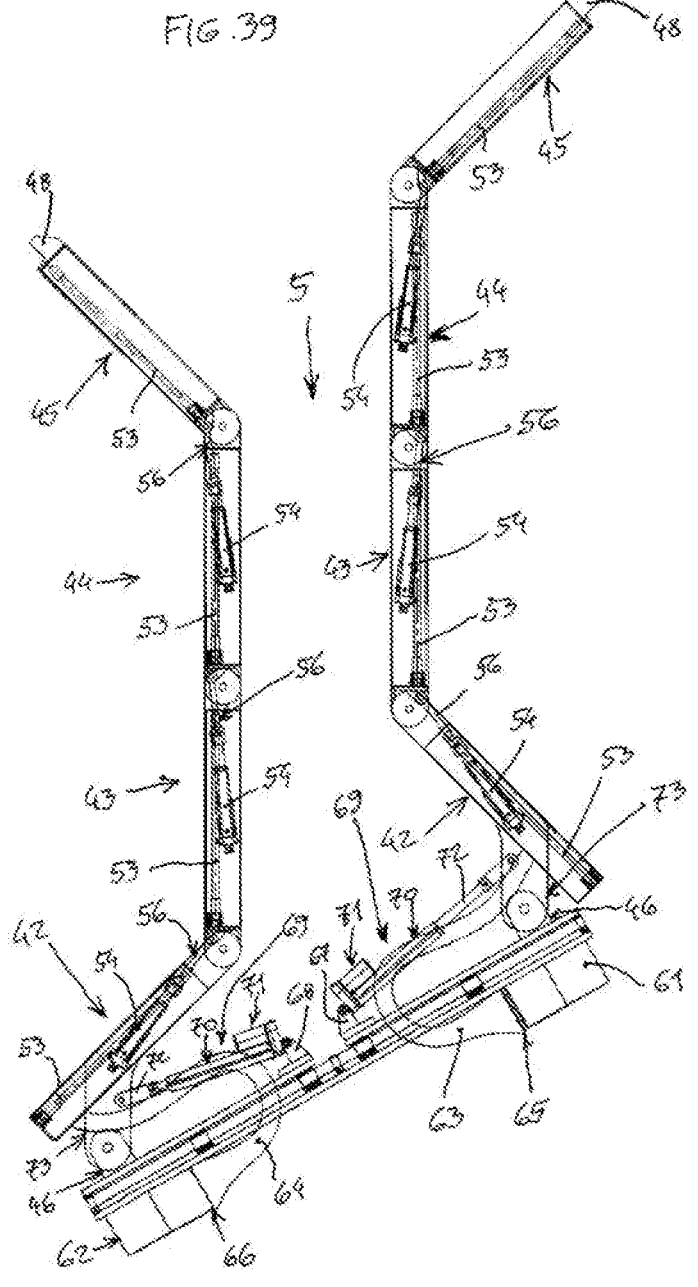
Figure 45A:
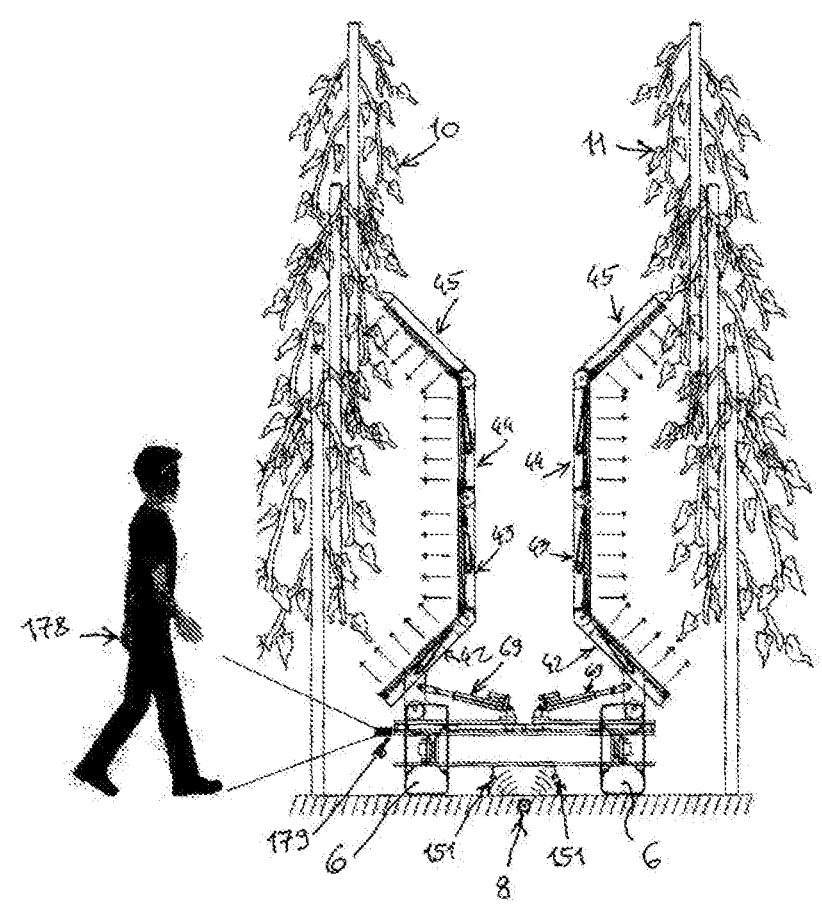
Figure 45B:
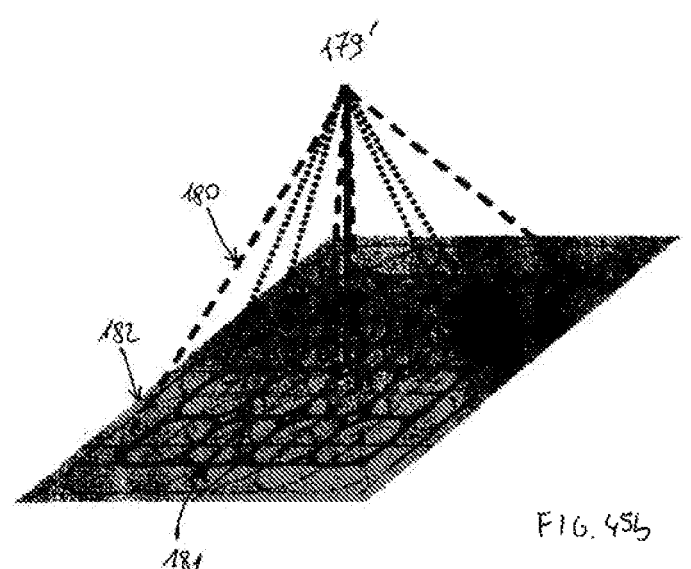

FIG. 6 shows a plan view of several rows of vines of vineyards, with an electric wire which is put underground acting as a transmission antenna in a central position between a row and another one, in order to guide the movement of each movable apparatus which is utilized, and which wire is shaped in a manner to define the pre-established guide path of the same movable apparatus, for the entire extent of the rows of the vines to be treated. Moreover, between each pair of rows is shown a movable apparatus which displaces itself along the pre-established guide path;

FIG. 7 shows a rear view of the movable apparatus of the FIG. 1, in the assembled condition and displaced in the rest position thereof, which isn't arranged among the rows of the vines of the vineyards to be treated;

FIG. 8 shows a side view of a side of the movable apparatus of the FIGS. 1 and 7, in the assembled condition and displaced in the rest position thereof, which isn't disposed among the rows of the vines of the vineyards to be treated;

FIG. 9 shows a back view of the movable apparatus of the FIG. 2, in the assembled condition and displaced in the operative position thereof, which isn't disposed among the rows of the vines of the vineyards to be treated;

FIG. 10 shows a side view of a side of the movable apparatus of the FIGS. 2 and 9, in the assembled condition and displaced in the operative position thereof, which isn't disposed among the rows of the vines of the vineyards to be treated;

FIG. 11 shows a side view from a side of the base structure of the apparatus according to the invention, which isn't disposed among the rows of the vines of the vineyards to be treated, and into which there are visible some inner component parts of the same structure, suitable to provide for the traction of the apparatus, and wherein in the apparatus there aren't applied the central component parts utilized for determining the anti-parasitic treatment of the vines;

FIG. 12 shows a plan view of the base structure of the FIG. 11, with all the inner component parts thereof suitable to provide for the traction of the apparatus;

FIG. 13 shows a plan view of the base structure of the FIG. 12, with all the inner component parts suitable to provide for the traction of the apparatus, which structure is disposed in the space comprised between two rows of vines parallel and spaced away from each other;

FIG. 14 shows a side view from a side of the movable apparatus according to the invention, in the assembled condition and displaced in the rest position thereof, which isn't disposed among the rows of the vines of the vineyards to be treated, and with some of the inner component parts of the apparatus suitable to determine the guide of this latter along the pre-established path among the rows of the vines;

FIG. 15 shows a plan view of the movable apparatus of the FIG. 14, with some of the inner component parts suitable to determine the guide of the apparatus along the established path among the rows of the vines, and with the wheels which are steered by these inner component parts;

FIG. 16 shows a plan view of the movable apparatus of the FIG. 15, with some of the inner component parts suitable to determine the guide of the apparatus along said pre-established path and with the wheels which aren't steered;

FIG. 17 shows a plan view of the movable apparatus of the FIGS. 14-16, in the assembled condition and displaced in the rest position thereof, with some of the inner component parts of the FIG. 16, performing the same function;

FIG. 18 shows a side view from a side of the base structure of the apparatus according to the invention, which isn't disposed among the rows of the vines of the vineyards, and into which it is visible the supply system of some of the electric and mechanical component parts of the same structure, and wherein in the apparatus there aren't applied the central component parts utilized for determining the anti-parasitic treatment of the vines;

FIG. 19 shows a plan view of the base structure of the movable apparatus of the FIG. 18, wherein it is visible the supply system of other electric and mechanical component parts of the same structure;

FIG. 20 shows a plan view of the complete apparatus of the FIG. 18, wherein it is visible the supply system of other electric and mechanical component parts and for generating an air flow of the same apparatus;

FIG. 21 shows a plan view of the apparatus of the FIG. 20 positioned on to the ground delimited between two rows of vines parallel and spaced away from each other;

FIG. 22 shows a back perspective view of another embodiment of the movable apparatus according to the invention, in the assembled condition and displaced in the rest position thereof, which isn't disposed among the rows of the vines of the vineyards to be treated;

FIG. 23 shows a back perspective view of the movable apparatus of the FIG. 22, in the assembled condition and displaced in the operative position thereof, which isn't disposed among the rows of the vines of the vineyards to be treated;

FIG. 24 shows a back view of the movable apparatus of the FIG. 22, in the assembled condition and displaced in the rest position thereof, which is disposed and laid on to a flat ground delimited between the rows of two vines of the vineyards arranged parallel and spaced away from each other;

FIG. 25 shows a back view of the movable apparatus of the FIG. 22, in the assembled condition and displaced in the operative position thereof, which is disposed and laid on to a flat ground delimited by the rows of two vines of the vineyards arranged parallel and spaced away from each other with a wide determined space;

FIG. 26 shows a back view of the movable apparatus of the FIG. 22, in the assembled condition and displaced in the operative position thereof, which is disposed and laid on to a flat ground delimited by the rows of two vines of the vineyards arranged parallel and spaced away from each other with a space smaller than that one of the rows of the FIG. 25;

FIG. 27 shows a plan view of different rows of the vines of the vineyards, with an electric wire put underground acting as a transmission antenna between a row and another one, in order to guide the movement of the movable apparatus of the FIG. 22, and which wire is shaped in a manner to define the pre-established guide path of the same movable apparatus, for the entire extent of the rows of the vines to be treated;

FIG. 28 shows a back view of the movable apparatus of the FIG. 22, in the assembled condition and displaced in the rest position thereof, which isn't disposed among the rows of the vines of the vineyards to be treated;

FIG. 29 shows a side view of a side of the movable apparatus of the FIGS. 22 and 28, in the assembled condition and displaced in the rest position thereof, which isn't disposed among the rows of the vines of the vineyards to be treated;

FIG. 30 shows a back view of the movable apparatus of the FIG. 22, in the assembled condition and displaced in the operative position thereof, which isn't disposed among the rows of the vines of the vineyards to be treated;

FIG. 31 shows a side view of a side of the movable apparatus of the FIGS. 23 and 30, in the assembled condition and displaced in the operative position thereof, which isn't disposed among the rows of the vines of the vineyards to be treated;

FIG. 32 shows a back view of the central component parts of the movable apparatus of the FIG. 22, in the assembled condition and displaced in the operative position thereof, and in the fully opened step, which is disposed between two rows of the vines and disposed on to a ground which is inclined leftwards with respect to the horizontal flat ground;

FIG. 33 shows a side view from a side of the base structure of the movable apparatus of the FIG. 22, which isn't disposed among the rows of the vines of the vineyards to be treated, and in to which there are visible some inner component parts of the same structure, suitable to determine the traction of the apparatus and wherein in the apparatus there aren't applied the central component parts utilized for providing the anti-parasitic treatment of the vines;

FIG. 34 shows a plan view of the base structure of the FIG. 33, with all the inner component parts suitable to determine the traction of the apparatus;

FIG. 35 shows a side view from a side of the movable apparatus of the FIG. 22, in the assembled condition and displaced in the rest position thereof, which isn't disposed among the rows of the vines of the vineyards to be treated, and with some inner component parts of the apparatus, suitable to determine the guide of this latter along the pre-established path among the rows of the vines;

FIG. 36 shows a plan view of the movable apparatus of the FIG. 35, with some inner component parts suitable to determine the guide of the apparatus along the pre-established path among the rows of the vines;

FIG. 37 shows a plan view of the movable apparatus of the FIG. 22, wherein it is visible the supply system of the electric and mechanical component parts and the parts generating a flow of air of the same apparatus;

FIG. 38 shows a back view of the central component parts of the movable apparatus, displaced in the operative position and in the fully opened step thereof, and wherein the central parts are disposed on to a ground which is inclined leftwards with respect to the horizontal flat ground;

FIG. 39 shows a back view of the central component parts of the FIG. 38, displaced in the operative position and in the fully opened step, and wherein the central component parts are disposed on to a ground which is inclined rightwards with respect to the horizontal flat ground;

FIGS. 40-44 show the block diagram of the electric and electronic component parts of the movable apparatus according to the invention, and the manner in which such component parts interact for determining the driving of the electric and electronic component parts of the apparatus referred to, in order to provide for displacing this latter along the pre-established paths among the different rows of the vineyards and for determining the anti-parasitic treatment of all the component parts of the vines;

FIG. 45 shows a back view of the apparatus according to the invention, provided with a device for detecting the presence of persons near at least one of the rows of the vines where the apparatus displaces itself.

With reference to the above specified Figures, it is described the movable apparatus 5 according to the present invention, with automatic/autonomous operation, slidable along pre-established paths among rows of vineyards, for the anti-bacterial and fungicide and anti-parasitic treatment in general of the same vineyards, and in particular of the leaves, the trees and the bunches of grapes, instead of the traditional treatments with the anti-parasitic and fungicide chemical products which are sprayed on to the leaves, the trees and the bunches of grapes in the traditional manner.

Moreover, this movable apparatus lends itself for the anti-bacterial and fungicide treatments also for fruits-trees or for grounds for cultivating vegetables. The movable apparatus 5 hereinafter described utilizes a set of devices emitting ultraviolet rays having a germicide function, which are constituted substantially by low pressure lamps, applied and supported on to some component parts of the apparatus as it will be described, which lamps emit an ultraviolet light, the electromagnetic radiation of which has wavelengths which are shorter than the visible light.

The ultraviolet radiation (UVC) comprises various ranges of wavelengths, of which the range of the short wavelength is considered to be germicide and in particular at the wavelength of 2,537 Angstrom (254 nm) the ultraviolet radiation destroys the molecular links of the DNA of the micro-organisms, by producing dymers of thymine in the DNA thereof, which destroy completely them by making harmless such micro-organisms, or by preventing the development and the growth and reproduction thereof. The ultraviolet radiation lamps utilized and applied in the movable apparatus 5 according to the invention, in particular, generates for each lamp an ultraviolet radiation with a wavelength comprised preferably between 100 nm and 280 nm and a total power for each set composed of 8 lamps comprised between 48 and 170 Watt, and the electronic ignition circuit (also called ballast) thereof has a driving frequency for a lamp comprised from 32 up to 80 KHz., and under these conditions the ultraviolet radiation directed against the micro-organisms to be destroyed and/or neutralized performs an effective germicide action and does not produce damages to the vineyards and the leaves, the trees, the vine shoots and the bunches, which therefore may mellow in a natural manner, so as to produce wines of high quality and satisfying taste.

Each movable apparatus 5 according to the invention is made advantageously with two different embodiments, the first of which is visible from the FIGS. 1-21 and 38-39, which will be described later on in detail, and wherein such movable apparatus 5 is supported by a set of lower wheels 6 applied to the apparatus and slidable on to the grounds delimited among the different rows of vines, and the second embodiment of which is visible from the FIGS. 22-37 and 38-39, which will be also described later on in detail, and wherein such movable apparatus is supported and slidable on to these grounds by means of two side tracks 7 applied to the same apparatus. Besides, the movable apparatus of each one of such embodiments is slidable on to the grounds delimited among the different rows of vines, along a pre-established path passing through the same grounds, which path is defined by an electric wire put underground acting as a transmission antenna, and connected to an external electric supply line (not indicated), of which in the FIG. 6 it appears visible the continuous path 9 passing through each pair of rows of vines adjacent to each other 10 and 11 and acts for guiding as it will be described the unidirectional sliding (arrow A) of the movable apparatus 6 with the wheels. In turn, in the FIG. 27 it appears visible the continuous path 9 passing through each pair of rows of vines adjacent to each other 10 and 11, which acts for guiding as it will be described the unidirectional sliding (arrow B) of the movable apparatus with side tracks 7.

With reference to the FIG. 1, it is shown a movable apparatus 5 according to the invention in a back perspective view, in the assembled condition and displaced in the rest position thereof, in which it does not perform the function of the germicide treatment for the parasites infesting the vines and their component parts, and such apparatus is provided with lower wheels 6 slidable on to the ground and isn't disposed among the rows of the vines of the vineyards to be treated. In the FIG. 2 it is noted the movable apparatus 5 of the FIG. 1 in a back perspective view, in the assembled condition and displaced in the operative position thereof, in which it performs said function of the germicide treatment, and such apparatus is also provided with lower sliding wheels 6 and isn't disposed among the rows of the vines to be treated.

Furthermore, in the FIG. 10 it is noted the movable apparatus 5 of the FIG. 2 in a side view from a side, in the assembled condition and also displaced in the operative position thereof, in which it still performs the function of the germicide treatment and is also provided with lower sliding wheels 6 and isn't disposed among the rows of the vines to be treated. Moreover, in the FIG. 7 it is noted the movable apparatus 5 of the FIG. 1 in a back view, in the assembled condition and displaced in the rest position thereof, and such apparatus is represented schematically without the lower sliding wheels and isn't disposed among the rows of the vines to be treated.

Besides, in the FIG. 9 it is noted the movable apparatus 5 of the FIG. 2, in a back view, in the assembled condition and displaced in the operative position thereof, in which it still performs the function of the germicide treatment, and is shown without the lower sliding wheels 6 and isn't disposed among the rows of the vines to be treated. It is now described how the movable apparatus 5 be structured and operates, when it is displaced in the rest position of the FIGS. 1 and 7, and when it is displaced in the operative position of the FIGS. 2, 9 and 10. In particular, as it is visible from these Figures, it is noted that the movable apparatus 5 is substantially constituted by an underlying horizontal base structure 12, constituted by a flat shaped metallic plate (see also the FIG. 12) arranged and secured in the central area of the apparatus and which is extended for a portion of the length and width of the same apparatus, and is shaped with a front longitudinal portion 13 integral with an identical back longitudinal portion 14, which longitudinal portions are restricted and shorter than the width of the apparatus, and such flat plate 12 is also shaped with a first side transversal portion 15 and with a second side transversal portion 16, integral therewith and with the front portion 13 and the back portion 14, and which are restricted and shorter than the length of the apparatus. On to the upper surface of the flat plate 12 there are also secured into different positions the component parts which will be described, and which serve to determine the traction of the movable apparatus, by means of both the driving in rotation of the respective wheels 6 and the steering of the same wheels into different positions thereof, depending on the trend of the pre-established path along which the movable apparatus should move itself. On to the flat plate 12 there are also secured several additional component parts which will be described, and which are disposed and joined together in overlapped positions and constitute the central component parts of the apparatus, utilized for determining the anti-parasitic treatment as it will be described.

In the front part of the apparatus the front longitudinal portion 13 of the flat plate 12 is also fixed to a lengthened and transversal metallic section bar 17, acting as a bumper, and the fixing occurs by means of two longitudinal rectilinear members 18 (of which only one is visible in the FIGS. 8 and 10), which in turn are fixed to the relative side flanks of said front portion 13 and are projected outwards from this latter, in a manner that the transversal front bumper 17 be projected frontwards the movable apparatus and the front wheels 6 and does not interfere with these constructive elements. In turn, such front bumper 17 is provided with a set of ultrasound sensors (not visible), which are autonomous and installed in the front surface of the bumper 17 and suitable to emit with a continuous sequence some ultrasound signals for detecting the presence of persons and/or any obstacle in front of the apparatus, during its advancement along the pre-established path, and these ultrasound sensors are connected operatively with a data control and processing unit installed in the present apparatus (not visible) and supplied by an autonomous electric supply of the apparatus, which control unit is provided for activating and setting the various operations to be performed by the apparatus, as well as for stopping the operation of the same apparatus.

In particular, the control unit is arranged in a manner that as long as the ultrasound sensors do not detect the presence of persons and/or obstacles of various kind in front of the front bumper 17 of the apparatus which moves itself in a determinate advancement direction, it does not receive from the ultrasound sensors some return ultrasound signals, produced by detecting the presence of these persons and/or obstacles, and under this condition the movable apparatus 5 continues to advance in the same advancement direction along the pre-established path, and permits the anti-parasitic treatment of the vines, the bunches and their relative component parts.

Moreover, such control unit is set in such a manner that in the case in which such ultrasound sensors detect the presence of persons and/or obstacles in front of the front bumper 17, it receives some relative return ultrasound signals produced by detecting these persons and/or obstacles, and under this condition the control unit controls the automatic stopping of the advancement of the movable apparatus 5 and the switching on an acoustic or optical alarm signaling device (not visible), which control unit provides for informing from a remote control with sms or E-mail the operator of the apparatus of this situation. At this point, the operator who has been informed will intervene for displacing the person(s) and/or will displace the obstacles in front of the apparatus, and under this condition the ultrasound sensors do not more detect such persons and/or obstacles and do not more transmit return ultrasound signals to said control unit, so that this latter automatically controls the advancement of the movable apparatus 5 and switches off the alarm signaling device. In the case in which in front of the front bumper 17 there are present some obstacles of various kind in a lower position than that one of the ultrasound sensors, these latter do not detect the presence of such obstacles and do not emit return ultrasound signals, and under this condition the front bumper 17 bangs against such obstacles, thereby stopping the advancement of the movable apparatus 5. This condition is detected by two electromechanical devices 19, only one of which is visible in the FIGS. 1, 2 and 8, which devices are fixed to the rear surface of the front bumper 17 and each one of which is formed by at least an electric switch (not indicated) connected in the electric circuit of the movable apparatus 5, in which there are connected also the electric motors for driving the wheels 6 of the apparatus (which will be described later on), so that the light elastic displacement of the front bumper 17 against the obstacle provides for actuating at least an electric switch, with consequent stopping of the rotation of the electric motors and stopping the advancement of the movable apparatus and generation of an acoustical or optical alarm signal. Then, in this case the operator removes the obstacle (and the bumper returns autonomously in the position by means of some springs), and exerts a light push of the front bumper 17 toward either one of the electromechanical devices 19, thereby actuating again the electric switch in the switching on position in which the electric motors are actuated in rotation again, by re-establishing the advancement of the movable apparatus 5 and by switching off the acoustical or optical alarm device. Such electromechanical devices 19 are connected operatively also to the microprocessor controlled main power card which, each times the movable apparatus 5 is stopped for the presence of the persons and/or obstacles in front of the front bumper 17, provides for controlling automatically the switching off of the lamps emitting the ultraviolet radiation against the component parts of the vineyard, which will be described later on, and, as soon as the persons or the obstacles have been removed, it provides for re-establishing the operation of the ultraviolet lamps. On to each one of the longitudinal members 18 is also fixed a vertical rectilinear metallic section bar 20, which is extended upward for a determinate height, in a front and approached position with respect to the central component parts of the apparatus 5, and such vertical section bars 20 have the same length and are arranged parallel to each other (in the FIGS. 8 and 10 a single vertical section bar 20 is visible), and they are joined at their upper free end portions with at least an horizontal rectilinear metallic section bar 21, thereby forming a vertical and parallelepiped supporting structure (not indicated). Each one of the vertical section bars 20 is secured, at about its middle, with the free end portion of a correspondent additional horizontal rectilinear metallic section bar 22, which is extended frontwards said supporting structure for a determined length, in a manner not to be extended beyond the relative front bumper 17, and such horizontal section bars 22 have the same length and are arranged parallel to each other (in the FIGS. 8 and 10 a single horizontal section bar 22 is visible), and they are joined at their front end portions by at least a horizontal rectilinear metallic section bar 23, thereby forming a parallelepiped and horizontal supporting structure (not indicated). In turn, the horizontal section bar 23 is fixed, in its middle, with the upper end portion of a short oblique rectilinear metallic section bar 24, the other end portion of which is fixed to the upper surface of the front bumper 17, in a manner to maintain in this way said vertical and horizontal supporting structures on a stationary and stable condition.

Between the front longitudinal portion 13 of the flat plate 12 and such horizontal supporting structure is therefore defined a space, into which there are housed the component parts which will be described, which are disposed and fixed on to the upper surface of said front portion 13, and are then covered from both sides by a covering and closing structure (not indicated), which is fixed laterally against both the relative horizontal section bars 22 and the front portion 13 of the flat plate 12. In turn, on the horizontal supporting structure is also applied a horizontal supporting metallic plane 25 (see the FIGS. 1 and 2), which is disposed on to the horizontal section bars 22 and 23 and secured thereto for the entire extension thereof, thereby defining another space, overlapped to the preceding space, and on to such supporting plane 25 is then disposed and fixed another component part of the apparatus 5, which will be hereinafter described. Finally, on to this another space is then applied, at a determinate spacing in the vertical direction, still another horizontal supporting metallic plane 26, having smaller dimensions than the supporting plane 25, which plane is adequately fixed on the the vertical supporting structure, thereby defining another overlapped space and on to such further supporting plane 26 is then disposed another component part of the apparatus, which will be described later on. Finally, all these further spaces are than covered laterally and on the upper part thereof by the covering and closing structure (not indicated), which is fixed on to both the sides of these spaces and on to the upper part thereof. In the back part of the movable apparatus 5 there are applied the same component parts of those ones applied in the front part of the same apparatus, in a position symmetrical with respect to these latter, and these back component parts are marked with different reference numerals and are constituted substantially by a back metallic bumper 27, fixed by two longitudinal rectilinear metallic members 28 to the relative side flanks of the back portion 14 of the flat plate 12, as well as by the parallelepiped and vertical supporting structure formed by the two vertical metallic section bars 29 spaced away and parallel to each other, which are joined at the upper part by the horizontal metallic section bar 30, and joined at the lower part to the relative longitudinal members 28, and these back component parts are also constituted by the parallelepiped and horizontal supporting structure formed by the two horizontal metallic section bars 31 fixed ad an end portion to the corresponding vertical section bars 29 and joined at the other end portion to the horizontal metallic section bar 32, which in turn is fixed at its middle to the back bumper 27 by means of the short oblique metallic section bar 33.

Also in this case, there are so defined a first lower space, between said back longitudinal portion 14 and said horizontal supporting structure, on to which it is applied a supporting metallic plane (not shown), by forming the overlapped second space, and these spaces are also utilized for supporting the component parts which will be described, and are covered by another identical covering and closing structure (not shown), fixed in the movable apparatus 5 like that previously described.

Like previously, also in this case the back bumper 27 is provided with ultrasound sensors 34 and two electromechanical devices 35, supported and connected electrically and operating in the same way of the analogous above mentioned component parts, and performing the same function thereof.

There are now described the various component parts forming the central component parts of the movable apparatus 5, which are utilized for determining the anti-parasitic treatment of the vines by means of the above mentioned ultraviolet radiation lamps.

The central component parts are substantially constituted in part by a set of metallic section bars fixed on to the upper surface of the lateral transversal portions 15 and 16 of the flat plate 12, for the entire extent thereof, and forming a box-like casing 36 of parallelepiped shape, with a limited height, and which casing defines an open inner chamber (not indicated) housing a set of component parts which are supported and fixed on to the upper surface of such lateral portions 15 and 16, which are constituted, positioned and performing the functions as it will be described.

The box-like casing 36 is also delimited by a horizontal upper metallic flat plate 37, forming a plane parallel to said lateral portions 15 and 16, spaced away vertically above these latter, and which extends itself for the entire extent thereof. On top of this horizontal flat plate 37 it is applied a further horizontal metallic flat plate 38, parallel to and spaced away from said flat plate 37 and supported on to this latter by means of a set of angular metallic supports 39 and side supports 40, which flat plate 38 extends itself for the entire extent of the underlying flat plate 37, in a manner that between the flat plates 37 and 38 be defined an open inner chamber (not indicated).

In the horizontal flat plate 38 there are provided two through openings 41 of the same size (see the FIG. 2), the one from a side and the other one from the other side of the same plate, for making out the respectively underlying component parts fixed on to the correspondent lateral portion 15 and 16 of the flat plate 12, and for being able to have access from the top directly on to each one of these component parts. By referring now particularly to the FIGS. 1, 2 and 10, it is noted that on to the upper surface of the horizontal flat plate 38 there are applied and supported in an articulated manner, near a side edge of such flat plate 38, a first set of panels made and supporting the ultraviolet radiation lamps as it will be described, and near the other side edge of such flat plate 38 a second set of panels made and supporting the ultraviolet lamps, as it will be described. The panels of both the sets of supporting panels are identical and symmetrical and have the same size, and the panels of each set are arranged contiguous and articulated to each other as it will be described, and the panels of a set are applied into spaced away positions in the transversal direction of the movable apparatus 5 from the opposite panels of the other set. Moreover, into each one of the set such panels are provided with such a number that, when they are displaced in the vertical direction in the operative position thereof, they may reach the vines at the highest height thereof, for being so able to radiate with the ultraviolet light of the lamps almost all the component parts of the vines, included the bunches, for the effective anti-parasitic treatment of all these component parts with the use of such ultraviolet lamps. In the example described in the present movable apparatus 5, there are provided four panels for each set of panels, which are articulated to each other with their end portions in the manner which will be described, and can be displaced into different positions thereof by the mechanisms which will be described. Of course, the panels may be made also with numbers which are different than that which has been described, for performing always the same function, thus without departing from the protection field of the present invention.

The panels of each set may be displaced from a rest position thereof, illustrated in the FIG. 1, in which they are wound and enclosed in a position approached to each other, by forming a box-like structure, and do not determinate the anti-parasitic treatment of the vines, to an operative position thereof illustrated in the FIGS. 2 and 10, in which they are all extended in the direction of the height, when they are performing the function of the anti-parasitic treatment of thee vines, and form such operative position the panels may then be again displaced into said rest position thereof.

Furthermore, as visible from these Figures, in the present example all the panels of the two sets are shaped with a squared parallelepiped form and are constituted by a first, a second, a third and a fourth panel 42, 43, 44, 45 articulated to each other with the mechanisms which will be described hereinafter, and are displaceable reciprocally into different positions thereof, and for each set of panels the lower panel 42 is supported and articulated with its lower edge, as it will be described, on to two pairs of supporting brackets 46 and 47, identical and fixed on to the upper surface of the horizontal flat plate 38, in the longitudinal direction of such flat plate, while the upper edge of such panel 42 is articulated with the lower edge of the second panel 43, and in turn the upper edge of the second panel 43 is articulated with the lower edge of the third panel 44. The upper edge of this latter is also articulated with the lower edge of the fourth panel 45, while in turn the upper edge of this fourth panel 45 isn't articulated, rather it is provided with two inclined hooks 48, 49, identical and spaced away from each other in the direction of the width of the panel 45 and adapted to engage corresponding hooks (not indicated) inclined in a symmetrical manner and fixed in the lower edge of the first lower panel (42), when all the panels are displaced in their rest position.

Each panel of both the sets is substantially constituted by a box-like metallic frame 50 with rectilinear sides and of squared form, delimited by a fully smooth wide back surface 51, turned in the direction opposite to the vines, and by a front surface 52 opposite to the previous one, and turned towards the vines to be treated, in to which surface there are mounted several lamps with ultraviolet radiation 53, which are identical and have a lengthened shape in the vertical direction of the box-like frame 50, and emit a germicide ultraviolet radiation and have the characteristics previously described. Such lamps 53 are supported removably by the lower and upper sides (not indicated) of the box-like frame 50 and are formed by some tubes containing gas and they are supplied electrically and are managed by a microprocessor controlled electronic card (not shown), arranged in the interior of each lamp, which provides for the ignition of the tube of the lamp by generating the high voltage for firing the gas (starter), and the supply voltage for the operation and moreover regulates the power of the ultraviolet radiation emitted by the relative lamp, as well as provides for switching off of the same lamp. The lamps 53 are grouped to each other, and oriented in the vertical direction, in a manner to form a first group of lamps constituted in the example by four lamps approached and parallel to each other, and a second group of lamps spaced away of a determined free space from the first group and constituted in the example by four lamps, approached and parallel to each other. Of course, according to the invention it is also possible to utilize radiant lamps with form and number which are different than those above indicated by way of a not limitative example, for obtaining always the same scope to eliminate the microorganisms parasites of the vines, thus without departing from the protection field of the present invention. The supports of the various lamps 53 by the lower and upper sides of the box-like frame 50 is obtained by introducing the end electrodes (not indicated) of each lamp into corresponding dead holes (not shown) provided into such lower and upper sides of the box-like frame 50 and connected electrically with said microprocessor controlled main power card.

For replacing each lamp with another lamp, the end electrodes of the lamp to be replaced are therefore extracted easily from the relative dead holes, and into these latter there are then introduced in a simple manner the relative end electrodes of the further lamp. On to all the ultraviolet lamps of each panel 42-45 of each set it is applied a transparent protective covering plate (not indicated), formed by a quartz plate, which permits the passage of the ultraviolet radiation produced by each lamp with the above described wavelength, which is transmitted to the component parts of the vines for the anti-parasitic treatment thereof. In the free space comprised between said first and second groups of lamps it is applied and fixed in the vertical direction into each box-like frame 50 a linear actuator 54, formed by a metallic casing (not indicated) into which an electric motor of traditional type (not indicated) is housed, which is controlled by a driver for motors which finds itself into the card of the lamp 53 and is connected to and managed by the same microprocessor controlled electronic card of the lamps 53. All the linear actuators 54 are also provided with a relative lengthened rectilinear rod 56, connected to its own electric motor and which can be operated by this latter in the alternate rectilinear direction, by means of transmission members of traditional kind (for example worm screw or rack) into different operative positions, depending on the direction and the duration of the rotation of the same electric motor, which is controlled by the driver and managed by the microprocessor controlled electronic card 55. The end portion of the lengthened rod 56 also passes through a central through hole (not shown) of the upper side of the box-like frame 50 of each panel and its free end portion is hooked in to a correspondent hook (not indicated) of the lower side of the box-like frame 50 of the supporting panel directly adjacent.

All the panels 42-45 may be displaced into different positions, in the positions approached or moved away with respect to the component parts (trees, vine shoots, leaves and bunches) of the vines of each rows of vines, as long as the foliage is growing and increases its volume, thereby for keeping the lamps 53 always at the same distance from these component parts, and ensuring always an effective antiparasitic treatment of the vines, and these displacements of the panels are determined by the control and the management with said two electronic microprocessors included into the relative cards and acting on to the linear actuators 54, based on the preventive setting into the relative microprocessors of the data concerning the displacements of each linear actuator 54 which must be effected within established periods of time. Next, there will be described the data which are set into each microprocessor and the manner in which the desired displacements of the different linear actuators 54 will be determined. In order to allow the displacement of each panel into different and variable positions, the panels of each set of panels are articulated to each other with the two lateral sides of each box-like frame 50, and in particular the two lateral sides of the frame of the first panel 42 are pivoted with their respective lower end portion with said supporting brackets 46 and 47 and with their upper end portions they are pivoted with the correspondent lower end portion of the lateral sides of the frame of the second panel 43.

In turn, the relative upper and portion of the two lateral sides of the frame of the second panel 43 is pivoted with the correspondent lower end portion of the two lateral sides of the frame of the third panel 44, and the upper end portion of these latter lateral sides is pivoted with the correspondent lower end portion of the lateral sides of the fourth panel 45. Before to describe the manner in which such panels are displaced to each other, and approached or moved away with respect to the above mentioned component parts of the vines, it is to point out that to the lateral sides of the box-like frame 50 of each one of the panels 42-45 of each set of panels it is applied and fixed in the same direction a correspondent rectilinear metallic section bar 57 and 58 of squared form, or also with other forms, and internally hollow, having the same length of the lateral side to which it is fixed, and that such hollow section bars have the same width and depth. All such hollow section bars 57 and 58 of the panels 42-45 of each set of panels are provided with a set of respective through holes 59 and 60, in the example constituted by three identical through holes which are aligned to each other in the vertical direction in the same section bar, and are communicating with the inner cavity of each section bar, and into each one of said through holes it is inserted at least an adjustable nozzle (not indicated), and all the nozzles are supplied with the air under pressure which is produced by at least an electric fan 61 and 62 for each set of panels, and such electric fans are fixed on to the upper surface of the respective first and second side portion 15 and 16 of said flat plate 12 (see the FIGS. 1, 2, 7, 8, 9 and 10).

The electric motors of the fans are connected to the electric circuit of the movable apparatus 5 and the switching on and the regulation of the rotation speed, therefore the flow rate of the produced air flow as well as the switching off of these motors are controlled and managed by the microprocessor controlled main power card, in a manner that the so produced flow of air under pressure be circulated through the component parts which will be described, and through the adjustable nozzles and be directed with different angles against the leaves of the vines, for moving and displacing the same as long as they are growing in the time, in a manner to permit to the lamps to direct correctly the ultraviolet radiation against both these leaves and the other component parts of the vines, and to avoid too that such radiation against any insect, bird and other flying bodies which found themselves in these positions. Next, there will be described the criteria with which the electronic microprocessor of the power card will be set, depending on the foreseen growing at determinate time periods of the leaves and the other component parts of each row of vines.

The air under pressure is let to circulate through the inner cavities of the different hollow section bars 57 and 58 of each set of panels, and thereafter through said adjustable nozzles, thanks to a flexible hose 63 and 64 connected at the one side thereof with the corresponding delivery side 65 and 66 of the relative electric fan 61 and 62 and introduced at the other side thereof through a through hole (not indicated) of the hollow section bars of the frame of the first panel 42, thereby communicating with the inner cavity of these hollow section bars, into which a lengthened flexible hose (not indicated) is introduced, which is introduced through all the hole section bars 57 and 58 correspondent to each other of the box-like frames of the other three panels 43, 44 and 45 of each set of panels. Each lengthened flexible hose is bored in correspondence of the relative through holes 59 and 60 of said hollow section bars, in positions correspondent to those of said adjustable nozzles, in a way that the flow of air arrives into these latter for being thereafter directed against the opposite leaves of the relative row of the vines. In the central position of the upper surface of the flat plate 12 there are fixed, by means of relative supports 67 and 68 identical and symmetrica to each other, the correspondent end portions of a relative linear actuator 69 of lengthened form, and a size larger than that of said linear actuators 54 of the different panels 42-45. Such supports 67 and 68 may slide in the alternate horizontal direction in two positions opposite from each other, together with the relative actuator 69, along correspondent horizontal rectilinear guide members (not indicated) secured to their support structure, for performing the functions which will be described.

The alternate sliding of the supports 67 and 68 is obtained by means of s relative actuator 144 and 145 driven by a correspondent electric motor 144' and 145' controlled by the driver in the main power card 78 and fixed below the horizontal guide members. In turn, the two linear actuators 69 are identical and symmetrical to each other and each one of them also comprises a metallic housing 70, into which an electric motor of traditional type is housed (not indicated), connected in the electric circuit of the movable apparatus 5 and controlled by a driver integrated in the microprocessor controlled electronic card of the lamp and connected to and managed by said microprocessor controlled main power card (not indicated). Each linear actuator 69 is also provided with a lengthened rectilinear rod 72, connected to its own electric motor and actuatable by this latter in the alternate rectilinear direction by means of transmission members of traditional type (i.e. worm screw or rack), into different operative positions, depending on the direction and the duration of rotation of the same electric motor, controlled by the driver 55 and managed by the microprocessor controlled main power card. The free end portion of the lengthened rod 72 of each linear actuator 69 is fixed to the lower end portion 73 of one of the lateral sides of the box-like frame 50 of the first panel 42, and such lower end portion 73 is bent with respect to the remaining portion of lateral side (not indicated) and is pivoted with said supporting brackets 46. When the electric motors of the linear actuators 69 are driven into different operative positions, and in particular when such rods are displaced in the position completely retracted into the housing 70 (see FIG. 7), they provide for displacing the lower end portion of the side 73 in the completely lowered position thereof, and therefore for displacing the lower panel 42 in the same position, and consequently for displacing all the remaining panels 43-45 in the lowered position thereof.

On the contrary, when these electric motors actuate the rods 72 of the linear actuators 69 in the position completely extracted from the housing 70 (see FIG. 9), they provide for displacing the lower end portion of the side 73 into the completely raised position thereof, and therefore also for displacing the first panel 42 into the same position, and consequently for displacing in the raised position all the remaining panels 43-45. In turn, the panels 42-44 are displaced into different positions thereof by the linear actuators 54 of the same panels, and the displacement of the linear actuator of a panel into different positions thereof provides for displacing the directly overlying panel into different positions thereof, thanks to the fact that the end portion of the rectilinear rod 56 of each linear actuator 54 is hooked into the correspondent hook of the lower side of the box-like frame 50 of this adjacent and overlying panel. In particular, when the rod 56 of a linear actuator 54 is displaced in the position completely retracted in its housing, the relative adjacent and overlying panel is displaced into the position approached to that of the panel provided with the linear actuator 54, by rotating downwards around the articulation stud between these two panels, and on the contrary when the rod 56 of this linear actuator 54 is displaced in the position completely extracted from its housing, the relative adjacent and overlying panel is displaced in the maximum spaced away position with respect to that of the panel provided with the linear actuator 54, by rotating around the articulation stud between these two panels. In this way, the panels may be displaced into positions different to each other, when the rod 56 of each linear actuator 54 of each one of the panels 42-44 is displaced from the one to the other one of its retracted and extracted positions, bt passing through the different intermediate positions. The displacement of each linear actuator 54 of each panel is controlled by its own driver 55 and managed by its own microprocessor controlled electronic card, independently from the displacements of the other panels determined in the same manners. As visible in the FIGS. 7 and 9, the linear actuator 54 of the first panel 42 provides for the displacement of the second panel 43 into positions different than that of said first panel, and in turn the linear actuator 54 of the second panel 43 provides for determining the displacement of the third panel 44 into positions different than that of said second panel, while finally the linear actuator 54 of the third panel 44 provides for the displacement of the fourth panel 45 into positions different than that of said third panel. In this manner, the different panels 43-45 of each set of panels may be displaced into positions different to each other, thanks to the relative linear actuators 54 controlled and managed by the correspondent microprocessor controlled electronic cards, while the panel 42 of each set of panels may be displaced into different positions in the height thanks to its own linear actuator 54, controlled and managed by the microprocessor controlled main power card, as previously described, and thanks to the linear actuator 69 too, which is controlled and managed by the same microprocessor controlled main power card. All the displacements of each set of panels are identical and symmetrical to those of the other set of panels and are controlled and effected in synchronism to each other. With this arrangement, therefore, the panels may be displaced by the relative linear actuators 54 and 69 from their lowered rest position (see FIGS. 1 and 8) to their raised operative position (see FIGS. 2 and 10) at different heights, and vice versa.

The displacements among them and at different heights that must be effected by all the panels 42-45 of each set are set and stored in advance in the form of digital data on both said microprocessor controlled cards of the present movable apparatus 5, before this latter moved along the rows of vineyards, and all the displacements to be effected automatically are determined with the criteria which will be described hereinafter, depending on the distance existing among the component parts of each two opposite rows. In the FIG. 5 it is shown the back view of the movable apparatus 5 slidable with its wheels 6 on to a flat ground comprised between two rows of vines 10 and 11, and guided by the wire put underground 8, as it will be described later on, with the panels 42-45 of each set displaced at the desired height and spaced away of the required extent from the relative rows and adequately oriented, in a manner that their lamps direct correctly the ultraviolet radiation toward the component parts of the vineyard to be treated In this case, these panels are displaced in the same positions of the FIG. 9, in which the two supports 67 and 68 are arranged approached to each other.

Figure 4:
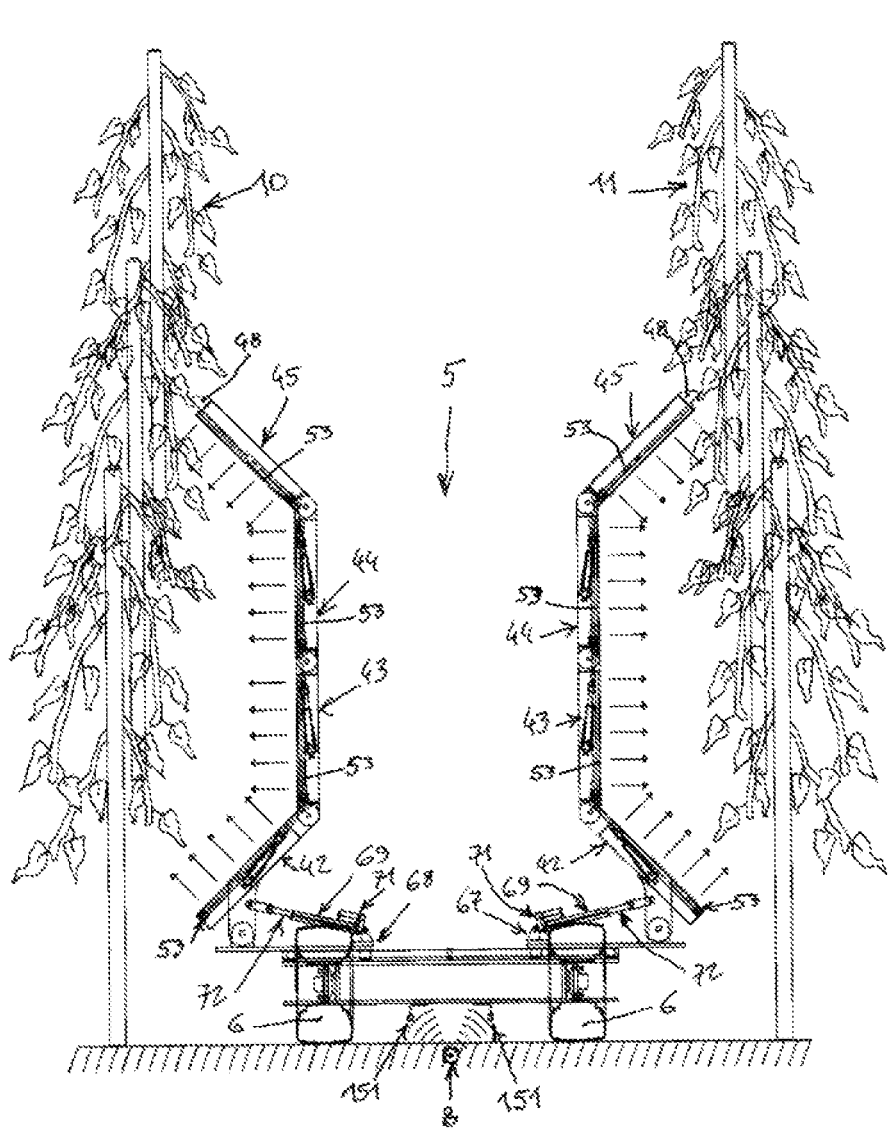
FIG. 4 shows a back view of the movable apparatus according to the invention, in the assembled condition and displaced in the operative position thereof, which is disposed and laid on to a flat ground delimited by the rows of two vines of the vineyards arranged parallel and spaced away from each other with a wide determined space.
Figure 5:
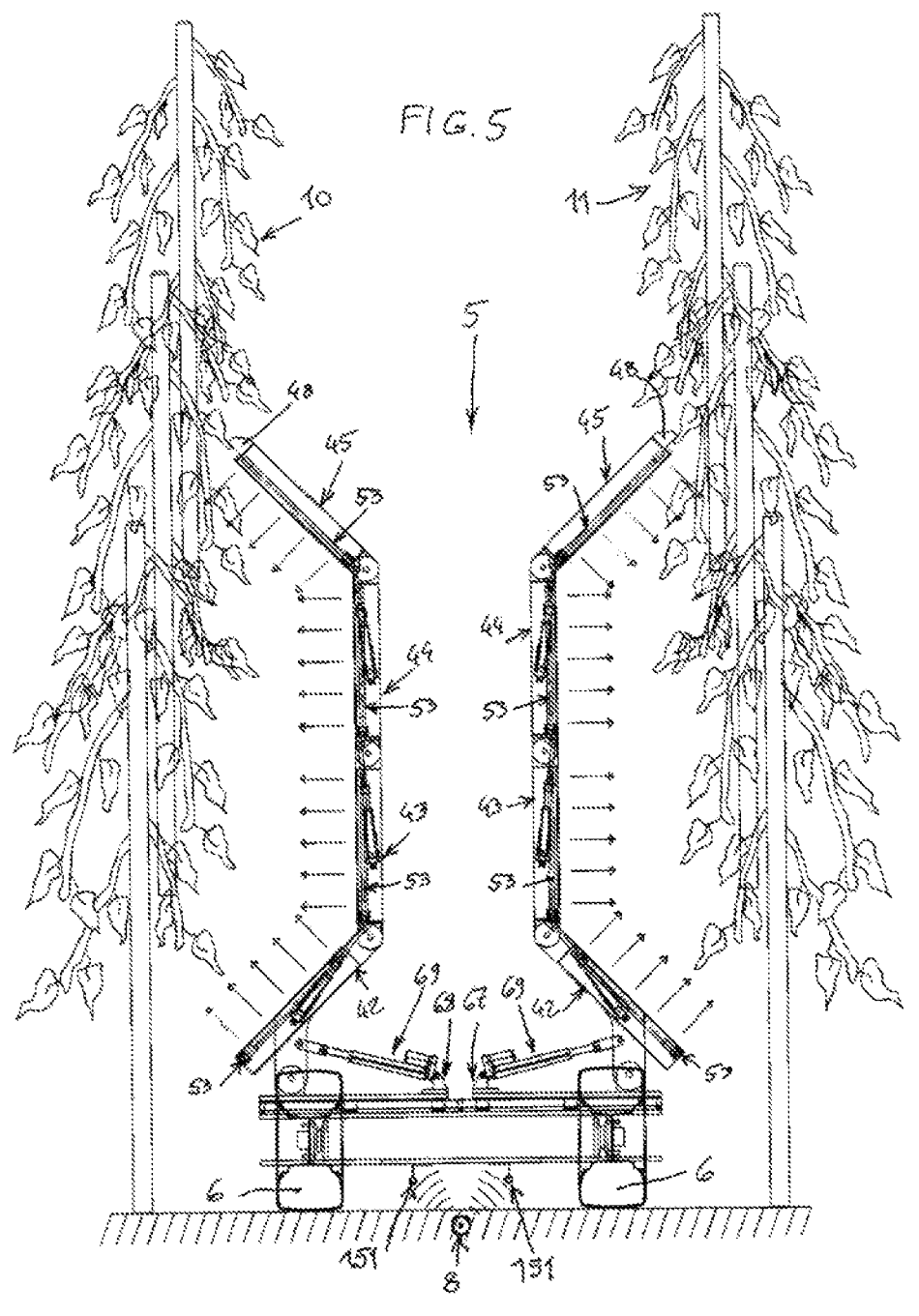
FIG. 5 shows a back view of the movable apparatus according to the invention, in the assembled condition and displaced in the operative position thereof, which is disposed and laid on to a flat ground delimited by the rows of two vines of the vineyards arranged parallel and spaced away from each other with a space smaller than that one of the rows of the FIG. 4.

In the case of the FIG. 4, the two rows of vines 10 and 11 are spaced away from each other of a distance greater than that of the FIG. 5, while the panels 42-45 of the two sets of panels are always displaced in the position of the FIG. 5, so that these latter must be displaced contemporaneously in a position nearer that of the relative rows of vines, and under this condition the microprocessor controlled main power card of the apparatus is set for controlling the sliding of the two supports 67 and 68 along the correspondent horizontal rectilinear guide members, into directions opposite to each other, so as to displace each one set of panels toward the correspondent row of vines, with such an extent that the panels of each set be still spaced away as above described from the relative rows of vines and therefore may effect with their lamps the required anti-parasitic treatment on to the different component parts of the vines. By referring now to the FIGS. 38 and 39, it is noted that in these cases the movable apparatus do not more displaces itself on to a horizontal flat ground comprised between two adjacent rows 10 and 11, but rather it moves itself on to an inclined ground between the same rows, that in the case of the FIG. 38 is inclined leftwards with respect to the horizontal flat ground and in the case of the FIG. 39 is inclined rightwards with respect to the horizontal flat ground. Therefore, it appears comprehensible that if the two sets of panels are kept in the position of the FIGS. 4 and 5, the movable apparatus 5 would advance with its unbalanced weight and, in addition do not operate in a correct manner, could overturn itself. Each one of the unbalanced conditions of the FIGS. 38 and 39 is detected by at least a suitable electronic inclinometer sensor (not indicated) (namely gyroscope inclinometer at the solid state) included into the apparatus and operatively connected to a relative microprocessor controlled card supplied by the electric circuit of the apparatus, which inclinometer sensor is calibrated in such a manner as to detect promptly the direction in which the apparatus is inclined and therefore unbalanced with its weight, by generating a corresponding electric signal which is transmitted to the microprocessor controlled card, which is arranged in a way that to detect the unbalanced weight of the apparatus and from which position the unbalanced position is determined with respect to the axis of the weight, and to provide for re-balancing the weight of the apparatus within pre-established limits, by generating an electric signal which is transmitted to the driver 71 of either one of the actuators 69, for actuating this actuator for such an extent as to re-balance the weight of the apparatus, and in turn to keeping the panels of the lamps always at the same distance from the foliage with respect to the axis, by permitting the apparatus to advance and to perform the anti-parasitic treatment of the vines.

In the unbalanced condition of the weight of the apparatus of the FIG. 38, in which the set of panels find themselves in the higher position (left side), such panels would tend to overturn themselves rightwards, together with the apparatus, and in this case the microprocessor controlled card generates and transmits the electric signal toward the driver 71 of the actuator 69 of the set of the lower panels (right side), by providing for actuating the rod 72 of this actuator into the extracted position thereof, with consequent raising of the relative set of overlying panels up to such a height as to balance the weight of the apparatus within the pre-established limits, for which there isn't more existing the danger that the same apparatus may overturn itself. Then, under this condition the microprocessor controlled card generates an additional electric signal, correspondent to the condition in which the re-balance of the weight of the apparatus is occurred, which is transmitted to the microprocessor controlled main power card, which provides for re-establishing the rotation of the electric motors determining the advancement of the apparatus, and in this situation the panels of both the sets may operate correctly by performing their anti-parasitic treatment of the vines of both the rows 10 and 11. In the condition of the unbalanced weight of the apparatus of the FIG. 39, in which the set of panels find themselves in the higher position (right side), such panels would tend to overturn themselves leftwards, together with the apparatus, and in this case the microprocessor controlled card controls in the same manner as described above the driver 71 of the actuator 69 of the set of higher panels (right side), in a manner to displace the rod 72 of this actuator in the retracted position thereof, with consequent lowering of the relative set of overlying panels up to such a height as to balance the weight of the apparatus within the pre-established limits, for which there isn't more existing the danger that the same apparatus may overturn itself. Moreover, as previously, also in this case the main power card controls in the same manner the advancement of the apparatus, and also in this situation the panels of both sets may operate correctly by performing their ant-parasitic treatment of the vines of both the rows 10 and 11. By utilizing the same component elements described in the FIGS. 38 and 39, operating in the same manner, it is so possible to correct automatically and rapidly any unbalance of the weight of the apparatus which should occur during the period of the advancement of the movable apparatus along the relative pre-established path onto both flat and inclined grounds, without the need to stop the apparatus for effecting the relative correction of the temporary unbalance.

Figure 40:
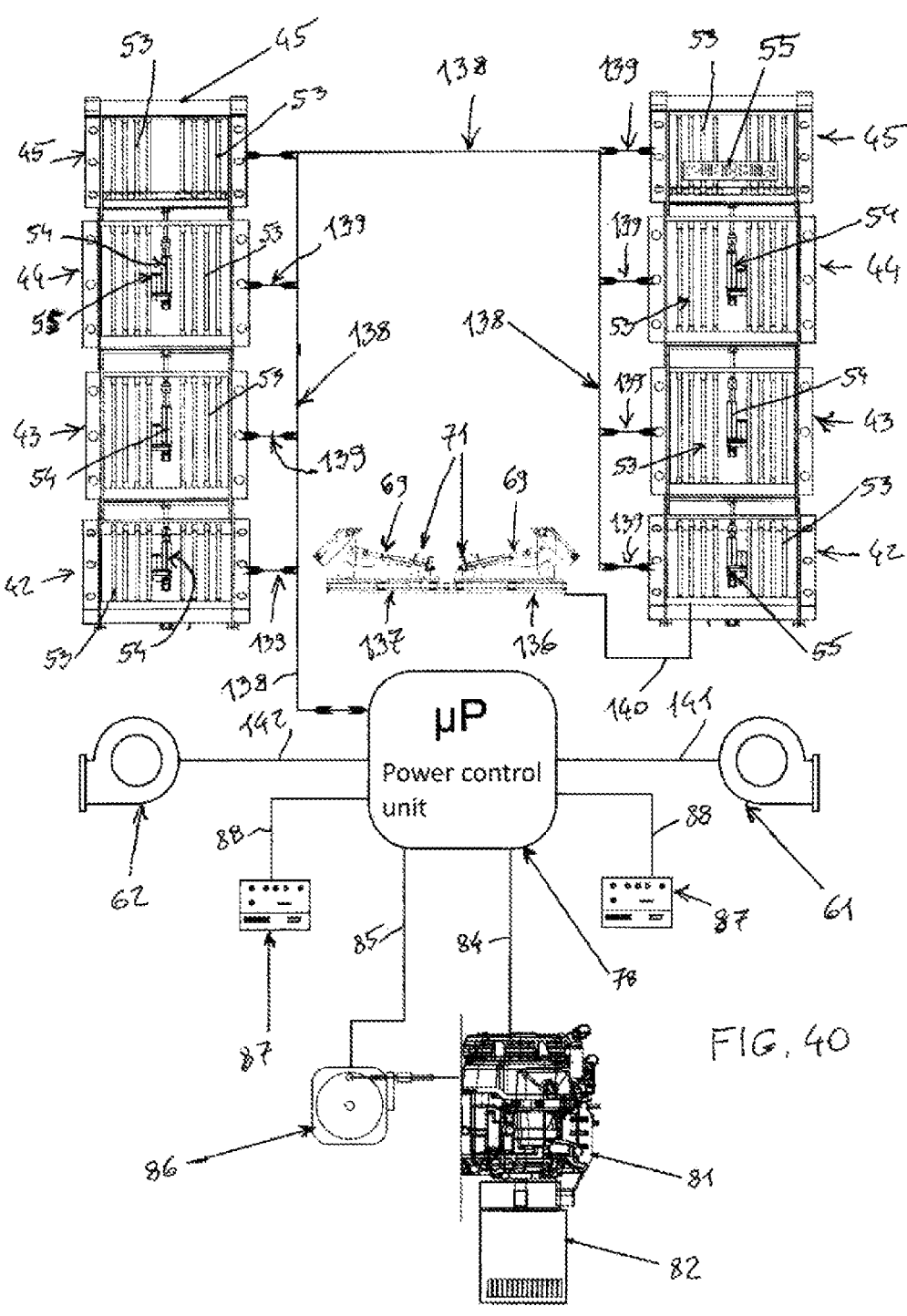
Figure 41:
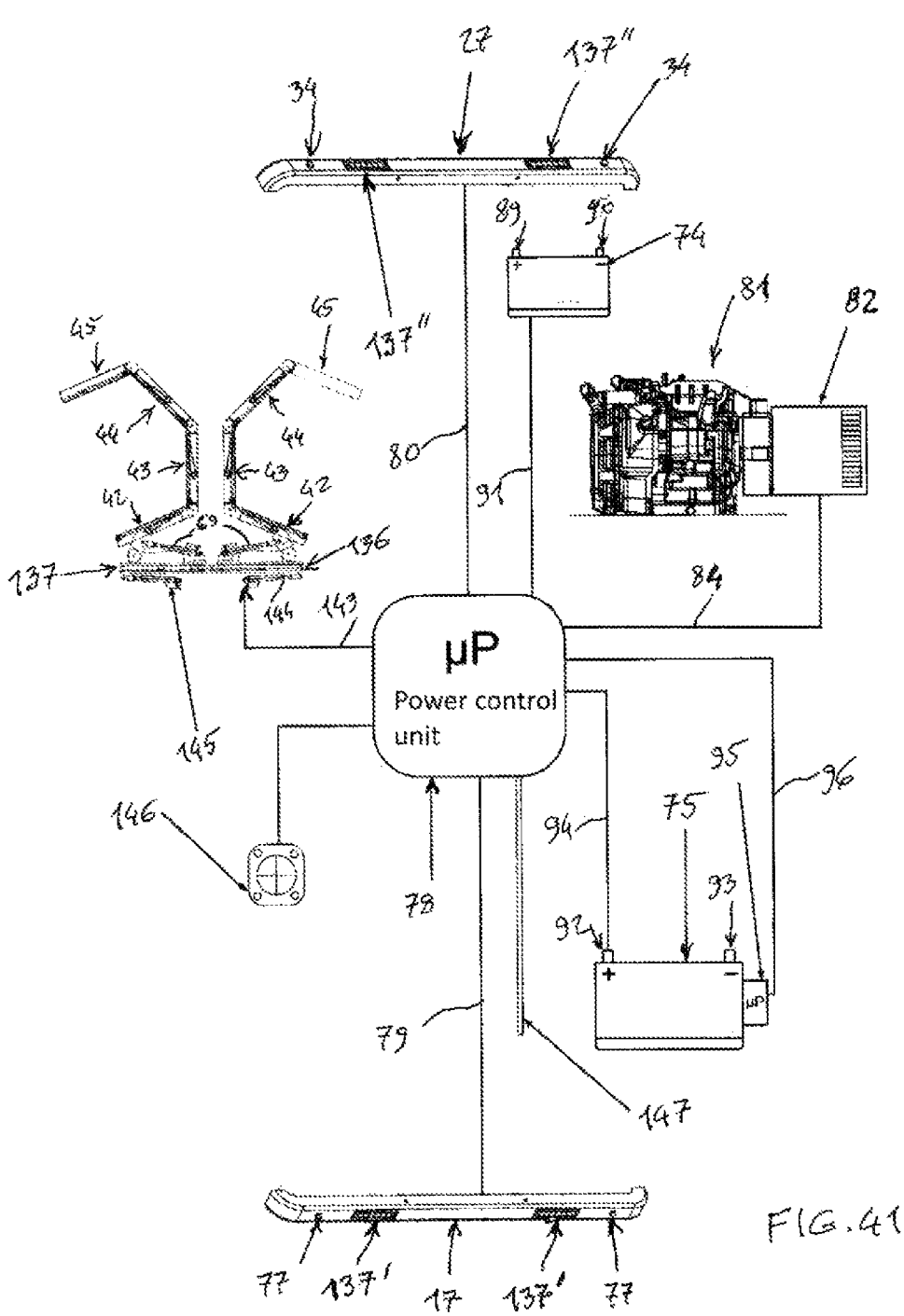
Figure 42:
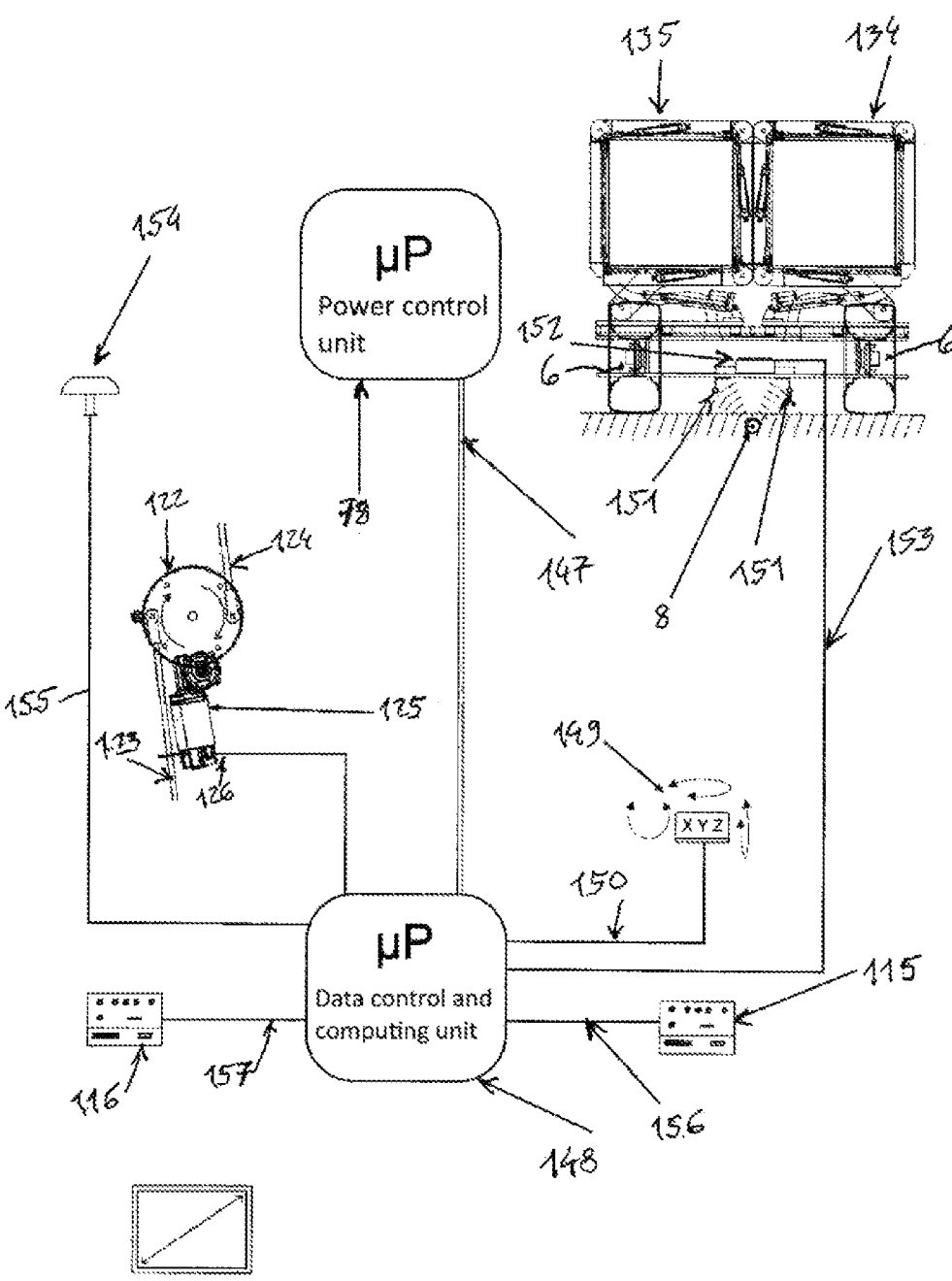

There are now described the component parts of the present movable apparatus, which are installed and fixed therein for determining both the traction of the wheels 6 (or the tracks 7) and the advancement of the same apparatus along its pre-established path (see the FIGS. 11-13), and the guide of the apparatus along its pre-established path (see the FIGS. 14-17), and the supply of the electrical and mechanical component parts of the apparatus (see the FIGS. 18-20 and the FIGS. 40 and 41). Before to describe the traction and the advancement and the guide component parts of the apparatus, it is suitable to describe at first how the supply of the electrical and mechanical component parts of the apparatus takes place, with reference to the FIGS. 18-20 and to the FIGS. 40 and 41 too, in which it is shown the electric diagram of the electronic and electrical component parts, for generating, managing and storing the electrical supply of all the electrical component parts of the apparatus. From these Figures, it is noted that for generating and providing to give the electrical supply of the different electrical and mechanical component parts of the apparatus, in the present example there are utilized at least one rechargeable lead electric battery 74 of the traditional type, and at least a lithium electric battery 75 of the special type, as visible in the FIG. 41, which are supported on and fixed to the respective horizontal supporting plane 25 and 26 of the apparatus, and the function of these electric batteries 74 and 75 will be described hereinafter, and such batteries and the other different component parts of the movable apparatus 5 are covered by the overlying metallic covering and closing structure 76, adequately fixed to the same apparatus.

Of course, the electric supply batteries 74 and 75 may be foreseen also of types and numbers which are different than those described by way of example only, provided that they perform always the same function, thus without departing from the protection field of the present invention. Before to describe the manner in which the electric energy for loading the batteries 74 and 75 be generated, from the FIG. 41 there are noted the front bumper 17 and back bumper 27 of the movable apparatus 5 described previously, with the ultrasound sensors 77 mounted in the front bumper 17 and the ultrasound sensors 34 mounted in the back bumper 27, which sensors are connected operatively with the microprocessor controlled main power card 78 by means of a respective electric connection 79 and 80, and operating as described previously.

For generating the electric energy for supplying all the electric component parts of the present apparatus, it is provided at least an explosion engine 81 in the form of a petrol engine or a diesel engine, mechanically and operatively connected with an electric generator (electric alternator)) 82 for recharging the lithium battery, and this assembly is mounted on to and supported by the previously described horizontal supporting structure 83 of the present apparatus, but of course it may be applied and supported also into different positions in the present apparatus.

The explosion engine 81 and the electric generator 82 are connected operatively also with the microprocessor controlled main power card 78 through electrical cables 84, and the power card 78 is arranged for controlling and managing as it will be described the operation of both the explosion engine 81 and the electric generator 82 as well as for controlling and managing always a sufficient electric charge of the lithium battery 75, for ensuring always a steady electrical supply of the different electrical component parts of the apparatus. The starting and the operation of the explosion engine 81 is managed by the microprocessor controlled main power card 78, provided with an integrated electronic driver (not indicated) that, based on the electronic data set in the power card 78, provides for generating a set of specific control electrical signals, a part of which are transmitted through some electrical cables 85 connected to the power card 78 to a separated electric actuator 86, mechanically coupled to the explosion engine 81, which actuator based on the respectively received electrical signals provides for controlling the members for starting the explosion engine, for controlling the temperature for the operation and the regulating members of the rotation speed of the same motor, in this latter case by actuating in a correspondent manner the throttle valve or the electronic injection (not indicated) of the petrol motor or, in the case of the diesel motor, the injection pump of the fuel (not indicated), and such actuator 86 provides as well as for to control the closing of the fuel valve, the whole based to what it has been set in advance in the main power card 78. Besides, the power card 78 provides also for managing, as it will be described, a part of the electric signals for controlling and managing the drivers 87, connected through relative electrical cables 88 with said power card 78, for determining the rotation and the power of the traction electric motors of the apparatus, which will be described later on, and moreover for determining both the pre-charge of the electric capacitors associated with such electric motors and the recharge and the maintenance of the electric charge of the lithium supply battery 75, in the manner which will be described too. Still referring to the FIGS. 40 and 41, it is to point out that the lead battery 74 performs the function of service battery that, in addition to supply the starting electric motor (not indicated) for the explosion engine 81, which is combined with this latter, provides for supplying the starting electrical supply to all the electric component parts, namely for activating the entire electronic system of the apparatus up to the ignition of said lithium battery 75 be enabled as it will be described, in a manner that the apparatus be supplied prevailingly by such lithium battery during the operation and the movement of the same apparatus. In particular, the lead battery 74 is provided as usual with a positive pole 89 and a negative pole 90 connected by means of electrical cables (not indicated) to the different electric motors and the electronic drivers which will be hereinafter described, for supplying these electric and electronic component parts during the movement of the apparatus. Furthermore, the lead battery 74 is connected with separated electrical cables 91 with the microprocessor controlled main power card 78, for supplying to the same in a continuous manner the indication of the electric voltage of the same battery, and this operation is effected by means of an electronic control circuit included into the battery 74 (not indicated), which measures steadily the electric voltage of the battery and generates correspondent digital electronic signals which are transmitted to said microprocessor controlled main power card 78 though said electrical cables 91. The main power card 78 is arranged in such a way that to detect continuously the digital electronic signals coming from the battery 74 for keeping the electric voltage of this latter at the desired level, for which the battery 74 ensures a correct electrical supply to the electric component parts connected thereto. As long as the electric voltage of the battery 74 is maintained within pre-established limits, the correspondent digital electronic signals coming from the electronic control circuit of the battery 74 and detected by the main power card 78 signal to this latter this condition, for which it isn't required to recharge the same battery with the electric voltage generated by the dedicated electric generator (not indicated) of the explosion engine 81.

Moreover, the microprocessor controlled main power card 78 is arranged in such a way that, in the case in which the electric voltage of the battery 74 be decreased below a pre-established limit, for which the battery wouldn't more able to supply correctly said electric component parts, the main power card 78 receives from the electronic control circuit of the battery 74 different digital electronic signals, which signal to said main power card this situation of insufficient electric voltage of the battery 74, and under this condition said main power card 78 activates itself for generating correspondent electric control signals which are transmitted through the electrical cables 84 to the assembly formed by the explosion engine 81 and the electric generators 82, which electric signals provide for controlling and managing the operation of the explosion engine 81 as described above, the rotation of which determines the consequent rotation of its dedicated own generator and therefore the generation of a recharge electric voltage. This electric voltage generated by the dedicated electric generator is transmitted through the electrical cables 84 to a particular electronic recharge circuit (not indicated) included into the main power card 78, which provides for applying it through the electrical cables 91 to the battery 74, by recharging progressively and automatically thereof, and the level of this electric recharge voltage is detected by said control circuit of the battery 74 and by the main power card 78. Such main power card 78 is finally arranged in a way that, when the level of the recharge voltage of the battery 74 detected by it has reached the pre-established limit, it stops the rotation of the explosion engine 81 and the relative electric generator, thereby terminating the recharge step of the battery 74. By referring again to the FIGS. 40 and 41, there are now described the operation and the connections of the lithium electric battery 75 of the special type, which is utilized as described above for supplying continuously and automatically all the electric component parts of the present apparatus during the operation and the movement thereof.

In particular, the lithium battery 75 is provided as usual with a positive pole 92 and a negative pole 93 for the power supply of the different electric motors and the drivers of the traction system and the guide system of the apparatus, which are constituted and are controlled as it will be described, the positive pole 92 of which is connected to at least a driver (not shown) of said microprocessor controlled main power card 78 through electrical cables 94, and in turn the driver of the main power card 78 is connected with the different above described electric motors and drivers, for controlling and regulating the rotation of the same electric motors, while the negative pole 93 of the battery 75 is connected by means of electrical cables (not indicated) with said electric motors and drivers.

The microprocessor controlled main power card 78 is also arranged both for controlling continuously the electric voltage of the lithium battery 75 and for recharging through the electric generator 82 the lithium battery 75, in the case in which the electric voltage of this battery be decreased below a pre-established limit, for which such battery 75 wouldn't more be able to supply correctly all the electric component parts of the present movable apparatus 5 and therefore to provide for a correct operation of the same apparatus. For controlling the electric voltage of the lithium battery 75, this latter is provided in its interior with control and management electric circuits (not indicated), connected electrically by means of a serial connection of the CAN type 95 and electrical cables 96 with the main power card 78, and such control and management circuits provide to said main power card 78 in a continuous manner the measurement of the electric voltage of the lithium battery 75, by generating correspondent digital electronic signals which are detected by the same power card. The main power card 78 is furthermore arranged in a way that as long as the voltage of the battery 75 remains within pre-established limits, the digital electronic signals generated as described above and detected by the main power card 78 signal to this latter the condition this condition, for which it isn't needed to recharge the same battery with the electric voltage generated by the electric generator 82. In the case in which the electric voltage of the battery 75 should be reduced below a pre-established limit, for which the above mentioned negative consequences should occur, the main power card 78 would detect different digital electronic signals, which would signal to it this situation of insufficient electric voltage of the battery 75, so that it would be required to recharge the battery 75 to re-establish the correct electric voltage. To this aim, the recharge of the lithium battery 75 is effected by means of the electric generator 82, connected by the electric cable 84 to the main power card 78, into which a proper stepdown electronic circuit (voltage reducer) of traditional type (not indicated) is installed, which is arranged for managing the recharge electric current and voltage generated by the electric generator 82, which is needed for recharging the lithium battery 75. In this way, under the so detected condition of insufficient electric voltage of the battery 75, the main power card 78 provides to put into operation the explosion engine 81 and therefore to drive in rotation the electric generator 82 connected to such explosion engine 81, in the same manner previously described, and enabling the operation of said stepdown electronic circuit, so that the electric voltage generated by such electric generator 82 starts to recharge the lithium battery 75 through the electric cables 94, and is managed and controlled by said stepdown electronic circuit, and this operation continues up to the battery 75 has been recharged up to the pre-established level of the electric voltage. When this condition is attained, which is detected by the main power card 78, this latter disables the operation of the stepdown electronic circuit and provides to control the stop of the explosion engine 81 and therefore also that of the electric generator 82.

By referring again to the FIGS. 40 and 41, in which there are noted other component parts of the apparatus according to the invention, it is to point out that the composition and the operation of these component parts will be described in detail and after the description of the traction and guide systems of the present movable apparatus 5.

By considering now the FIGS. 11-13 and 18, it is accurately described the traction system of the apparatus and its component parts, and the relative operation of the assembly.

In particular, in the FIGS. 11, 12 and 18 there are shown the component parts fixed to and supported by the apparatus and provided for determining its traction and movement along the continuous established path 9 in both the advancement directions along the same path.

For determining the rotation of the wheels 6 of the movable apparatus 5, there are provided at least two electric motors 97 and 98 of traditional type (brushless), which are installed above the flat plate 12 and adequately fixed into the structure of the apparatus, a motor 97 of which is disposed in a position coincident to and approached with respect to the two front wheels 6 of the apparatus, and the other motor 98 of which is also disposed in a position coincident to and approached with respect to the two back wheels 6 of the apparatus. Each one of the electric motors 97 and 98 is integral with an own differential speed change gear of traditional type (not indicated) and the driving axle (not indicated) of each electric motor is fixed with its end portions with transmission shafts with constant-velocity joints in both the sides, or, as a variant, by means of a crown and pinion gear with transmission chain with a relative pulley for transmitting the movement, and the rotation of this pulley transmits the rotation to the axle of a correspondent wheel 6 through a relative transmission belt. In particular, in the example shown into the Figures referred to, the driving axle of the front electric motor 97 is provided with a pulley 99 which transmits the rotation through the belt 100 to a correspondent pulley 101 mounted on to the driven axle 102 of a correspondent front wheel 6, while the other pulley 103 of this driving axle transmits the rotation through the belt 104 to a correspondent pulley 105 mounted on to the driven axle 106 of the remaining front wheel 6.

In turn, the driving axle of the back electric motor 98 is provided with a pulley 107 which transmits the rotation through the belt 108 to a correspondent pulley 109 mounted on to the driven axle 110 of a correspondent back wheel 6, while the other pulley 111 of this driving axle transmits the rotation through the belt 112 to a correspondent pulley 113 mounted on to the driven axle 114 of the remaining back wheel 6. With this arrangement, therefore, all the wheels 6 of the apparatus may be driven in rotation by the relative electric motors 97 and 98 both at the same speed and at speeds different to each other, when such wheels 6 are steered into different positions as it will be described, thanks to the presence of the differential speed change gears into each one of the same electric motors. Instead to be driven into rotation by the electric motors 97 and 98 as just described, all the wheels 6 may be driven into rotation by said electric motors also by mounting these latter on to correspondent rotation axles (not shown) which join each pair of front and back wheels, and by joining said motors directly with the relative rotation axle and constant-velocity joint, thereby eliminating the above described transmission belts, thus without departing from the protection field of the present invention.

In the FIG. 12 it is also noted that each electric motor 97, 98 is coupled to and controlled by its power driver (115 for the motor 97 and 116 for the motor 98), in turn controlled by the main power card 78. In this manner, depending on the data of the advancement movements that the movable apparatus 5 must effected for displacing itself along the pre-established path, which data have been set in advance in the main power card 78, this latter generates correspondent digital electronic signals which from its driver are transmitted to the driver of said microprocessor controlled electronic card 115, which provides for controlling and managing the rotation of its own electric motor 97 and therefore the rotation of the front wheels 6 of the apparatus in the direction and for the duration of the rotation of the same motor. At the beginning of each operative cycle of the movable apparatus 5, the electric motor 97 is controlled to rotate with the above specified criterion in a determinate rotation direction, together with the front wheels 6, which rotation direction corresponds to that of the established advancement direction of the apparatus, however such electric motor 97 may be controlled to rotate with the same criterion also in an opposite direction, together with the front wheels 6, thereby determining the advancement of the apparatus in a direction opposite to the preceding one. In turn, the remaining electric motor 98 is coupled to and controlled by the driver of a microprocessor controlled electronic card 116, connected in the same manner of the previous card with the same driver of the main power card 78. In this way, depending on the data of the advancement movements that the movable apparatus 5 must effect for displacing itself along the pre-established path, which data are the same which have been set in advance in the main power card 78 for the electric motor 97, such main power card 78 provides to control and manage contemporaneously and in the same manner as described the rotation of its own electric motor 98 and therefore the rotation of the back wheels 6 of the apparatus in the direction and for the duration of the rotation of the same motor, and in synchronism with the rotation of the motor 97.

Also in this case, each operative cycle of the movable apparatus 5 is effected by putting in rotation the electric motor 98, together with the back wheels 6, by letting to advance the apparatus in an established direction, with the same above described criteria, with the possibility to reverse the rotation direction of the motor 98 and therefore that of the back wheels 6 and the advancement direction of the apparatus, the whole always in synchronism with the rotation direction of the motor 97 and the front wheels 6.

By referring now to the FIGS. 14-17 (and also the FIGS. 12 and 19), it is described the guide system of the wheels 6 of the apparatus, for displacing this latter along established paths both rectilinear and curvilinear, by passing through all the rows of the vines to be submitted to the fungicide and anti-parasitic treatment. In particular, in the FIGS. 12 and 19 there are shown the component parts of the guide system, which are installed and adequately fixed in the apparatus on the flat plate 12, and are displaced from each other in a manner to orient all the wheels contemporaneously in the rectilinear direction and with each pair of wheels which are disposed parallel to each other.

As visible from these Figures, each wheel 6 is situated in a lateral position slightly spaced away outward with respect to the correspondent side of the lengthened portion 13 and 14 of the flat plate 12, and the wheel has a central hub 117 which is articulated with a central articulated joint 118 with a shaped supporting plate 119, fixed to the relative side of the correspondent lengthened portion 13 and 14 of the flat plate 12, and such hub is moreover articulated with the axle of the wheel (in this case, the axle 102 of each front wheel and the axle 110 of each back wheel).

The guide system of the wheels 6 of the two pairs of wheels comprises a first transversal rectilinear bar 120, the end portions of which are pivoted the one with the hub of a front wheel 6 and the other one with the hub of the other front wheel 6. Such guide system also comprises a second transversal rectilinear bar 121, identical and with the same size of the preceding one, the end portions of which are pivoted the one with the hub of a back wheel 6 and the other one with the hub of the other back wheel 6. With this connection of the wheels 6, each wheel 6 may be always driven in rotation by its own axle, in the previously described manner, and may be steered into different positions together with the other wheel of the pair, by keeping these wheels always parallel to each other for each steering radius, thanks to the fact to displace the relative rectilinear bar 120 and 121 into different positions as it will be described later on. The guide system of the wheels 6 furthermore comprises a further mechanism of displacement of the wheels from a position oriented in the rectilinear direction, as described above, to a position steered into different positions (see the FIG. 15), which is substantially constituted by a thin metallic disc 122 having a determinate size, which is pivoted in the central position on to the flat plate 12 in a manner to be able to rotate around its own vertical axis of a determinate maximum angle, into the two rotation directions, and the position in which such pivoted disc 122 is central with respect to the distance comprised between one of the front wheels and one of the back wheels coinciding with such front wheel. On to the disc 122 it is pivoted the end portion of a first lengthened and rectilinear metallic bar 123, the other end portion of which is pivoted with the hub and the axle of one of the front wheels 6. On to the disc 122 it is also pivoted, in a position opposite to that in which said first bar 123 is pivoted, the end portion of a second lengthened rectilinear metallic bar 124, which is identical and has the same size of the back wheels 6 coinciding with such front wheel. The one of the lengthened bars, in the example the first front bar 123, may be actuated into different positions in either one of the rectilinear directions, by means of an electric motor 125 of traditional type (therefore, a brushes or a brushless motor), mechanically connected with such bar and adequately supported into the apparatus, and supplied by means of cables connected to the lithium battery 75, and controlled by and managed through the microprocessor controlled main power card 78, connected with the cables supplying the electric motor 125. The microprocessor controlled main power card 78 is arranged for controlling in rotation the electric motor 125, by generating some digital electronic signals which are transmitted to a microprocessor controlled card 126 included in the motor and connected to said main power card, depending on the configuration and the length of the advancement path which is crossed from time to time by the movable apparatus 5.

In the case in which such advancement path be rectilinear, the main power card 78 is informed of the configuration and the length of this path in the manner which will be described hereinafter, and the correspondent digital electronic signals generated by such power card are transmitted to the microprocessor controlled card of the motor 125, which controls and manages the rotation of the same into such a direction as to determine the advancement of the apparatus along the desired rectilinear path, and under this condition the rotation of the motor 125 determines, through some mechanical members of the motor connected with the first bar 123, the rectilinear displacement of the same bar, and therefore also that of the second bar 124, as well as the displacement of the rectilinear bars 120 and 121, in such a position as that all the wheels 6 be oriented contemporaneously in the rectilinear direction. In this situation, when the electric motors 97 and 98 are driven as previously described, the movable apparatus 5 advances along the rectilinear path in the desired direction. In the case in which the advancement path be curvilinear, the main power card 78 is informed of the configuration and the length of this path in the manner which will be described, and the correspondent digital electronic signals generated by such power card are transmitted to the microprocessor controlled card of the motor 125, which controls and manages the rotation of the same in such a direction as to determine the advancement of the apparatus along the desired curvilinear path, and under this condition the rotation of the electric motor 125 determines in the same described manner, the rectilinear displacement of the first rectilinear bar 123, and therefore, also that of the second bar 124, as well as the displacement of the rectilinear bars 120 and 121, in such a position as that all the wheels 6 be steered contemporaneously in the same direction with the same steering radius. Under this situation, when the electric motors 97 and 98 are driven as described previously, the movable apparatus 5 advances along the curvilinear path in the desired direction. In the FIG. 15 there are shown, by way of example only, two pairs of wheels 6 steered in a determinate direction and two pairs of wheels 6 steered in the opposite direction.

In the same Figure, it is noted moreover how the ultrasound sensors included in the front bumper 17 and in the back bumper 27 are emitting some ultrasound signals 127, for detecting the presence of possible obstacles. This emission of signals as visible is indicated by way of example, in that in the real situation the emission of the ultrasounds is effected exclusively by the sensors of the front bumper. By referring now to the FIGS. 16, 17 and 20, there are noted other component parts of the apparatus, for ensuring the guide thereof along rectilinear paths, with the wheels 6 all oriented in the rectilinear direction and with the pair of front wheels 6 joined to each other by a transversal axle 128 and the pair of back walls 6 joined to each other by an identical transversal axle 129, wherein said transversal axles are shaped with an identical correspondent central widened portion (in the FIG. 16 it is visible the back widened portion 131 only, while in the FIG. 20 the front widened portion is marked with 130), The front transversal axle 128 is driven in rotation together with the pair of front wheels 6, by said electric motor 97, with the same component parts described in the FIGS. 15 and 19, co-operating with the widened portion 130 of the same axle, while the back transversal axle 129 is driven in rotation, together with the pair of back wheels 6, by said electric motor 98, with the same component parts described in the same FIGS. 15 and 19, co-operating with the widened portion 131 of the same axle. Furthermore, each front wheel 6 is pivoted with a relative articulated joint 132 with the correspondent end portion of the front transversal axle 128, while each back wheel 6 is also pivoted with a relative articulated joint 133 with the correspondent end portion of the back transversal axle 129. Finally, even in this case all the wheels 6 may be steered with different angles by the same described displacement mechanism and visible in the preceding FIGS. 12, 15 and 19. With this arrangement, it is possible also in this case, as previously, to orient the two pairs of wheels 6 both in the rectilinear direction and in a position parallel to each other, for the advancement of the apparatus 5 along the rectilinear paths comprised between two adjacent rows of vines and to steer with different steering radii such pairs of wheels, and into a position parallel to each other, for the advancement of the apparatus 5 at the end of each rectilinear path along the curvilinear paths, and with curvatures toward either one direction, for returning along the rectilinear paths along two respectively adjacent rows of vines.

Still referring to the FIG. 16, there are noted moreover the two sets of said panels separated to each other, marked respectively with the reference numerals 134 and 135, which are moved away from each other in their operative position, and the panels of each set are supported in a slidable manner on to a relative transversal saddle 136 and 137, along which such sets of panels are displaceable into different positions in the transversal direction, in the manner and with the above described component parts. Besides, in the FIG. 17 there are still noted said two sets of panels always actuated along said transversal saddles into their approached rest position.

By referring now to the FIG. 40, shown therein is still the microprocessor controlled main power card 78, which is connected operatively, as it will be described in a short time, with all the ultraviolet lamps 53 mounted on to the different panels 42-45 of each set of panels, for controlling and managing the operation and the electric power of the same lamps, thereby generating the ultraviolet radiation for the anti-parasitic treatment of all the component parts of the vines.

For this purpose, such main power card 78 is arranged for igniting all or part of the ultraviolet lamps 53, in the moments and with the required powers, which are selected by the operator of the apparatus 5 by acting on to the controls included into the control panel of the same apparatus (not shown), when the apparatus starts to advance along all the desired advancement paths in the vines, in order to effect the anti-parasitic treatment on each treatment cycle. Furthermore, said main power card 78 is connected by means of a serial electronic connection of bidirectional type, preferably of the type RS 485, marked with 138, with all the lamps 53 mounted into a set of panels and with all the lamps 53 mounted in the other set of panels, and the bidirectional serial connection 138 is connected through a relative electrical connection 139 with each lamp of each panel, in parallel with the microprocessor controlled electronic card 55 included in the interior of each lamp, of which each microprocessor controlled electronic card is controlled and managed by the main power card 78 based on the controls provided by this latter. In particular, the electronic card of each ultraviolet lamp 53 is connected to a reactor circuit of the digital electronic type (ballast), included into the relative lamp (which circuit isn't shown), which provides to ignite the tube of each lamp UVC 53, by generating the high voltage for firing (starter) of the gas contained in the interior of the same lamp and the electric voltage for the operation of the lamp, and provides as well to change the duty cycle and to regulate the operation power of the same lamp. The presence of the serial connection of bidirectional type 138 connected as described allows also to communicate to the main power card 78 the presence of possible alarms, such as for example the lack of ignition of a UVC tube, any operative failure or disconnection of an ultraviolet lamp 53, an alarm for an over-temperature and some undesired movements of the structures of the lamps.

Moreover, as previously described, each microprocessor controlled electronic card of each lamp is associated with said driver 55, which provides for controlling said linear actuator 54 mounted into the relative panel, in a manner to displace said panels of each set from their bent rest position as visible in the FIGS. 1, 7 and 8, to their operative position into different adjustment positions, as already described previously. All the panels displaced in the operative position are moreover displaced into different positions regulated into height, by actuating both the linear actuators 69 in the respectively desired position, correspondent to the height of the component parts of the vineyard which must be submitted to the anti-parasitic treatment, and this operation is performed by means of electric signals generated by the main power card 78 and transmitted to the relative drivers 71 of said linear actuators through the electrical connection 140, with the control of the main power card 78, which connection is connected operatively between said main power card 78 and said drivers 71, through the serial connection 138. In this way, all the panels so displaced in the height are maintained always perfectly vertical and balanced. In the practice, before to start the anti-parasitic treatment cycles of the vines with the described movable apparatus, the operator of the apparatus checks if each row of vines is grown of a sufficient extent in order that the bunches of grapes begin to mellow, and if it has been pruned in an almost uniform extent, so as to let to be an equal space between each pair of rows of vines 10 and 11, for the passage of the movable apparatus and for the advancement along the established path thereof. At this point, the parasites (and in particular the oidium and the mildew) which collect themselves on to the leaves, the trees and the bunches of grapes already begin to develop their noxious action to the vines and must be therefore treated and eliminated with the present anti-parasitic treatment.

Consequently, the operator measures the distance existing among the rows of vines parallel to each other and in the middle of such distance he buries the electric wire 8 acting as a guide for the advancement of the movable apparatus 5, for the entire length of the path of advancement which the apparatus must effect. In this middle it must be disposed the transversal middle of the movable apparatus 5, which must be oriented at first in the rectilinear direction and afterward in the curvilinear direction along the same path. Moreover, the operator measures the distance that, when the apparatus will be disposed in correspondence of the buried electric wire 8 and all the panels of the two sets will be displaced in height at the desired height, should be maintained between the UVC lamps included in the panels of a set and the opposite component parts of the vines, in a manner that such distance be sufficient to the UVC lamps 53 for performing an effective anti-parasitic treatment against all the component parts of the grapes of this row. Thereafter, also the panels of the other set will be maintained at the needed distance, together with the relative UVC lamps 53, from the opposite component parts of the vines of the other row, for performing on to these latter the same anti-parasitic treatment.

The so found values are introduced and set in the microprocessor controlled main power card 78 and converted into correspondent digital electronic signals, which will be utilized for controlling and managing the operation of all the electric and electronic component parts of the apparatus, when the apparatus will be then installed along its advancement path and the operative cycle of such apparatus will be started by acting on to the controls of the same apparatus.

Such main power card 78 is moreover arranged in a manner that, when each operative cycle has been terminated and the apparatus be arrived at the end of the guide and advancement path of the same apparatus, the power card 78 controls the automatic stop of the advancement and therefore the end of the operative cycle of the movable apparatus 5. Thereafter, the main power card 78 is also set in a manner that, after a pre-established time, it controls the advancement of the apparatus from the end of the path in a reverse direction along the entire path which has been run across previously, and such advancement be effected up to return to the initial starting point, and during this advancement the UVC lamps 53 submit again all the component parts of the vines to the same above described anti-parasitic treatment. This operation becomes necessary for the fact that it has been verified in the practice that, after that the component parts of the vines had been treated with the UVC lamps 53 as described, and that therefore almost all the parasite organisms had been destroyed, in the air there are still transported some spores of parasites which collect themselves again on to a part or on to all the component parts of the vines, and that in a relatively short time they would tend to form the same parasites and therefore the same noxious action on to the same vines. Thanks to the fact to repeat the treatment cycle of the vines as described, these spores and these parasites are completely destroyed and cannot more cause some damages to the cultivations of the grapes, so that it is to think that the vineyard be fully reclaimed for a relatively long period of time. This movable apparatus 5 is utilized again after another period of time, of some weeks comprised in the period of time (of about 3-4 months) in which the ripening of the grapes has reached high levels and in which the foliage be grown of a large extent and has reached larger dimensions, which still before becoming grow are already known in advance based on the experience and on the type and quality of the grapes which are ripening, and that therefore these larger dimensions that the foliage will reach will tend, in the case in which the same apparatus with the same panels be still used, to obstruct and limit the correct application of the UVC ultraviolet radiations For preventing that this inconvenience will happen, the main power card 78 is connected electrically, as already described previously, with the fans 61 and 62 through respective electrical connections 141 and 142 and is set in a manner to generate some electrical signals which are transmitted to the electric motors of the same fans, for controlling and managing the connection and the rotation speed of such electric motors, and therefore the suction and the rate of flow of the air produced by said fans 61 and 62, which is then directed toward the foliage, by passing through the through holes 59 and 60 of the relative hollow section bars 57 and 58, and the so produced air is directed against the foliage which such a speed as to raise this latter of an extent sufficient to still permit to the UVC lamps 53 to come into contact with all the component parts of the vineyard, by irradiating the same with the ultraviolet light and still obtaining the desired anti-parasitic treatment of the whole. This operation continues until the apparatus is passed through the entire advancement path, under the condition in which the main power card 78 stops the advancement of the apparatus and disconnect the electric motors of the fans.

Of course, at discretion of the operator of the apparatus, the main power card 78 may be set also for effecting a number of cycles of anti-parasitic treatment which is greater than that indicated, in any step of ripening of the grapes, with consequent several passages of the apparatus through the rows of the vines, thus without departing from the protection field of the present invention.

By returning back again to the FIG. 41, some component parts of which have been already described previously, there are now described the remaining component parts thereof, wherein it is noted that the microprocessor controlled main power card 78 is connected, with other two drivers included therein (not indicated) through an electric connection 143, to two linear actuators 144 and 145 of a type identical to the above described actuators, which are mechanically connected to a respective saddle 136 and 137 (see the FIG. 16), which are slidable in the transversal direction and connected the one with the panels of a set and the other one with the panels of the other set.

In this case, the main power card 78 is arranged in such a manner as to displace such saddles 136 and 137, in the case it is needed, into different positions spread or approached to each other, with consequent displacement of the panels of the two sets in to the same positions, and this depending on the distance respectively existing between two rows of vines adjacent to each other.

Finally, from this Figure there are still noted the LED small lights 137' of the front bumper 17 and the LED small lights 137" of the back bumper 27, which are switched on selectively by the main power card 78 depending on the relative advancement direction of the apparatus during the night hours only, through the relative electric connections 79 and 80, of the operation of the apparatus, thereby illuminating the advancement path. The presence of obstacles or persons in front of the apparatus which is moving is signaled by an acoustical or optical alarm signaling device 146 (in this case an acoustical buzzer), connected electrically with the main power card 78, which detects promptly this situation and stops automatically the advancement of the apparatus, as already described previously. The power card 78 is controlled, for performing all the functions thereof, by digital electronic signals transmitted by means of a connection of serial type RS 485 147 connected to a data control and computing unit 148 (see the FIG. 42), which comprises an electronic microprocessor suitable for the supervision of the system, for processing and calculating the guide system, and including an inner driver (not shown) for electric motors which controls the actuator electric motor 125, mechanically coupled to a gear and pinion, which actuates either one of the bars 123 and 124 for steering the wheels 6 into different positions, as already described with reference to the FIG. 19. A further component part installed in the upper part of the apparatus is a specific electronic gyroscope 149 of traditional type, which will transmit the data of the X, Y and Z axes orthogonal to each other to the data control and computing unit 148 for orienting the vehicle during the movement thereof and for computing electronically the calculation of each steering of the wheels 6 which must be effected along the rectilinear and curvilinear paths of advancement of the same apparatus, in addition to transmit the above mentioned data also to the main power card 78 through a serial cable TS 485 147, and the data for moving the electric actuators 69 (see the FIG. 40), for allowing to keep always all the panels of the UVC lamps 53 perfectly vertical, even when the apparatus arranges itself inclined laterally along its advancement path, owing to the change of the slope of the ground. An additional component part of the apparatus is constituted by at least two receiving antennas 151 connected operatively with an electronic managing control unit 152, and are positioned and supported below the apparatus, and such antennas and control unit are mounted respectively in the front part and the back part of the same apparatus, and each pair of receiving antennas 151 are foreseen for receiving the electromagnetic waves with a determinate frequency, generated by the magnetic field produced by the continuous electric wire 8 buried along the entire displacement path of the apparatus, and the level of the received signal by the wire 8 will be transmitted by each pair of antennas 151 to the correspondent electronic managing control unit 152, which by means of a serial cable RS 485 153 will transmit to the data control and computing unit 148 the digital data containing the measurement of the right and left deviation with respect to the axis of the buried wire 8. Furthermore, the apparatus comprises a special antenna with a GPS receiver (global positioning system) of the traditional type, marked with 154, which is foreseen for optimizing the paths among the rows of the vineyard and is connected by an electric connection 155 with the data control and computing unit 148, which with a proper calculation algorithm will transmit by means of a serial connection CAN 156 and 157 the controls to the drivers 115 and 116 of the respective electric motors 97 and 97 for driving the apparatus.

The data control and computing unit 148 is connected by means of electric cables 158 with analog signals to a meteorological station, arranged on to the upper part of the apparatus and formed by a dew and ambient temperature sensor 159, an anemometer sensor 160 for measuring the wind speed, a solar irradiation sensor 161, a rain sensor 162 of the on-off type. Depending on the environment conditions respectively detected in the real time by these sensors, the same generate correspondent signals which are transmitted to the data control and computing unit 148, which provides to compute and detect these signals by means of a proper mathematic algorithm sets in the electronic microprocessor of said unit 148, as well as provides to check if the levels of the computed and detected signals are comprised within pre-established maximum and minimum levels, for which the detected meteorological conditions should be deemed to the satisfying for permitting to the movable apparatus 5 to begin an anti-parasitic treatment, thereby displacing itself along the rows of the vineyards in a fully autonomous manner. In the opposite case, in which the levels of the detected signals are higher or lower than the pre-established limits, under the condition in which the meteorological conditions aren't satisfying for beginning such anti-parasitic treatment, the signals of the sensors by means of the mathematic algorithm are able to establish that the environment condition is favorable to the growing of the mushrooms, bacteria and mildews, and therefore that the machine must be operated for effecting the anti-parasitic treatment; the anemometer sensor is also utilized for the measurement of the wind speed, in order to avoid that the apparatus may be exposed to the wind gusts directed against the panels of the lamps 53 which could unbalance or overturn the same apparatus. This dangerous condition is detected too by the data control and computing unit 148, which does not enable the apparatus to operate. The operation of the apparatus will be started as soon as all the meteorological conditions detected as described by the data control and computing unit 148 will be returned satisfactory.

A proper LCD monitor panel with touch screen push buttons 166 for the operator is connected by means of a serial cable RS 485 167 to the data control and computing unit 148, which will act as an interface for programming the apparatus with autonomous guide, by setting all the basic data for its operation, and these data will be accessible even with remote controls by utilizing a proper interface of the type GPRS, UMTS (not indicated) which is integrated into said unit 148, which will allow the access to the data in the form of SMS, E-mail or through the Internet web, for managing, analyzing and the database of the operation data, and such data will be picked up through the proper receiving antenna 163 connected operatively to said data control and computing unit 148.

In the case in which under unsatisfying atmospheric conditions the apparatus which should operate would be housed in a protect location and not exposed to the inclemency of the weather, and therefore, the sensors of the meteorological station would not more able to detect the environmental atmospheric conditions, such surveys could be effected by a separated analogous meteorological station, disposed and supported on to an external support and connected operatively by means of radio waves with the meteorological station mounted in the apparatus on a protected condition, thereby for transmitting to this latter the signals respectively generated.

With reference to said GPS receiver 154 (see the FIG. 42), it is also to point out that in the present apparatus it is performed also another important function, namely that to recognize with high accuracy the portions of ground existing among different vineyards, and spaced away from each other, in which portions some buried wires 8 aren't existing, which wires signal the paths that the apparatus must follow for effecting the anti-parasitic treatments in the vineyards. Then, in this case the operator provides to measure the physical distance existing between the end portion of the buried wire 8 of a first advancement path of the present apparatus and the end portion of the buried wire 8 of a second advancement path of the present apparatus, which is spaced away from the first path and separated and not joined with the previous one by means of further buried wires 8, and this distance is measured in scale also on to a topographic map of the zone, by viewing the topographic co-ordinates of each finishing portion of the path and the angle existing between such topographic co-ordinates. All the detected values are automatically converted into correspondent digital electronic signals, which are stored as a digital map in the same data control and computing unit.

At the same time, the GPS receiver 154 is activated by the data control and computing unit 148, so that the GPS antenna of the AGV (namely the Automatic Guided Vehicle) receives the signals from the GPS satellites (Global Positioning System), which transmit the data relating to the latitude and longitude respectively detected on to the ground, which are needed in order that the microprocessor of the data control and computing unit 148 might, through said stored digital map, know the exact position of the apparatus (AGV) in the stretch of ground which must be crossed autonomously by the movable apparatus 5. In this way, the stored digital map in the data control and computing unit 148 is compared continuously with the digital signals received from the GPS satellites and, under the condition in which the microprocessor of the data control and computing unit 148 detects that the signals of the map are identical to those received from the GPS satellites, does mean that the apparatus is passing through the stretch of ground with the correct co-ordinates, and therefore it is controlled in a manner to advance along the same direction by the data control and computing unit 148. In the opposite condition in which the microprocessor of the data control and computing unit 148 detects that the signals of the map are different than those received from the GPS satellites, does mean that the apparatus does not pass through the ground with the correct co-ordinates, so that the microprocessor of the data control and computing unit 148 provides for changing the advancement path of the apparatus, up to the signals of the map become identical again to the signals received from the GPS satellites, and therefore the apparatus is still moving itself on to the ground with the correct co-ordinates. With this criterion, therefore, the apparatus is guided autonomously until the position in which the initial end portion of the buried wire 8 finds itself, and under this condition the data control and computing unit 148 provides for switching off the operation of the GPS receiver 154 and enables the operation of the apparatus to advance along the path defined by such buried wire 8, with the same described manner.

Instead of the so prepared and stored digital map, the invention foresees also the possibility to utilize some maps available in the Internet network, in that the apparatus is also connected by means of the radio modem 3G, UMTS, GPRS, to the network and therefore may have at its disposal various terrestrial maps. Logically, at the moment of the installation by means of the proper network managing software it may be selected the operative area of the apparatus AGV, in such a way that the microprocessor of the data control and computing unit 148 by means of the co-ordinates received from the GPS antenna might establish that the apparatus finds itself inside the operative map and therefore might guide the apparatus into the selected areas.

Figure 43:
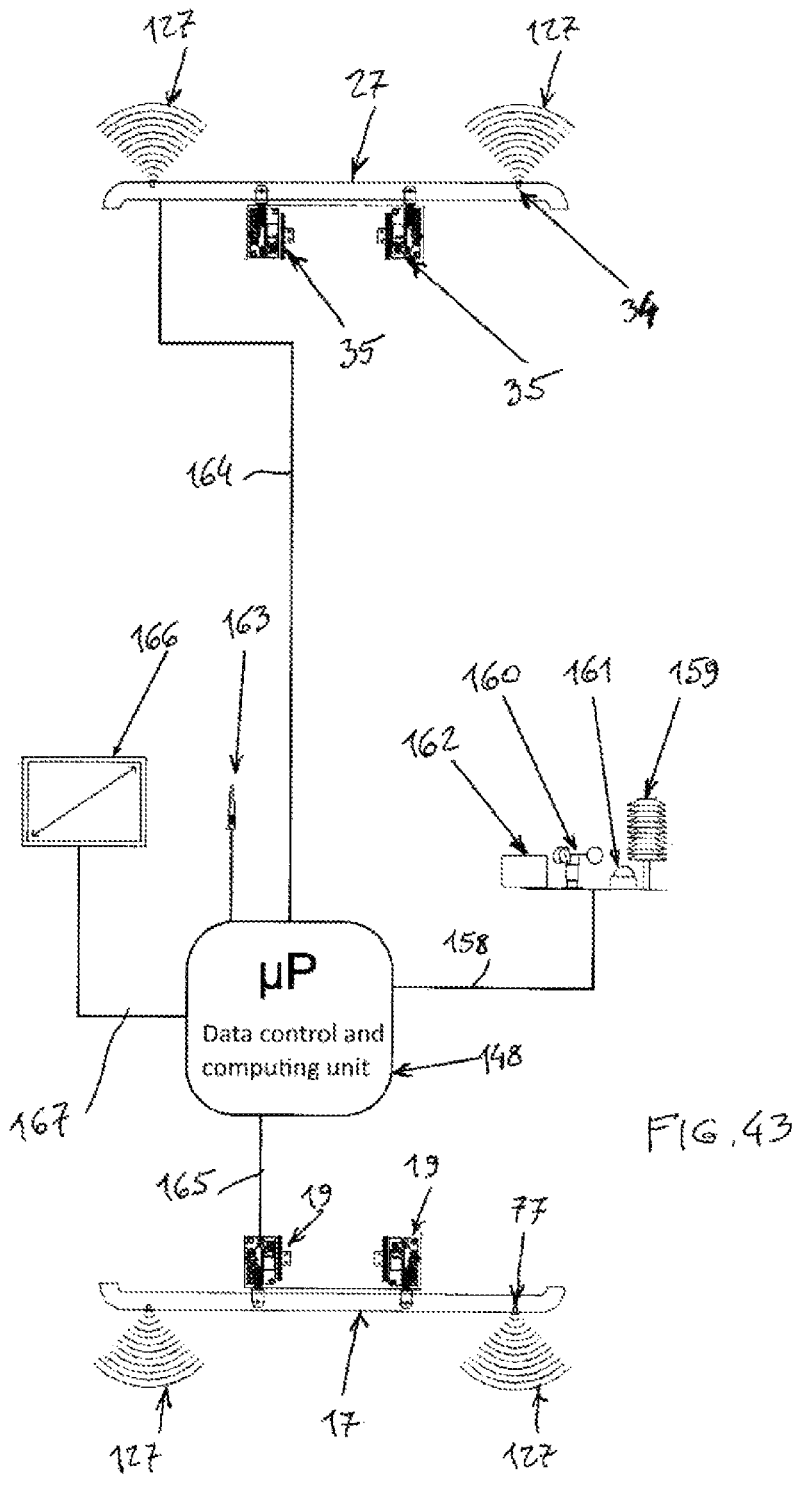

In the FIG. 43 there are also visible the ultrasound sensors 77 and 34 of the relative bumpers 17 and 27 as well as the electro-mechanical devices 19 and 35 previously described, which are connected by means of electric conductors 164 to the data control and computing unit \48, which is set for permitting to these devices to perform all the previously described functions.

Figure 44:
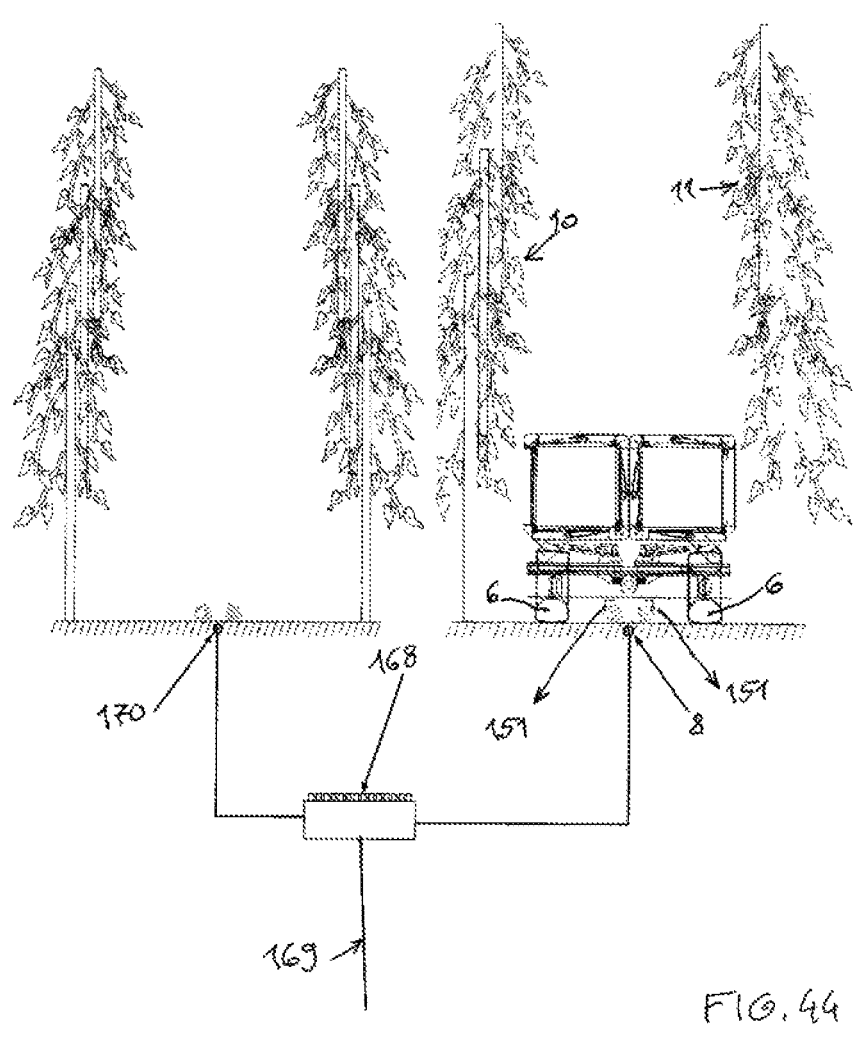

Besides, from the FIG. 44 it is noted the manner in which the system of the buried wire 8 guiding the apparatus is made, which comprise a proper transmitter 168, which may be installed by way of example into a buried pit, and is supplied by means of a cable 169 from various energy sources such as for example some electric batteries, electric power supply, photovoltaic panels etc., and this transmitter has the function to transmit a low frequency electric signal through the buried wire 8 at the beginning and at the end of the rows of a path, independently from the number of existing rows, and such transmitter 168 will be connected to the last electric wire 170 of the set of existing buried wires, thereby creating a closed loop. The buried wire, in addition to perform the already described function, will also emit a coded digital signal, in a way that if the apparatus should be stolen by ill-disposed persons, it could be utilized with its transmitter with its own code only. Furthermore, such transmitter 168 is provided with suitable microswitches (not shown) which offer the possibility to set the transmission power for keeping any possible radio noise within preestablished limits, depending on the area into which the system has been installed. In the FIGS. 22-37 it is shown another embodiment of the movable apparatus 5 according to the invention, that in this case does not slide more on to the ground with the wheels 6, but rather with two lateral tracks 7. Also in this case, the apparatus is made with the same component parts and operates in the same manner previously described, however here each one of the tracks 7 is wound as usual on to a pair of wheels with larger diameter 171 and 172 and on to a set of further wheels 173 with lower diameter, interposed between the preceding wheels. In this case, being not more provided the wheels for sliding on to the ground, even the driving and steering system of the same has been eliminated, so that all the component parts previously utilized for these functions, which are illustrated in the FIGS. 8, 10, 11-15, 18-20, obviously have been eliminated. Then, in this case each track 7 is driven in rotation by a correspondent wheel with larger diameter (in this case, it is visible the front wheel 172 only, while the remaining back wheel does not appear visible from the Figures), wherein such wheels are not provided with the differential gear and are driven in rotation by a relative electric motor 174 and 175 (see the FIGS. 34 and 36), and the electric motors 174 and 175 are controlled by the driver of a relative microprocessor controlled electronic card 176 and 177 connected with the driver of the main power card 78. Then, in this case as usual the tracks 7 are driven contemporaneously by both the motors 174 and 175, with the same speed when the apparatus is advancing along the rectilinear paths, and with different speeds when the apparatus is advancing along the curvilinear paths. By referring now to the FIGS. 45 *a* and 45 *b*, it is illustrated the movable apparatus 5 provided with a safety system adapted to detect the presence of one or more persons who find themselves in the opposite side of a row of vines (in the example, of a person 178 who finds himself on the external side of the row of vines 10), in order to avoid that the person approaches himself too much or might come into contact of the apparatus being moving and therefore might get injured. Then, in this case in the apparatus it is fixed a set of thermal sensors 179 at lateral side thereof, in the present case four thermal sensors identical to each other, a pair of which is fixed to the two sides of the front portions 13 and another pair to the two sides of the back portions 14 of the flat plate 12, in correspondence of the wheels 6 or of the tracks 7 of the apparatus, depending on the embodiment of the apparatus on to which such thermal sensors are fixed. Such thermal sensors serves to detect and measure the temperature of the lower part of the body of the person, who find himself in the lower part of the row where the foliage is lacking and this temperature is measured by the sensor up to a determinate distance from the same sensor, in the present example up to a distance of about 4-5 meters.

The thermal sensor 179 is constituted preferably by the sensor manufactured by the Firm OMRON, Mod. D6T44L, and formed schematically (see the FIG. 45 *b*) by a set of electronic sensors 181 (in the example described formed by 4 sensors aligned in a horizontal line and by 4 sensors overlapped in column), which sensors are marked with 181 and are arranged into an array 182 contained in the interior of the thermal sensor 179, which in turn is shaped with a lens 179' made of silicon transparent to the infrared rays, through which the infra-red signals pass, which are correspondent to the temperature detected from the person 178, and these signals are converted into single temperature digital signals 180 which are directed through a connection of the RS 485 serial type to the unit 148 adapted to compute these digital data by forming a "rough" thermographic image, sufficient for signalling the approach of a human body behind the vineyard, by detecting as already pointed out the presence of the legs of the same body.

Such thermal sensor 179 and the proper software are moreover connected operatively with the main power card 78 (see the FIG. 40) which, as soon as it detects that the thermographic image has been formed, and therefore the presence of the person, switches off automatically all the lamps 53 and stops the advancement of the movable apparatus 5, and signals this situation with an acoustical or optical alarm signalling device, and this signalling continues up to the person has moved away himself at a safety distance, in which case the thermal sensor 179 will detect this situation and enable the main power card 78 to switch on again the lamps 53 and to move again the movable apparatus 5.

The invention claimed is:

1. An autonomous movable apparatus for the treatment of plants with UV light, comprising:
   a mobile base structure configured for unmanned, self-propelled movement along selected paths between rows of plants;
   a panel structure comprising a first set and a second set of panels disposed on opposite sides of the mobile base structure, each of the first set and second set of panels comprising multiple panels articulated to each other, wherein the multiple panels are movable between a rest position in which the multiple panels are folded in a compact configuration and an operative position in which the multiple panels are extended upwardly from the mobile base structure and are oriented with panel surfaces facing in laterally opposite directions with respect to the mobile base structure for treating the plants facing the opposite sides of the mobile base structure;
   an actuator system configured to move the panels between the rest position and the operative position;
   a plurality of UV lamps mounted on the multiple panels, the UV lamps being oriented to face in laterally opposite directions with respect to the mobile base structure for emitting ultraviolet radiation in a germicidal band in laterally outward directions toward the plants when the panels are in the operative position;
   a control system operatively connected to the mobile base structure, the actuator system, and the UV lamps to control autonomous navigation, panel movement of the multiple panels, and UV lamp operation.

2. The autonomous movable apparatus of claim 1, wherein the multiple panels are articulated to each other about respective axes which are parallel with a movement direction of the mobile base structure.

3. The autonomous movable apparatus of claim 1, wherein each of the first and second set of panels comprises at least two adjacent panels which are connected to each other by pivot joints to enable relative angular movement between the two adjacent panels, and at least one linear actuator mounted between the two adjacent panels and configured to control the relative angular movement between the two adjacent panels.

4. The autonomous movable apparatus of claim 1, wherein each of the multiple panels comprises a plurality of UV lamps configured to emit ultraviolet radiation within the wavelength range of 100 to 280 nanometers, and a transparent protective quartz plate covering the lamps.

5. The autonomous movable apparatus of claim 1, further comprising an air fan mounted on the mobile base structure and configured to generate airflow for displacing the foliage of the plants facing the opposite sides of the mobile base structure during UV lamp operation.

6. The autonomous movable apparatus of claim 1, further comprising a gyroscope configured to detect the base structure inclination, the actuator system configured to automatically adjust panel orientation of the multiple panels in response to the detected inclination when the multiple panels are in the operative position.

7. The autonomous movable apparatus of claim 1, further comprising a detection sensor system configured for detecting the presence of a person or obstacle, the detection sensor system mounted on the mobile base structure and operatively connected to the control system, and a safety system operatively connected to the control system and responsive to the detection sensor system to automatically suspend UV lamp operation and/or base structure movement upon detection of a person or obstacle.

8. The autonomous movable apparatus of claim 7, wherein the detection sensor system comprises a bumper mounted on the mobile base structure and an electric switch configured to detect displacement of the bumper against a person or obstacle, the safety system being configured to automatically suspend the movement of the mobile base structure upon detection of bumper displacement by the electric switch.

9. The autonomous movable apparatus of claim 7, further comprising an alarm device operatively connected to the control system and configured to generate an alarm signal in response to detection of a person or obstacle by the detection sensor system, wherein the alarm signal is at least one of an audible signal, a visual signal, or a remote notification signal.

10. An autonomous movable apparatus for the treatment of plants with UV light, comprising:
   a. a mobile base structure configured for unmanned self-propelled movement along selected paths between rows of plants;
   b. a panel structure comprising a set of panels disposed on a side of the mobile base structure, the set of panels comprising multiple panels articulated to each other about respective axes which are parallel with a movement direction of the mobile base structure, wherein the multiple panels are movable between a rest position in which the panels are folded in a compact configuration and an operative position in which the multiple panels are extended outwardly for treating the plants facing the side of the mobile base structure;
   c. an actuator system configured to move the multiple panels between the rest position and the operative position;
   d. a plurality of UV lamps mounted on the multiple panels for emitting ultraviolet radiation in a germicidal band toward the plants when the panels are in the operative position;
   e. a control system operatively connected to the mobile base structure, the actuator system, and the UV lamps to control autonomous navigation, panel movement of the multiple panels, and UV lamp operation;
wherein the autonomous movable apparatus further comprises a gyroscope configured to detect the base structure inclination, the actuator system configured to automatically adjust panel orientation of the multiple panels in response to the detected inclination when the panels are in the operative position.

11. The autonomous movable apparatus of claim 10, wherein the set of panels comprises at least two adjacent panels which are connected to each other by pivot joints to enable relative angular movement between the two adjacent panels, and at least one linear actuator mounted between the two adjacent panels and configured to control the relative angular movement between the two adjacent panels.

12. The autonomous movable apparatus of claim 10, wherein each of the multiple panels comprises a plurality of UV lamps configured to emit ultraviolet radiation within the wavelength range of 100 to 280 nanometers, and a transparent protective quartz plate covering the lamps.

13. The autonomous movable apparatus of claim 10, further comprising an air fan mounted on the mobile base structure and configured to generate airflow for displacing the foliage of the plants facing the side of the mobile base structure during UV lamp operation.

14. The autonomous movable apparatus of claim 10, further comprising a detection sensor system configured for detecting the presence of a person or obstacle, the detection sensor system mounted on the mobile base structure and operatively connected to the control system, and a safety system operatively connected to the control system and responsive to the detection sensor system to automatically suspend UV lamp operation and/or base structure movement upon detection of a person or obstacle.

15. The autonomous movable apparatus of claim 14, wherein the detection sensor system comprises a bumper mounted on the mobile base structure and an electric switch configured to detect displacement of the bumper against a person or obstacle, the safety system configured to automatically suspend the movement of the mobile base structure upon detection of bumper displacement by the electric switch.

16. The autonomous movable apparatus of claim 14, further comprising an alarm device operatively connected to the control system and configured to generate an alarm signal in response to detection of a person or obstacle by the detection sensor system, wherein the alarm signal is at least one of an audible signal, a visual signal, or a remote notification signal.

17. An autonomous movable apparatus for the treatment of plants with UV light, comprising:
   f. a mobile base structure configured for unmanned self-propelled movement along selected paths between rows of plants;
   g. a panel structure comprising a first set and a second set of panels disposed on opposite sides of the mobile base structure, each of the first set and the second set of panels comprising multiple panels articulated to each other about respective axes which are parallel with a movement direction of the mobile base structure, wherein the multiple panels are movable between a rest position in which the multiple panels are folded in a compact configuration and an operative position in which the multiple panels are extended outwardly in opposite directions for treating the plants facing the opposite sides of the mobile base structure;
   h. an actuator system configured to move the multiple panels between the rest position and the operative position;
   i. a plurality of UV lamps mounted on the multiple panels for emitting ultraviolet radiation in a germicidal band toward the plants when the multiple panels are in the operative position;
   j. a control system operatively connected to the mobile base structure, the actuator system, and the UV lamps to control autonomous navigation, panel movement, and UV lamp operation;
wherein the autonomous movable apparatus further comprises a gyroscope configured to detect the base structure inclination, the actuator system configured to automatically adjust panel orientation of the multiple panels in response to the detected inclination when the panels are in the operative position.

18. The autonomous movable apparatus of claim 17, wherein each of the first set and the second set of panels comprises at least two adjacent panels which are connected to each other by pivot joints to enable relative angular movement between the two adjacent panels, and at least one linear actuator mounted between the two adjacent panels and configured to control the relative angular movement between the two adjacent panels.

19. The autonomous movable apparatus of claim 17, wherein each of the multiple panels comprises a plurality of UV lamps configured to emit ultraviolet radiation within the wavelength range of 100 to 280 nanometers, and a transparent protective quartz plate covering the lamps.

\* \* \* \* \*